(12) United States Patent
Pal et al.

(10) Patent No.: US 12,373,348 B2
(45) Date of Patent: Jul. 29, 2025

(54) ATOMIC HANDLING FOR DISAGGREGATED 3D STRUCTURED SoCS

(71) Applicant: Intel Corporation, Santa Clara, CA (US)

(72) Inventors: Rahul Pal, Bangalore (IN); Aravindh Anantaraman, Folsom, CA (US); Lakshminarayana Pappu, Folsom, CA (US); Dongsheng Bi, Fremont, CA (US); Guadalupe J. Garcia, Chandler, AZ (US); Altug Koker, El Dorado Hills, CA (US); Joydeep Ray, Folsom, CA (US); Rahul Joshi, Pune (IN); Shrikul Atulkumar Joshi, Rajkot (IN); Mahak Gupta, Bengaluru (IN)

(73) Assignee: Intel Corporation, Santa Clara, CA (US)

( * ) Notice: Subject to any disclaimer, the term of this patent is extended or adjusted under 35 U.S.C. 154(b) by 664 days.

(21) Appl. No.: 17/551,681

(22) Filed: Dec. 15, 2021

(65) Prior Publication Data

US 2023/0114164 A1 Apr. 13, 2023

Related U.S. Application Data

(60) Provisional application No. 63/253,439, filed on Oct. 7, 2021, provisional application No. 63/253,437, filed
(Continued)

(51) Int. Cl.
*G06F 12/0871* (2016.01)
*G06F 12/0891* (2016.01)
*G06F 13/16* (2006.01)
*G06F 13/28* (2006.01)
*G06F 15/78* (2006.01)

(52) U.S. Cl.
CPC ...... *G06F 12/0871* (2013.01); *G06F 12/0891* (2013.01); *G06F 13/1668* (2013.01); *G06F 13/28* (2013.01); *G06F 15/7807* (2013.01)

(58) Field of Classification Search
CPC .... G06F 9/52; G06F 12/0804; G06F 12/0811; G06F 12/0815; G06F 12/0831;
(Continued)

(56) References Cited

U.S. PATENT DOCUMENTS 6,370,625 B1 * 4/2002 Carmean ............... G06F 9/3004
711/155
8,135,926 B1 3/2012 Glasco et al.
(Continued)

FOREIGN PATENT DOCUMENTS

EP 4418118 A2 8/2024

OTHER PUBLICATIONS

Compute Express Link (CXL) Specification, Evaluation Copy, Oct. 26, 2020, Revision 2.0, Version 1.0, 628 pages.
(Continued)

*Primary Examiner* — Aracelis Ruiz
(74) *Attorney, Agent, or Firm* — Jaffery Watson Hamilton & DeSanctis LLP

(57) ABSTRACT

In a further embodiment, a system on a chip integrated circuit (SoC) is provided that includes an active base die including a first cache memory, a first die mounted on and coupled with the active base die, and a second die mounted on the active base die and coupled with the active base die and the first die. The first die includes an interconnect fabric, an input/output interface, and an atomic operation handler. The second die includes an array of graphics processing elements and an interface to the first cache memory of the active base die. At least one of the graphics processing elements are configured to perform, via the atomic operation handler, an atomic operation to a memory device.

20 Claims, 29 Drawing Sheets

Related U.S. Application Data on Oct. 7, 2021, provisional application No. 63/253,452, filed on Oct. 7, 2021.

(58) Field of Classification Search
CPC ........... G06F 12/0871; G06F 12/05879; G06F 12/0891; G06F 13/1668; G06F 13/28; G06F 15/7807; G06F 2209/521; G06F 2012/2515; G06F 2212/302
See application file for complete search history.

(56) References Cited

U.S. PATENT DOCUMENTS

| | | |
|---|---|---|
| 2018/0293205 A1 | 10/2018 | Koker et al. |
| 2020/0242042 A1* | 7/2020 | Svennebring ....... G06F 12/0877 |
| 2021/0097013 A1 | 4/2021 | Saleh et al. |
| 2021/0149600 A1* | 5/2021 | Brewer ............... G06F 12/0815 |

OTHER PUBLICATIONS

Extended EESR for EP22194347.5, mailed Jun. 14, 2023, 12 pages.
Partial European Search Report for EP 22 19 4347, 14 pages, Mar. 3, 2023.
Notification of Publication for CN 202211089570.3, CN Pub No. 115951978A, 4 pages, Apr. 11, 2023.
Intention to Grant for EP22194347.5, mailed Apr. 8, 2024, 5 pages.
Decision to Grant for EP22194347.5, mailed Jul. 25, 2024, 3 pages.
Extended EP Search Report for EP24187316.5, Oct. 22, 2024, 10 pages.
Notification of Publication for EP 22 19 4347, EP Pub No. 4163796, 2 pages, Mar. 15, 2023.

* cited by examiner

ATOMIC HANDLING FOR DISAGGREGATED 3D STRUCTURED SoCS

CROSS REFERENCE TO RELATED APPLICATIONS

The present patent application claims priority to U.S. Provisional Application No. 63/253,437, U.S. Provisional Application No. 63/253,439, and U.S. Provisional Application No. 63/253,452, each filed Oct. 7, 2021, the contents of each of which are incorporated herein by reference in their entirety.

BACKGROUND

Programmable graphics processors can be configured to perform some operations to shared memory as atomic operations. An operation acting on shared memory is atomic if it completes in a single step relative to other threads and no other thread can observe the modification half-complete. Updated designs for programmable graphics processors house the graphics processor within a disaggregated 3D-structured SoC architecture. However, the handling of atomic transactions on a disaggregated 3D SoC structure has not been addressed by conventional systems.

BRIEF DESCRIPTION OF THE DRAWINGS

The present invention is illustrated by way of example and not limitation in the figures of the accompanying drawings in which like references indicate similar elements, and in which.

DETAILED DESCRIPTION

For the purposes of explanation, numerous specific details are set forth to provide a thorough understanding of the various embodiments described below. However, it will be apparent to a skilled practitioner in the art that the embodiments may be practiced without some of these specific details. In other instances, well-known structures and devices are shown in block diagram form to avoid obscuring the underlying principles, and to provide a more thorough understanding of embodiments. The techniques and teachings described herein may be applied to a device, system, or apparatus including various types of circuits or semiconductor devices, including general purpose processing devices or graphic processing devices. Reference herein to "one embodiment" or "an embodiment" indicate that a particular feature, structure, or characteristic described in connection or association with the embodiment can be included in at least one of such embodiments. However, the appearances of the phrase "in one embodiment" in various places in the specification do not necessarily all refer to the same embodiment.

In the following description and claims, the terms "coupled" and "connected," along with their derivatives, may be used. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Described herein is a disaggregated 3D-structured SoC architecture that includes a package substrate having a bottom level cache die that is interfaced with a disaggregated compute die on top of the cache die, with an additional system die to manage SoC operations that is positioned on top of the cache die. In this architecture, the compute engine is a disaggregated segment from the rest of the SoC components. The handling of atomic transactions for a disaggregated 3D SoC structure is not addressed by conventional systems. Embodiments described below provide architectures to handle atomic transactions on a disaggregated 3D SoC structure.

Graphics Processing System Overview

Figure 1:
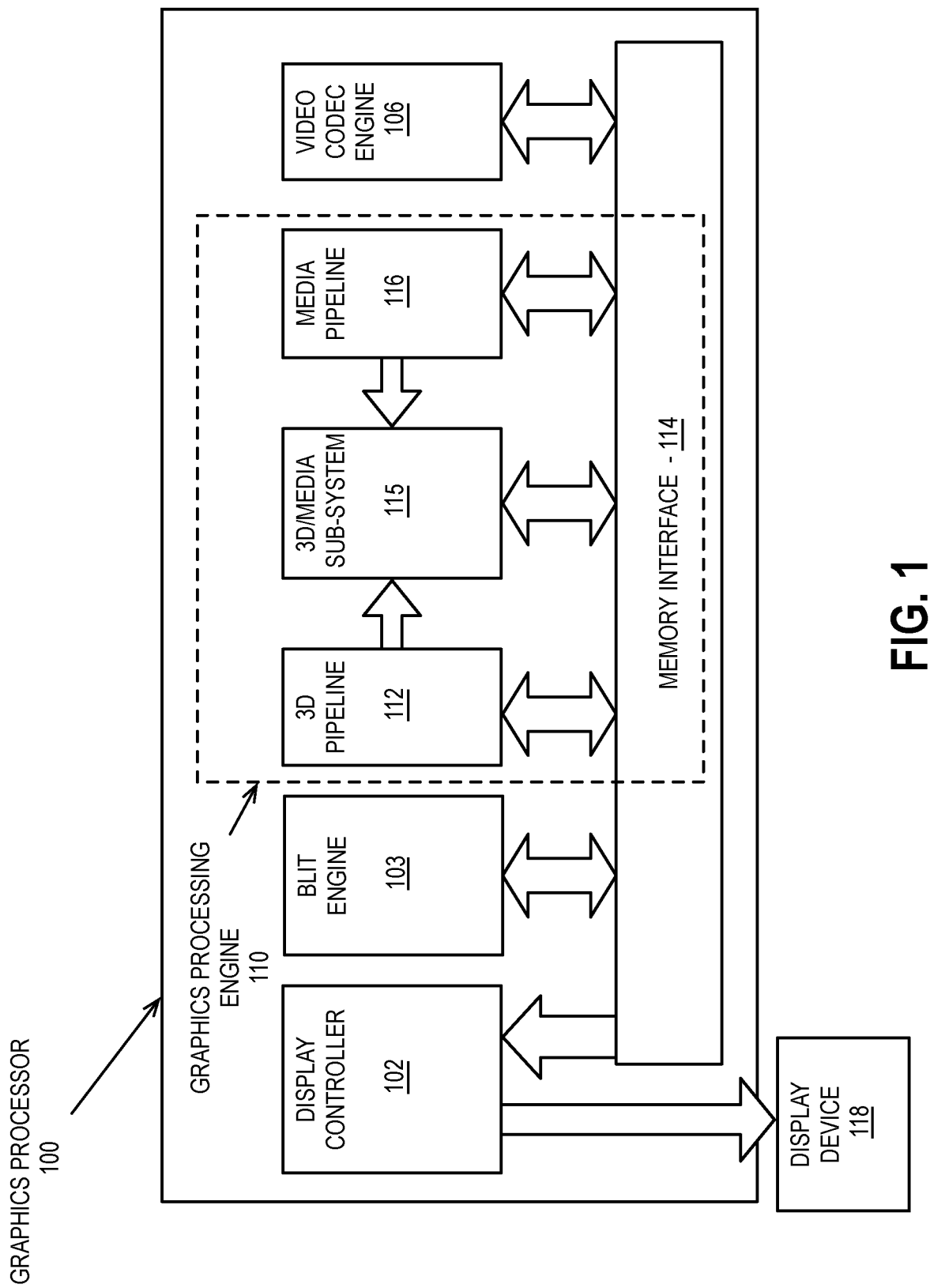
FIG. 1 is a block diagram of a graphics processor, according to an embodiment.

FIG. 1 is a block diagram of a graphics processor 100, according to an embodiment. The graphics processor 100 may be a discrete graphics processing unit, or may be a graphics processor integrated with a plurality of processing cores, or other semiconductor devices such as, but not limited to, memory devices or network interfaces. The graphics processor may communicate via a memory mapped I/O interface to registers on the graphics processor and with commands placed into the processor memory. Graphics processor 100 may include a memory interface 114 to access memory. Memory interface 114 can be an interface to local memory, one or more internal caches, one or more shared external caches, and/or to system memory.

Optionally, graphics processor 100 also includes a display controller 102 to drive display output data to a display device 118. Display controller 102 includes hardware for one or more overlay planes for the display and composition of multiple layers of video or user interface elements. The display device 118 can be an internal or external display device. In one embodiment the display device 118 is a head mounted display device, such as a virtual reality (VR) display device or an augmented reality (AR) display device. Graphics processor 100 may include a video codec engine 106 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, H.265/HEVC, Alliance for Open Media (AOMedia) VP8, VP9, as well as the Society of Motion Picture & Television Engineers (SMPTE) 421M/VC-1, and Joint Photographic Experts Group (JPEG) formats such as JPEG, and Motion JPEG (MJPEG) formats.

Graphics processor 100 may include a block image transfer (BLIT) engine 103 to perform two-dimensional (2D) rasterizer operations including, for example, bit-boundary block transfers. However, alternatively, 2D graphics operations may be performed using one or more components of graphics processing engine (GPE) 110. In some embodiments, GPE 110 is a compute engine for performing graphics operations, including three-dimensional (3D) graphics operations and media operations.

GPE 110 may include a 3D pipeline 112 for performing 3D operations, such as rendering three-dimensional images and scenes using processing functions that act upon 3D primitive shapes (e.g., rectangle, triangle, etc.). The 3D pipeline 112 includes programmable and fixed function elements that perform various tasks within the element and/or spawn execution threads to a 3D/Media subsystem 115. While 3D pipeline 112 can be used to perform media operations, an embodiment of GPE 110 also includes a media pipeline 116 that is specifically used to perform media operations, such as video post-processing and image enhancement.

Media pipeline 116 may include fixed function or programmable logic units to perform one or more specialized media operations, such as video decode acceleration, video de-interlacing, and video encode acceleration in place of, or on behalf of video codec engine 106. Media pipeline 116 may additionally include a thread spawning unit to spawn threads for execution on 3D/Media subsystem 115. The spawned threads perform computations for the media operations on one or more graphics execution units included in 3D/Media subsystem 115.

The 3D/Media subsystem 115 may include logic for executing threads spawned by 3D pipeline 112 and media pipeline 116. The pipelines may send thread execution requests to 3D/Media subsystem 115, which includes thread dispatch logic for arbitrating and dispatching the various requests to available thread execution resources. The execution resources include an array of graphics execution units to process the 3D and media threads. The 3D/Media subsystem 115 may include one or more internal caches for thread instructions and data. Additionally, the 3D/Media subsystem 115 may also include shared memory, including registers and addressable memory, to share data between threads and to store output data.

Figure 2A:
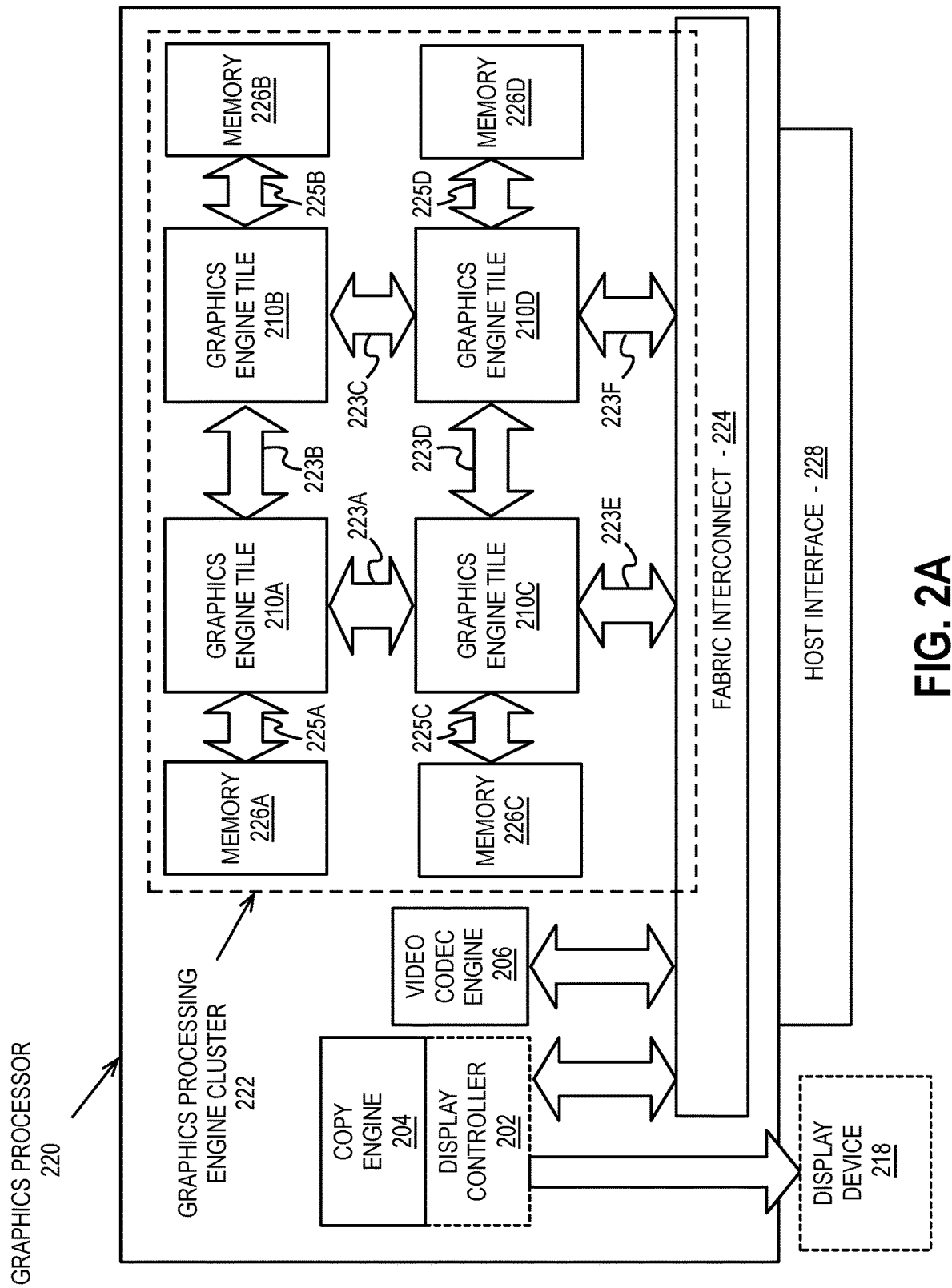
FIG. 2A-2B illustrates a graphics processor and a compute accelerator, according to embodiments.

FIG. 2A illustrates a graphics processor 220, according to an embodiment. The graphics processor 220 can be a variant of the graphics processor 100 and may be used in place of the graphics processor 100 and vice versa. Therefore, the disclosure of any features in combination with the graphics processor 100 herein also discloses a corresponding combination with the graphics processor 220 but is not limited to such. The graphics processor 220 has a tiled architecture, according to embodiments described herein. The graphics processor 220 may include a graphics processing engine cluster 222 having multiple instances of the GPE 110 of FIG. 1 within a graphics engine tile 210A-210D. Each graphics engine tile 210A-210D can be interconnected via a set of tile interconnects 223A-223F. Each graphics engine tile 210A-210D can also be connected to a memory module or memory device 226A-226D via memory interconnects 225A-225D. The memory devices 226A-226D can use any graphics memory technology. For example, the memory devices 226A-226D may be graphics double data rate (GDDR) memory. The memory devices 226A-226D may be HBM modules that can be on-die with their respective graphics engine tile 210A-210D. The memory devices 226A-226D may be stacked memory devices that can be stacked on top of their respective graphics engine tile 210A-210D. Each graphics engine tile 210A-210D and associated memory 226A-226D may reside on separate chiplets, which are bonded to a base die or base substrate.

The graphics processor 220 may be configured with a non-uniform memory access (NUMA) system in which memory devices 226A-226D are coupled with associated graphics engine tiles 210A-210D. A given memory device may be accessed by graphics engine tiles other than the tile to which it is directly connected. However, access latency to the memory devices 226A-226D may be lowest when accessing a local tile. In one embodiment, a cache coherent NUMA (ccNUMA) system is enabled that uses the tile interconnects 223A-223F to enable communication between cache controllers within the graphics engine tiles 210A-210D to keep a consistent memory image when more than one cache stores the same memory location.

The graphics processing engine cluster 222 can connect with an on-chip or on-package fabric interconnect 224. In one embodiment the fabric interconnect 224 includes a network processor, network on a chip (NoC), or another switching processor to enable the fabric interconnect 224 to act as a packet switched fabric interconnect that switches data packets between components of the graphics processor 220. The fabric interconnect 224 can enable communication between graphics engine tiles 210A-210D and components such as the video codec engine 206 and one or more copy engines 204. The copy engines 204 can be used to move data out of, into, and between the memory devices 226A-226D and memory that is external to the graphics processor 220 (e.g., system memory). The fabric interconnect 224 can also be used to interconnect the graphics engine tiles 210A-210D. The graphics processor 220 may optionally include a display controller 202 to enable a connection with an external display device 218. The graphics processor may also be configured as a graphics or compute accelerator. In the accelerator configuration, the display controller 202 and display device 218 may be omitted.

The graphics processor 220 can connect to a host system via a host interface 228. The host interface 228 can enable communication between the graphics processor 220, system memory, and/or other system components. The host interface 228 can be, for example, a PCI express bus or another type of host system interface. For example, the host interface 228 may be an NVLink or NVSwitch interface. The host interface 228 and fabric interconnect 224 can cooperate to enable multiple instances of the graphics processor 220 to act as single logical device. Cooperation between the host interface 228 and fabric interconnect 224 can also enable the individual graphics engine tiles 210A-210D to be presented to the host system as distinct logical graphics devices.

Figure 2B:
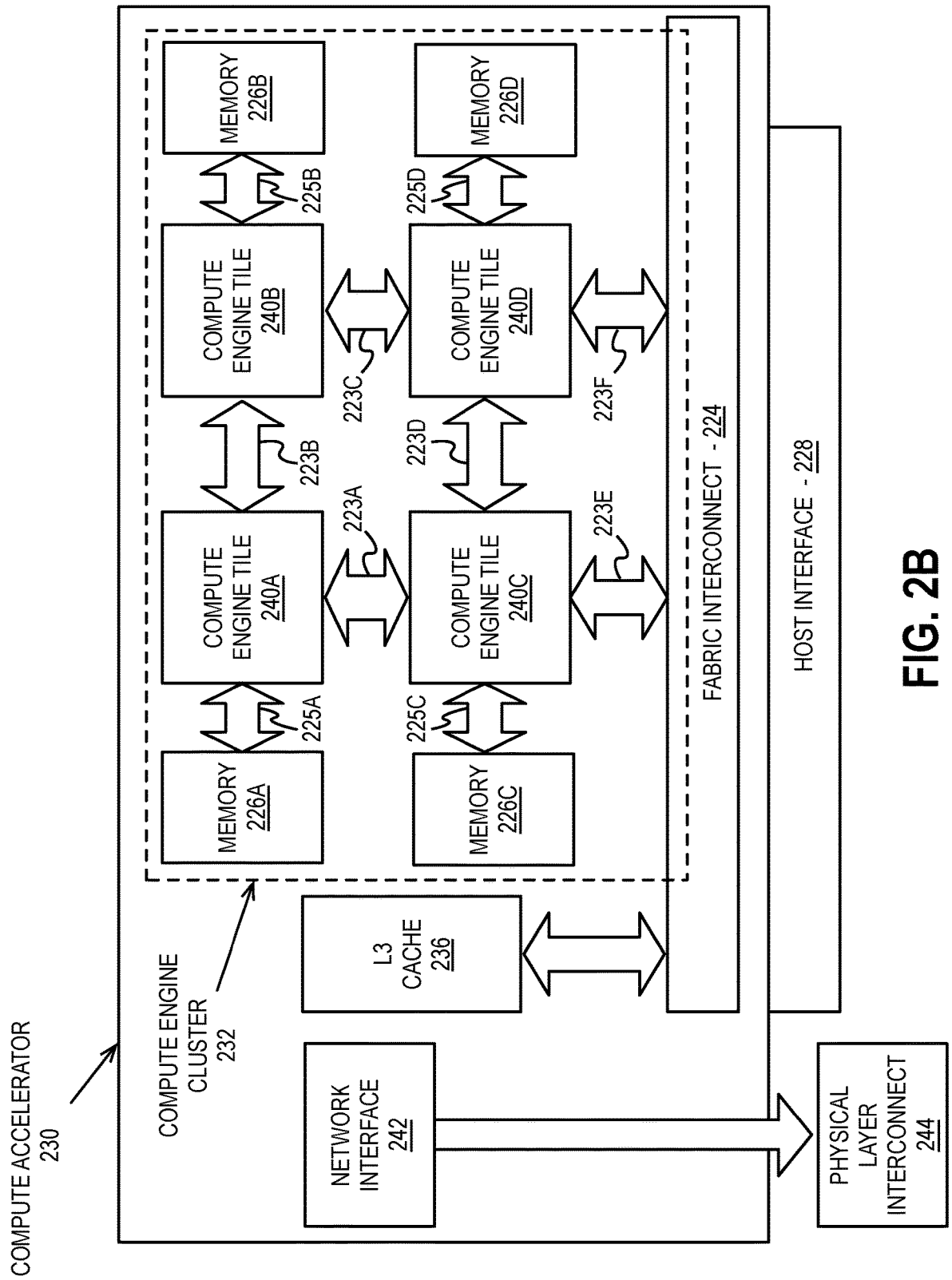

FIG. 2B illustrates a compute accelerator 230, according to embodiments described herein. The compute accelerator 230 can include architectural similarities with the graphics processor 220 of FIG. 2B and is optimized for compute acceleration. A compute engine cluster 232 can include a set of compute engine tiles 240A-240D that include execution logic that is optimized for parallel or vector-based general-purpose compute operations. The compute engine tiles 240A-240D may not include fixed function graphics processing logic, although in some embodiments one or more of the compute engine tiles 240A-240D can include logic to perform media acceleration. The compute engine tiles 240A-240D can connect to memory 226A-226D via memory interconnects 225A-225D. The memory 226A-226D and memory interconnects 225A-225D may be similar technology as in graphics processor 220 or can be different. The graphics compute engine tiles 240A-240D can also be interconnected via a set of tile interconnects 223A-223F and may be connected with and/or interconnected by a fabric interconnect 224. In one embodiment the compute accelerator 230 includes a large L3 cache 236 that can be configured as a device-wide cache. The compute accelerator 230 can also connect to a host processor and memory via a host interface 228 in a similar manner as the graphics processor 220 of FIG. 2B.

The compute accelerator 230 can also include an integrated network interface 242. In one embodiment the integrated network interface 242 includes a network processor and controller logic that enables the compute engine cluster 232 to communicate over a physical layer interconnect 244 without requiring data to traverse memory of a host system. In one embodiment, one of the compute engine tiles 240A-240D is replaced by network processor logic and data to be transmitted or received via the physical layer interconnect 244 may be transmitted directly to or from memory 226A-226D. Multiple instances of the compute accelerator 230 may be joined via the physical layer interconnect 244 into a single logical device. Alternatively, the various compute engine tiles 240A-240D may be presented as distinct network accessible compute accelerator devices.

Modular Graphics SoC Architecture

Figure 3:
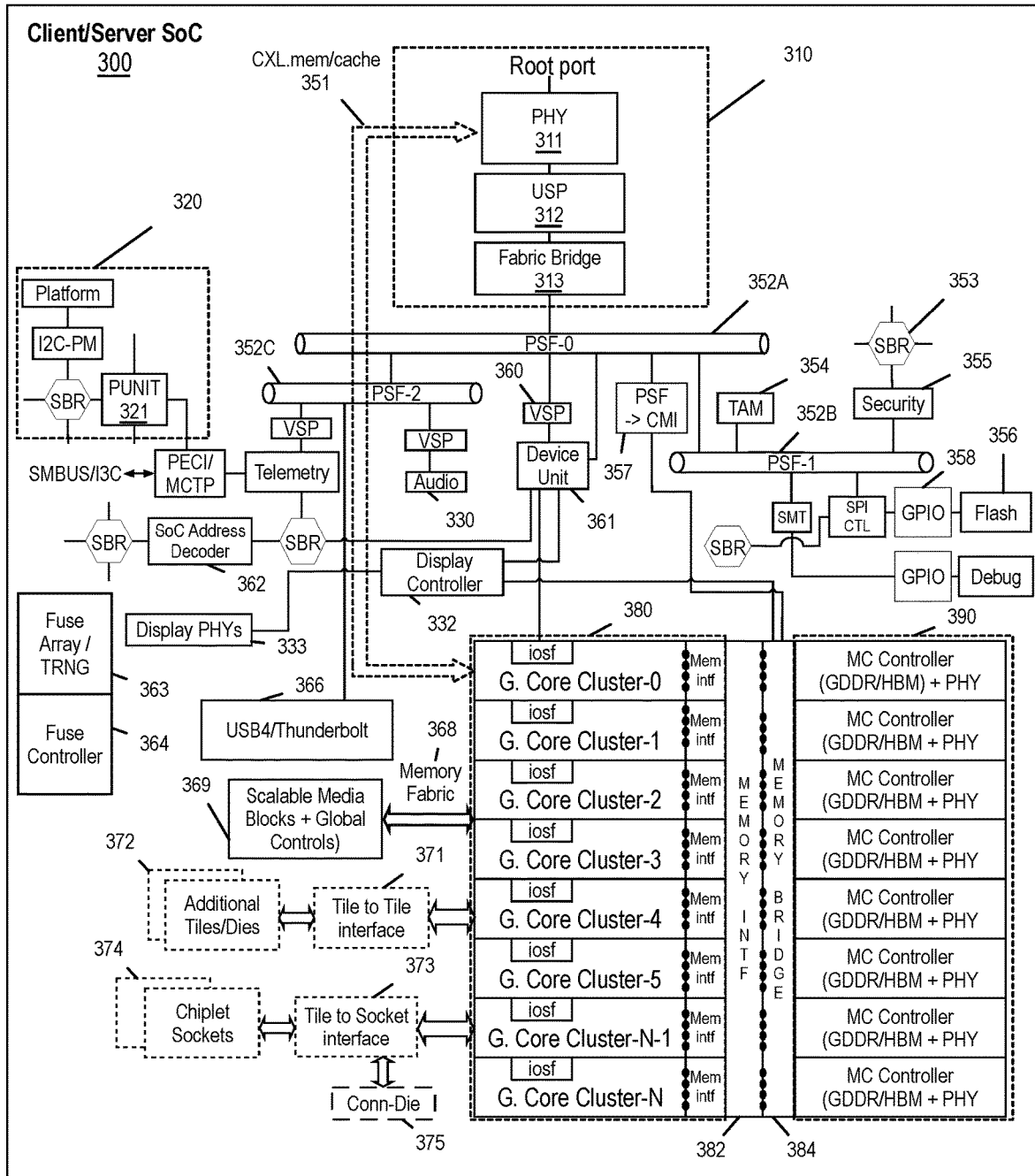
FIG. 3 illustrates a block diagram of a graphics SoC.

FIG. 3 illustrates a block diagram of a modular client/server architecture for a graphics SoC 300. A converged architecture view is shown that includes components of the graphics SoC 300 that are architected with specific modular connection points within the architecture, such that components can be added or removed from a monolithic design or divided among multiple chiplets in a disaggregated design. For example, host connectivity may be on a separate host interface die 310, with the physical interface (PHY 311), upstream switch/port (USP 312), and fabric bridge (313) on a first die and the switch fabric and remaining SoC components on a second die. A client configuration can include a host interface die 310 with peripheral component interconnect express (PCIe) support (e.g., PCIe 5, etc.), while a server configuration can enable the use of a host interface die 310 with support for PCIe, as well as compute express link (CXL) and CXL.mem/cache 351. In one embodiment, a power management block 320 can also be disaggregated from the primary SoC architecture. The power management block 320 includes a power management unit (PUNIT 321), as well as various power and platform interconnects to facilitate power management functionality on the graphics SoC 300. Component communication within the graphics SoC 300 can be performed using a sideband network, which is a standardized mechanism for communicating out-of-band information between components of the graphics SoC 300. Sideband routers (e.g., SBR 353) can route messages between components on the sideband network. An SoC address decoder 362 can facilitate message transmission over the sideband network by maintaining a mapping between address spaces used for memory mapped input/output (MMIO) and the SoC components that are associated with various address ranges. In one embodiment, the SoC address decoder 362 is programmable, such that the address mapping for the various SoC components can be dynamically programmed based on the components that are selected for an assembled product. Telemetry from the various components can also be output by the graphics SoC 300. Telemetry output can be configured via both in-band requests from the primary switch fabric and out-of-band requests via the sideband network.

One or more primary switch fabrics 352A-352C provide the primary communication mechanism for the graphics SoC 300. In one embodiment, a first primary switch fabric (PSF-0) 352A can couple with the fabric bridge 313 on the host interface die 310, while a second primary switch fabric (PSF-1) 352B and third primary switch fabric (PSF-2) 352C couple with the first primary switch fabric 352A. Clients of the primary switch fabrics 352A-352C can couple with the switch fabrics via virtual switch ports (e.g., VSP 360). In one embodiment, a primary switch fabric to converged memory interface bridge 357 couples with at least one of the primary switch fabrics 352A-352C to enable access to memory coupled with the memory interfaces 390 via the host interface die 310, which allows external devices to access memory of the graphics SoC 300. In one embodiment, a test access module (TAM 354) couples with a primary switch fabric (e.g., PSF-1 352B) to enable debug functionality for the graphics SoC 300. In one embodiment, the TAM 354 can be used to access debug logic via an SMT general-purpose input/output (GPIO) interface.

A GPIO interface (e.g., GPIO 358) can also be used to access a flash memory device 356 that can store, for example, firmware for the various components of the graphics SoC 300, as well as firmware for a security controller 355. In one embodiment the security controller 355 is a chassis security controller for a server-based GPU system. One embodiment additionally includes a fuse array 363 and associated fuse controller 364. The fuse array 363 includes one-time-programmable non-volatile storage that becomes read-only once programmed. In one embodiment the fuse array includes a true random number generator (TRNG) to randomize the manner in which fuses in the fuse array are sensed so that it is more difficult to simply exercise the device and determine all the values of the storage elements within the fuse array 363.

A device unit 361 can couple with a primary switch fabric (e.g., PSF-0 352A) via a VSP 360, which in one embodiment, is a PCIe/CXL endpoint controller for the graphics SoC 300. The device unit 361 can couple with a display controller 332 and associated display physical interfaces 333 for some products, while other products, particularly server-based products, can exclude the display controller 332 and associated display physical interfaces 333. The graphics SoC 300 can also include an audio device 330 to facilitate audio output via an attached display connection. In one embodiment, display and audio output can be performed via a USB4/Thunderbolt interconnect 366. DisplayPort alternate mode, USB protocol tunneling, and high-speed data transfer can be provided.

Some of the SoC components on the second die may also be located on a third die. For example, a compute block 380 including multiple graphics core clusters and associated memory interfaces 390 may reside on the third die. The compute block 380 can include graphics cores with matrix accelerators and/or systolic arrays for compute and/or machine-learning focused server products, while the systolic array can be excluded or modified for another product that targets a different server segment, such as for media focused server product. Accordingly, the graphics core clusters within a compute block 380 can differ between client and server segments without requiring a re-design of the SoC architecture. Instead, different chiplets with different versions of the compute block 380 can be attached to an active base die during assembly. As described herein, an active base die is a silicon die that includes embedded logic in addition to TSVs that interconnect a chiplet tile to a package interconnect.

Where the compute block 380 and associated memory interfaces 390 reside on the third die, different types of graphics core and memory pairings may be used for different products, and different graphics core architectures may be used. A server-based compute block 380 can be associated with HBM memory (e.g., HBM2E, HBM3), while a client-based compute block 380 can be associated with GDDR memory (e.g., GDDR6, GDDR6X). In one embodiment, low power products can couple with a low power DDR (LPDDR) memory subsystem. A memory interface 382 and/or memory bridge 384 can be used to connect the compute block 380 and the memory interfaces 390. In one embodiment, the memory interface 382 can reside within the active base die. Additionally, different process technology nodes can be used when manufacturing modules that are targeted at different market segments or product classes.

In one embodiment, the memory interfaces 390 may reside on a fourth die, with different memory technologies used for different product segments that share graphics core architectures within the compute block 380. For example, a server product can be coupled with a stack of HBM memory, while a client product targeted at gaming enthusiasts can include a version of a server-focused compute block 380 in conjunction with GDDR6X memory. Differentiation can also be made for products with on-package HBM and products that couple with a separate HBM package via a high-speed memory interconnect.

In one embodiment, scalable media blocks and global controls 369 are included and couple with a memory fabric 368. The memory fabric 368 enables communication between the scalable media blocks and global controls 369 and the compute block 380 and attached memory interfaces 390. The memory fabric 368 is associated with the memory interconnects 1625A-1625D of FIG. 16B-16C.

In one embodiment, the memory interfaces 390 and associated memory devices can make use of dynamic voltage and frequency scaling. When executing memory intensive workloads that are limited by the performance of the memory subsystem, the voltage and frequency of the memory system can be scaled to provide higher memory performance. When idle or when executing workloads that are more limited by compute performance than memory performance, the voltage and frequency of the memory subsystem can be reduced, allowing the voltage and frequency of the compute engine to scale without exceeding the overall device power limit.

In one embodiment, a set of work points is identified for each graphics product SKU based on the power envelope associated with that SKU. In discrete graphics systems, the memory devices (GDDR, HBM, etc.) can operate only at a limited set of voltages. During memory training, at factory reset, operable voltage and frequency points are trained. The trained parameters are then stored on a flash device for later retrieval. Based on the post-silicon calibration, appropriate voltage and frequency points are determined and the memory subsystem is configured to enable transitions between those points. The hardware is configured to quickly switch frequencies without significantly impacting the existing workloads either in-terms of user experience or workload performance. When necessary, higher voltages can be used to enable the highest set of memory frequencies.

In one embodiment the graphics SoC 300 architecture described herein is configurable to enable multi-tile products for server and client devices and multi-socket products for server devices. A tile-to-tile interface 371 can be included to enable the graphics SoC 300 to couple with addition tiles or dies. A tile-to-socket interface 373 can be included that couples with additional chiplet sockets 374 and a connectivity die 375 that allows a multi-board server graphics GPU to be assembled. The tile-to-tile interface 371 and tile-to-socket interface 373 can each couple with the memory fabric 368 to enable memory for various tiles and sockets to be accessed via remote tiles and sockets.

Atomic Operation Handling on a Modular 3D-Structured SoC Architecture

Described herein are techniques for atomic operation handling on a modular, disaggregated 3D-structured SoC architecture utilized to host a graphics processor. Handling of atomic transactions for such a disaggregated 3D-structured SoC has not been addressed by conventional systems. As the underlying 3D SoC structure is a new architectural approach, handling of atomic transactions within such a novel 3D SoC structure has not been addressed by conventional systems. Previous approaches to atomic transaction handling in conventional systems would not address this set of architectures and use cases of the new 3D SoC structure described herein.

To address the above-described drawbacks of the previous approaches, embodiments provide for atomic transaction handling by the disaggregated 3D-structure SoC architecture that can handle two kinds of atomic operations: (1) system memory atomics and (2) local memory atomics. Both the graphics engine and the media engine can utilize this capability in implementations of the disclosure. For example, the disaggregated 3D-structure SoC architecture can target either system memory that is attached to a host processor or local memory that is attached to the graphics processor. The atomic operations can be performed in response to an instruction executed by processing resources of the graphics SoC 300. In one embodiment, atomic operations, such as but not limited to Fetch and Add, SWAP, CAS (Compare and Swap), can be performed. However, the techniques described herein can be used to perform any atomic operation. Support is provided, in one embodiment, for operand sizes of 32, 64, 128 bits, for example. However, other operand sizes may be supported in other embodiments.

In some embodiments described herein, atomic operations are enabled via the use of a CXL interconnect (Compute Express Link). CXL includes support for various interconnect protocols, including CXL.io, CXL.cache, and CXL.mem. The CXL.io protocol enables the host to perform device discovery, configuration, register access, interrupts, virtualization, and bulk DMA. The CXL.cache protocol defines interactions between a host and a device and enables coherent device-side caching of host memory. The CXL.memory protocol enables a host processor to directly access the local memory of an attached CXL device via the use of load and store commands.

Figure 4A:
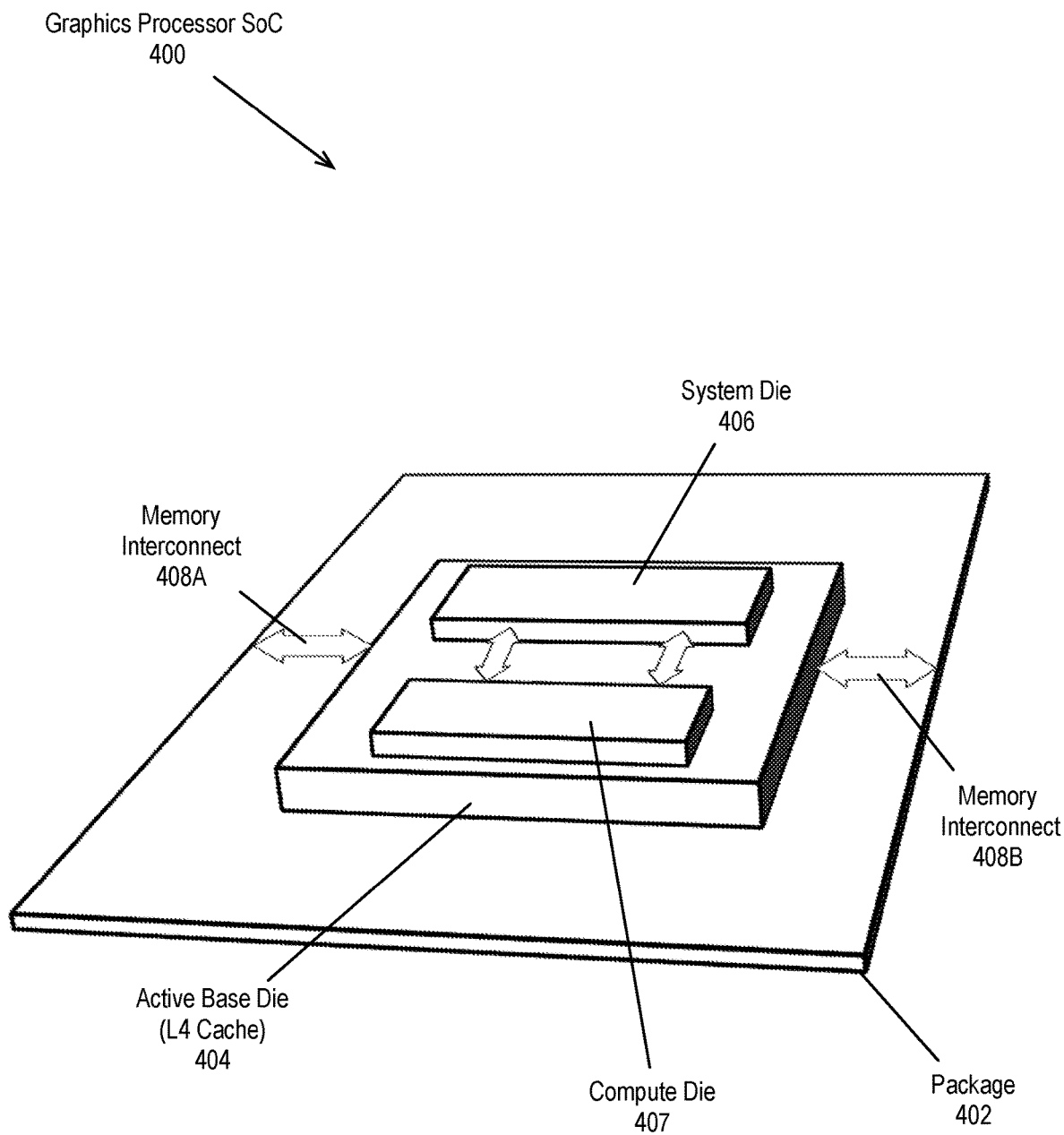
FIG. 4A-4C illustrate a disaggregated 3D-structured SoC architecture of a graphics processor SoC.
Figure 4B:
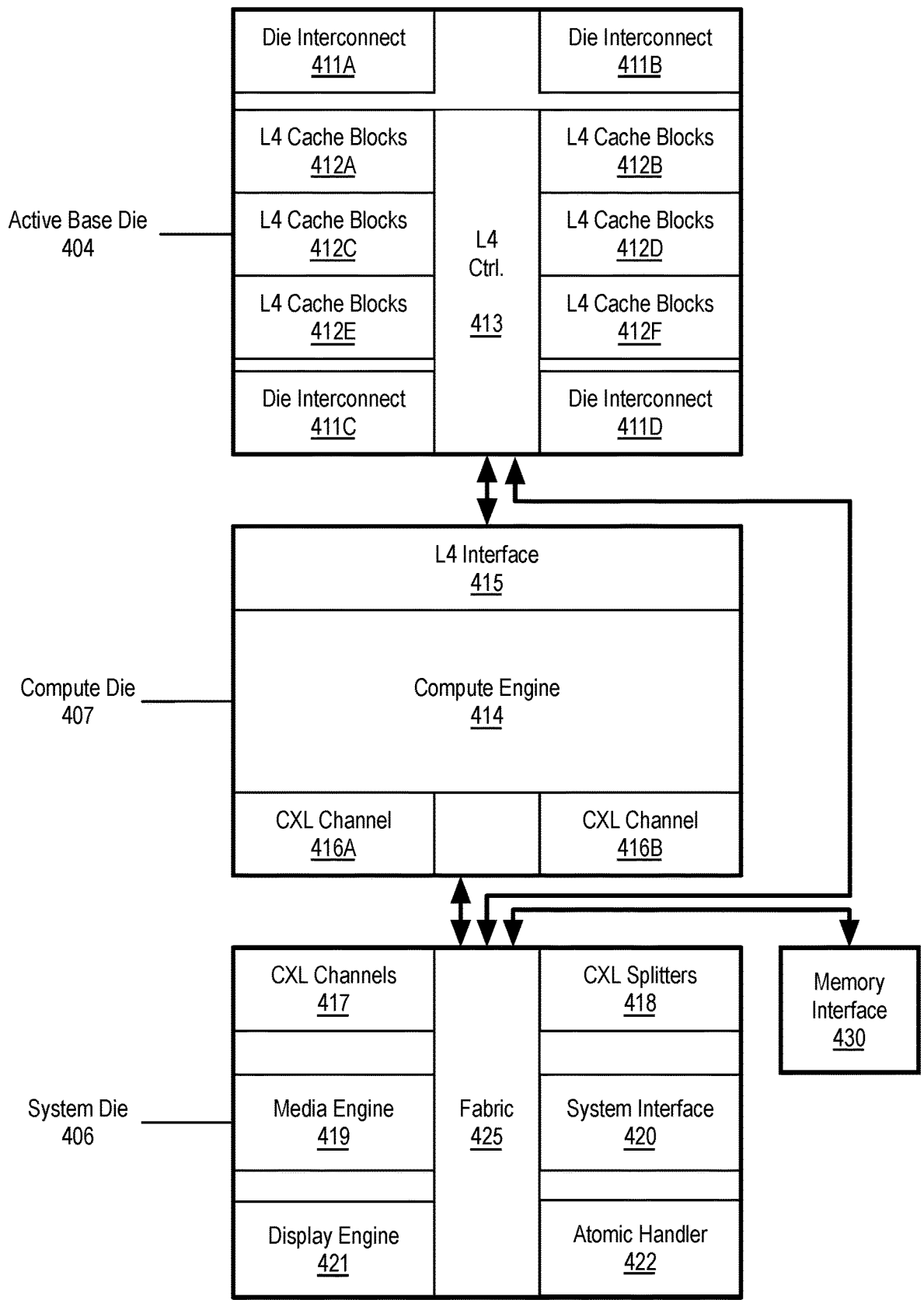
Figure 4C:
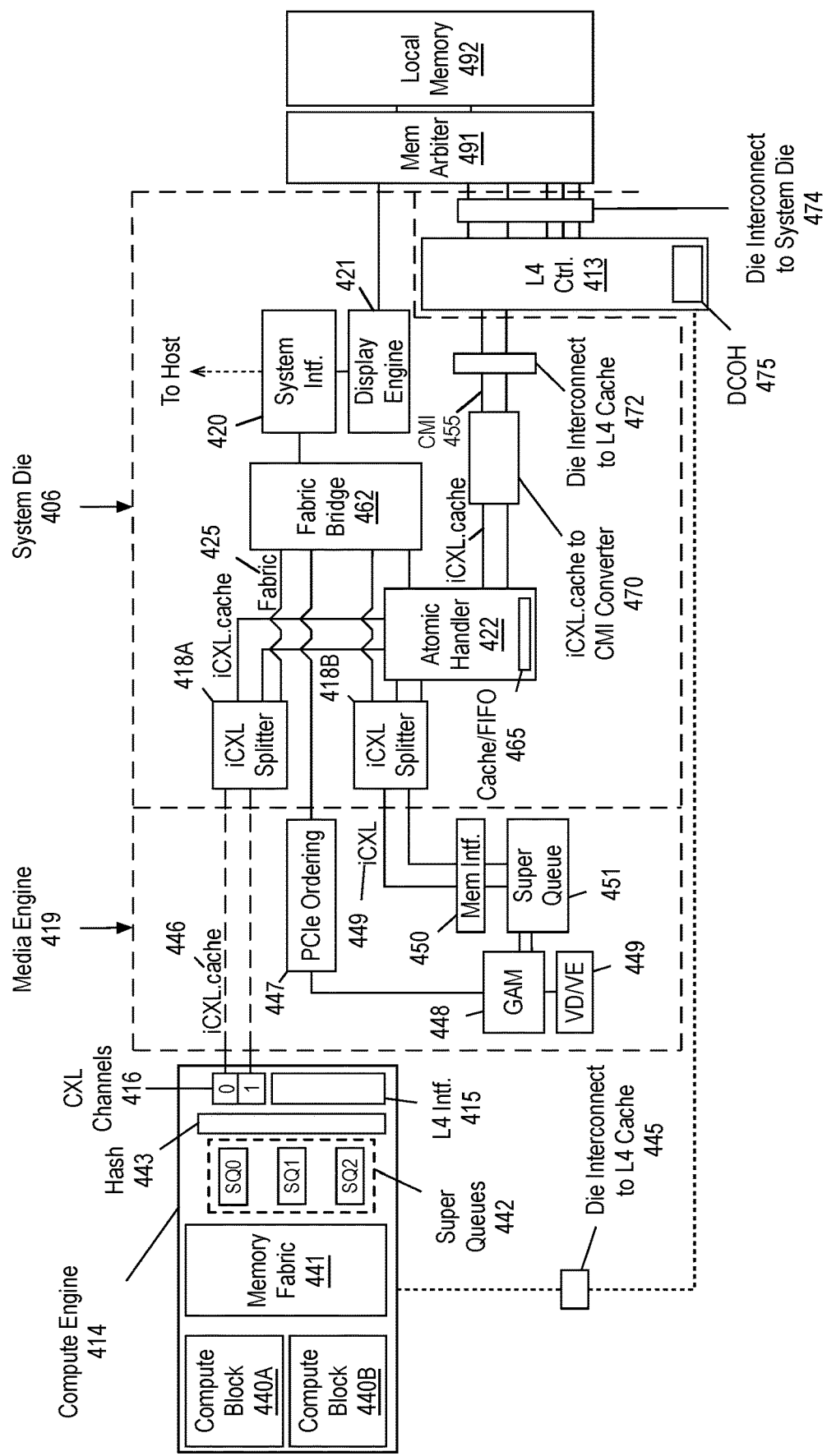

FIG. 4A-4C illustrate a disaggregated 3D-structured SoC architecture of a graphics processor SoC 400. As shown in FIG. 4A, the graphics processor SoC 400 includes a package substrate 402 having a bottom level cache die in the form of an active base die 404 that includes a level 4 (L4) cache memory. The active base die 404 interfaces with a compute die 407 and a system die 406 that are positioned on top of the active base die 404. The graphics processor SoC 400 includes memory interconnects 408A-408B that couple local device memory to the active base die 404 and the system die 406. The local device memory can be low power double data rate (LPDDR) or graphics DDR (GDDR) memory. In some embodiments, the local device memory can also be high bandwidth memory (HBM).

FIG. 4B shows additional architectural details for the active base die 404, system die 406, and compute die 407. In one embodiment the active base die 404 includes a set of die interconnects 411A-411D that couple circuitry within the active base die 404 to the system die 406 and the compute die 407. The die interconnects 411A-411D may be instances of the tile-to-tile interface 371 of FIG. 3. The active base die 404 also includes an L4 cache having a set of L4 cache blocks 412A-412F and an L4 cache controller 413. The L4 cache controller 413 caches data associated with memory accesses to the local device memory within the L4 cache blocks 412A-412F. The number of L4 cache blocks 412A-412F can vary based on the size of the L4 cache and L4 cache can be sized proportionally to the size of the local device memory. In one embodiment memory accesses performed by the compute engine 414 and the media engine 419 are serviced via the L4 cache, with the L4 cache controller 413 accessing the local device memory in the event of a cache miss. The L4 cache controller 413 accesses the local device memory via a memory interface 430 that connects with the local device memory via memory interconnects 408A-408B. In one embodiment, the memory interface 430 is an instance of the memory interface 382 of FIG. 3.

The compute die 407 includes a compute engine 414, L4 interface 415, and multiple CXL channels 416A-416B. The compute engine 414 includes general-purpose graphics processing elements in the form of one or more instances of the compute block 380 as in FIG. 3. The compute engine 414 is disaggregated from other components of the graphics processor SoC 400, which enables a modular architecture in which the processing capability of the graphics processor SoC 400 can be easily adjusted via the use of different implementations of the compute die 407. Additionally, different process technologies and/or different manufacturers can be used to manufacture different implementations of the compute die 407, without requiring significant adjustments to the active base die 404 or system die 406. The L4 interface 415 facilitates access by the compute engine 414 to the L4 cache. Cached memory accesses performed by the compute engine 414 to local device memory can be serviced via the L4 interface 415. The CXL channels 416A-416B enable coherent access to a common memory space that includes both local device memory and system memory. Atomic accesses by the compute engine 414 are performed via one or more of the multiple CXL channels 416A-416B.

The system die 406 includes multiple CXL channels 417 and CXL splitters 418, a media engine 419, system interface 420, display engine 421, an atomic handler 422, and a system fabric 425. The system fabric 425 includes the primary switch fabrics 352A-352C of FIG. 3. The CXL channels 417 include channels for various CXL protocols, including CXL.io, CXL.cache and/or CXL.memory, and include the CXL channels 416A-416B used by the compute die 407. The system die 406 also includes a set of CXL splitters 418, which can route CXL transactions to a handler for the transaction. For example, the CXL splitters 418 can route transactions from the compute engine 414 or the media engine 419 to a system interface 420, which can be used to access system memory over a host interface bus, or an atomic handler 422 that facilitates the performance of atomic operations to the system memory or local memory.

The media engine 419 includes functional units to perform media encode and decode operations. Multiple instances of the media engine 419 may be present. In one embodiment, the media engine 419 can also be disaggregated into a separate die. The display engine 421 facilitates presentation of framebuffer memory and enables control of display devices that are coupled over various physical display interfaces. The atomic handler 422 enables performance of atomic memory operations described herein.

Processing element end points, which include the compute engine 414 and media engine 419, support AtomicOp requester capabilities. The system interface 420 includes an upstream switch/port (e.g., USP 312 of FIG. 3) having support for AtomicOp routing capabilities. As used herein, the term "engine" may refer to hardware circuitry (e.g., processing resource, execution resource, execution unit, etc.) used to execute operations in the SoC. The compute engine and the media engine can split the AtomicOp opcode and issue opcodes that perform read-for-ownership operations and cache flush operations for cache lines associated with the atomic operation. The split commands are issued onto the CXL interface for servicing via either the system interface 420 or the L4 cache. Other data transfer interface protocols, such as peripheral component interconnect express (PCIe) may also be utilized in embodiments described herein, or a combination of data transfer interface protocols may be implemented (e.g., CXL used within the SoC, and PCIe utilized to communication between SoC and host).

Embodiments herein provide technical advantages over the conventional approaches by providing atomic transaction handling support provide for new disaggregated 3D-structure SoCs, improving performance and throughput of such an architecture. Implementations cover atomic handling when (1) the compute engine 414 issues atomic transactions, and (2) when the media engine 419 issues atomic transactions. When atomic transactions are issued by either the compute engine 414 or the media engine 419, the request goes to an atomic handler 422 in the system die 406.

As shown in FIG. 4C, the compute engine 414 includes multiple compute blocks 440A-440B, which each can be an instance of the compute block 380 of FIG. 3. The compute block 440A-440B couple with a memory fabric 441, which can include a memory crossbar. The compute engine 414 can also include one or more instances of a graphics address manager (GAM) and hash logic to hash memory accesses to one of multiple memory access nodes. Requests submitted via the memory fabric 441 are queued into one of multiple super queues 442, which store memory requests for memory transactions that miss internal caches of the compute blocks 440A-440B and/or the memory fabric 441. Atomic transactions are performed as CXL transactions. Additional hash circuitry 443 perform address-based hashing to select one or more of the CXL channels 416 over which a CXL transaction is to be performed. In one embodiment, non-atomic memory accesses are performed via the L4 interface 415. The L4 interface 415 couples with a die interconnect 445 to the L4 cache, which relays commands from the L4 interface 415 to the L4 cache controller 413 via a die interconnect between the compute die 407 and the active base die 404. The die interconnect 445 can include any one of die interconnects 411A-411B. Communication with the L4 cache controller 413 is performed over a converged memory interface (CMI).

The media engine 419 can be included within the system die 406 or disaggregated into a separate media die. The media engine 419 includes PCIe ordering logic 447 to manage ordering for transactions that will be submitted over a PCIe bus coupled with the system interface 420. The media engine 419 also include a graphics address manager (GAM 448) coupled with video decode/video decode circuitry (VD/VE 449). The GAM 448 can insert local memory access requests into a super queue 451 or route system memory accesses over the fabric 425 to the system interface 420. The media engine 419 can route local memory access requests over an iCXL bus that supports various CXL protocols.

The system die 406 includes various SoC level components that enable communication between components of the graphics processor SoC and between the graphics processor SoC and the host. The system die 406 includes a fabric bridge 462, which includes a version of the fabric bridge 313 of FIG. 3, and iCXL buses having support for various CXL protocols, including the iCXL.cache protocol 446, which is an implementation of the CXL cache protocol. The system die 406 also includes CXL splitters (iCXL 418A-418B) to process iCXL bus transactions received from the compute engine 414 and the media engine 419. The bus transactions, in one embodiment, are performed using the iCXL.cache protocol 446. The CXL splitters identifies a received transaction as either a system memory transaction or an atomic transaction. System memory transactions are serviced via the system interface 420 over the system fabric 425 via the fabric bridge 462. Atomic transactions are routed to the atomic handler 422.

The atomic handler 422 determines the destination of received transactions as either the to the system memory or the local memory. The atomic handler receives an atomic transaction, decodes the transaction, determines the source of the transaction (e.g., compute engine 414, media engine 419), and determines whether the transaction needs to go to system memory (e.g., host memory) or local memory (e.g., L4 cache, etc.). In one implementation, the atomic transaction includes flags or fields that indicate the memory to which the atomic transaction is directed. The atomic handler then sends the appropriate opcodes to perform the atomic operations, tracks completion status for in-flight atomic operations, and sends completions back to the source. In some embodiments, the atomic handler may include a cache/FIFO 465 to enable the atomic handler 422 to handle multiple incoming atomic transactions and maintain the order of the incoming atomic transactions.

As atomic operations are performed using iCXL.cache protocol 446 and the L4 controller 413 uses a CMI 455 interface, atomic transactions are translated from iCXL-.cache to CMI via an iCXL.cache-to-CMI converter 470.

The resulting CMI commands are relayed to the L4 cache controller 413 via a die interconnect 472 to the L4 cache, which can include any one of die interconnects 411A-411D. The L4 cache controller 413 communicates with the memory arbiter 491 for the device local memory 492 via a die interconnect 474 to the system die 406, which can include any one of die interconnects 411A-411D.

In one embodiment, the L4 cache controller includes a device coherency agent (DCOH 475), which is responsible for resolving coherency with respect to the L4 cache, as well as managing host/device bias states for coherent memory. The host/device bias states are relevant for managing access to device-attached memory, such as the local memory 492. Host bias mode can be used when operands are being written to memory by the host during work submission or when results are being read out from the memory after work completion. During host bias mode, coherency flows allow for high throughput access from the host to the local memory 492. During workload execution, device bias mode is used to enable the device to access the local memory 492 without consulting the host's coherency engines. The host can still access the local memory 492 but may be forced to give up ownership by the device. The DCOH 475 can be configured to autonomously manage the host/device bias state for the local memory 492 and associated cache lines in the L4 cache.

Figure 5A:
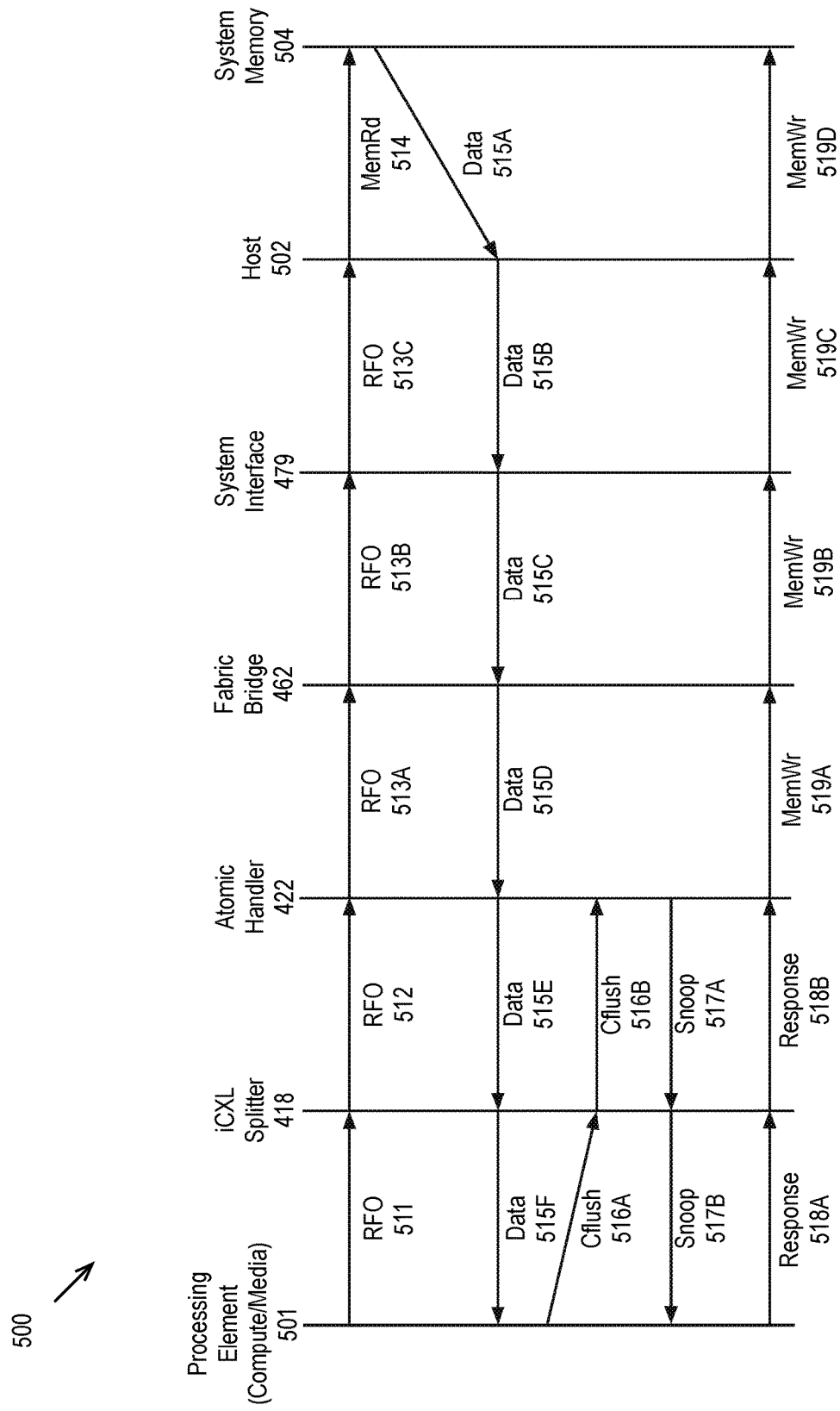
FIG. 5A-5B illustrate transaction flows for atomic operations to system memory and local memory.
Figure 5B:
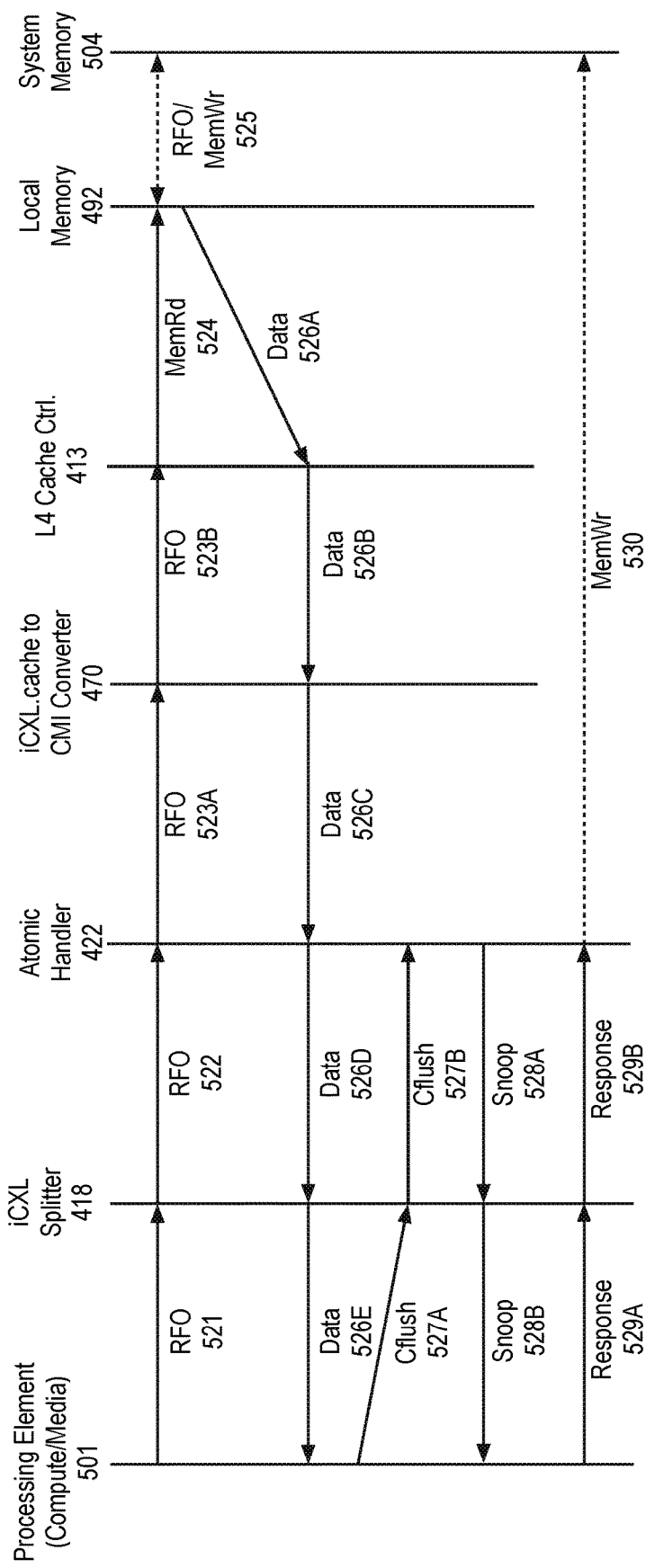

FIG. 5A-5B illustrate transaction flows 500, 520 for atomic operations to system memory and local memory. FIG. 5A illustrates the transaction flow 500 between a processing element 501, such as the compute engine 414 or media engine 419, and system memory 504. FIG. 5B illustrates the transaction flow 520 between a processing element 501 and local memory 492.

As shown in FIG. 5A, transaction flow 500 begins at a processing element 501 and ends at the system memory 504. Transaction flow 500 traverses the iCXL splitter 418, atomic handler 422, the fabric bridge 462, and the system interface 479 before reaching the host device 502. A system memory access handler on the host device 502, which may be a host processor or dedicated CXL transaction handler, can relay transactions to the system memory 504. The processing element 501 can perform a read-for-ownership operation (RFO 511). The read-for-ownership operation combines a read and an invalidate broadcast that performs a read of a memory address with the intent to perform a subsequent write to that memory address. The read-for-ownership operation reads data at a memory address into a cache line (e.g., within the processing element 501) and causes all other caches to set the state of cache lines associated with that memory address to invalid. The iCXL splitter 418 determines that RFO 511 is associated with an atomic operation (e.g., Fetch and Add, SWAP, CAS, etc.) and issues RFO 512 to the atomic handler 422. In various embodiments, RFO 512 can be a relay of RFO 511 or can include modifications to RFO 511. The atomic handler 422 determines that RFO 512 is destined for the system memory 504. A series of read-for-ownership commands (RFO 513A-513C) is propagated through the fabric bridge 462, system interface 479, and host device 502. The host device 502 can the issue a memory read (MemRd 514) command to the system memory 504. Data 515A-515D is then returned from the system memory 504 back to the atomic handler 422 via the host device 502, system interface 479, and fabric bridge 462. The atomic handler 422 then returns data 515E to the iCXL splitter 418, which transmits data 515F to the processing element 501.

The processing element 501, after receiving data 515F, can perform a processing operation to modify the data and write the modified data to a cache within the processing element 501. The processing element 501 then causes a cache flush (Cflush 516A-516B) to write the modified data back to memory, which in one embodiment may be a portion of local memory 492 that is configured as a cache for data in a coherently shared pool of system memory 504, or in another embodiment, a dedicated atomic cache that is used for atomic operations to the system memory 504. In response to the flush, the atomic handler 422 can send a snoop 517A-517B (e.g., CXL SnpData, SnpIv, SnpCur) to the processing element 501 via the iCXL splitter 418 to determine whether there is any data in the local memory that is associated with the system memory address. The processing element 501 sends a response 518A-518B to the snoop to the atomic handler 422 via the iCXL splitter 418, which then is routed to system memory 504 by the atomic handler 422 (via the host device 502) as a memory write (MemWr 519A-519D) and transaction ends.

As shown in FIG. 5B, transaction flow 520 for an atomic operation from the processing element 501 to local memory 492 utilizes the iCXL.cache-to-CMI converter 470 and L4 cache controller 413 to route a read-for-ownership (RFO 523A-523B) for an atomic transaction. The atomic transaction begins with a read-for-ownership (RFO 521) sent from the processing element 501 to the iCXL splitter 418. The iCXL splitter 418 then sends RFO 522 to the atomic handler 422. In various embodiments, RFO 522 can be a relay of RFO 521 or can include modifications to RFO 521. The atomic handler 422 can determine that the RFO is for data stored in the local memory 492 and send the read-for-ownership (RFO 523A-523B), which is routed via the iCXL.cache-to-CMI converter 470 to the L4 cache controller 413. If the data for the atomic operation is stored in the L4 cache, the L4 cache controller 413 can return the data 526B. If the read misses the L4 cache, the L4 cache controller 413 can send a memory read (MemRd 524) to the local memory 492, which returns data 526A to the L4 cache controller 413, which can cache the returned data in the L4 cache. The DCOH 475, which manages coherency between the device and the host for operations to the local memory 492, will send a message to the host to invalidate any host-cached versions of the data that is the target of the RFO commands. The DCOH 475 can also initiate a bias flip operation from host bias to device bias if the target of the RFO command is held in host bias mode. An RFO/MemWr transition 525 can be performed for system memory 504 (via the host device 502) to take ownership of the relevant portion of the local memory 492 and to receive any modified data held by the host device 502 or system memory 504. The modified data can be used to update the local memory 492 before the data 526A is returned by the local memory 492.

The processing element 501 can, after receiving the data from the memory read and performing computations for the atomic operation, can cause a cache flush (Cflush 526A-526B), which causes a write of the data back to memory. In response to the flush, the atomic handler 422 can send a snoop 528A-528B to the processing element 501 to maintain coherency between the local memory 492 and the system memory 504. The processing element 501 sends a response 529A-529B back to the atomic handler 422 via the iCXL splitter 418. The response is then routed to the system memory 504 by the atomic handler 422 as a memory write (MemWr 530), completing the transaction.

Device Cache for Non-Device Memory Atomic Operations

As described above, the CXL.cache protocol defines interactions between the host and a device to allow the device to cache host memory. This access is coherent. The CXL protocol provided mechanisms to maintain coherency of data within a memory pool that is shared between the device and the host or another connected device that has memory that is accessible via the CXL.cache or CXL.memory protocol. When atomic operations are to be performed by the device to non-local/non-device memory, a read for ownership of the target memory address of the atomic is requested by the device, allowing the device to modify the shared data.

One embodiment provides a device-side atomic cache that can temporarily store host data that will be the target of an atomic operation. Once an atomic operation is performed, the device can perform further modifications of the data while the data is stored in the device-side atomic cache. The device can then subsequently evict the data from the atomic cache back to host memory.

Figure 6A:
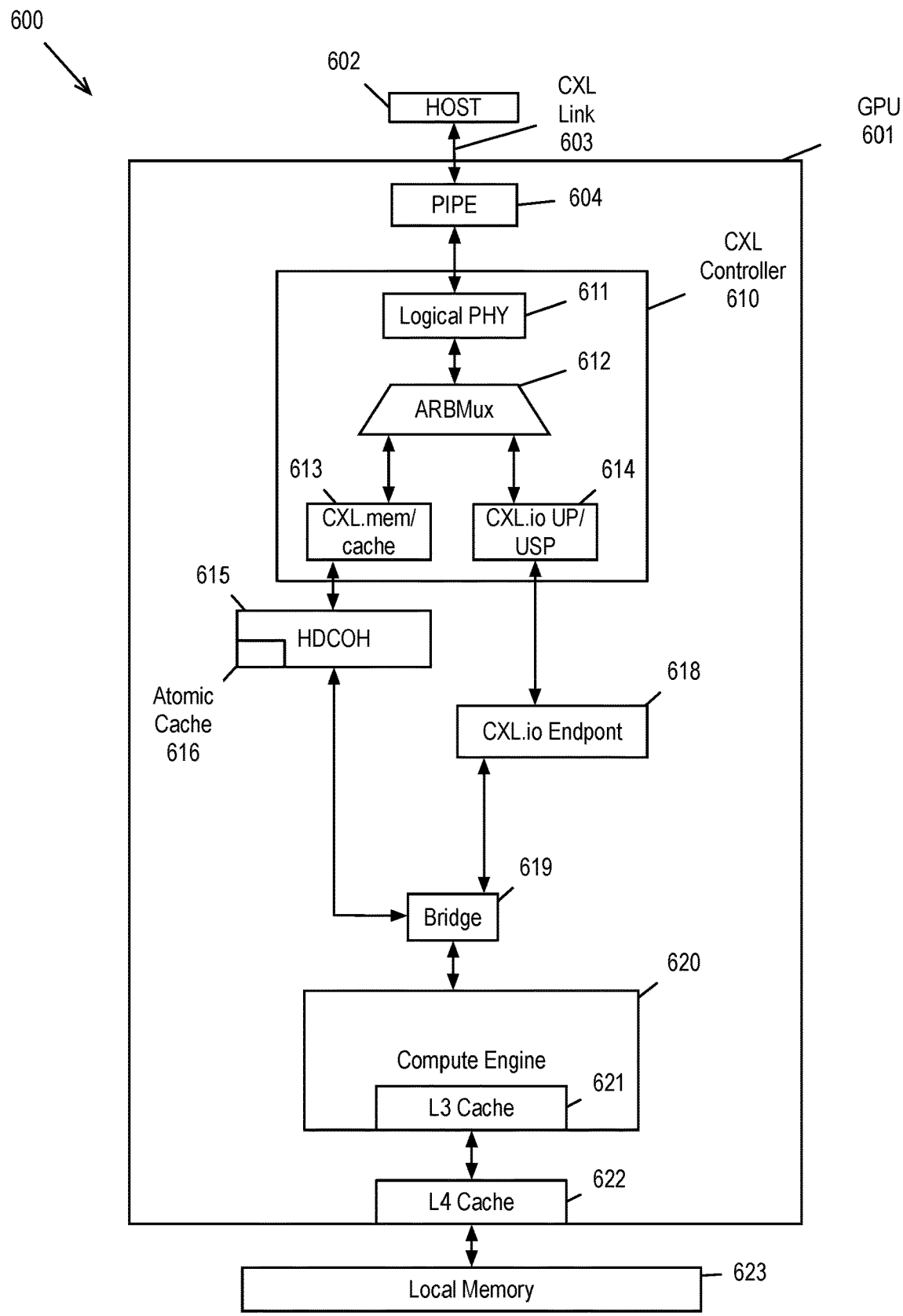
FIG. 6A-6C illustrates device-side caching of data associated with atomic operations to non-device memory, according to embodiments.
Figure 6B:
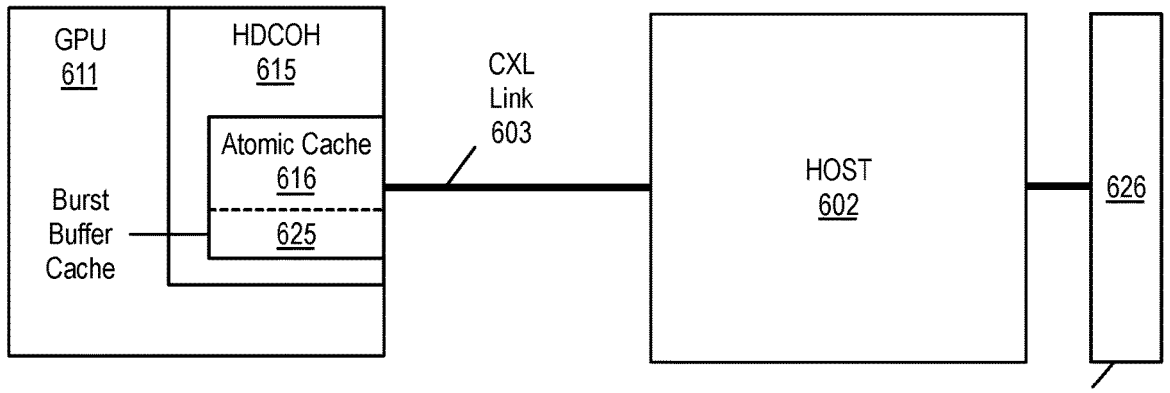
Figure 6C:
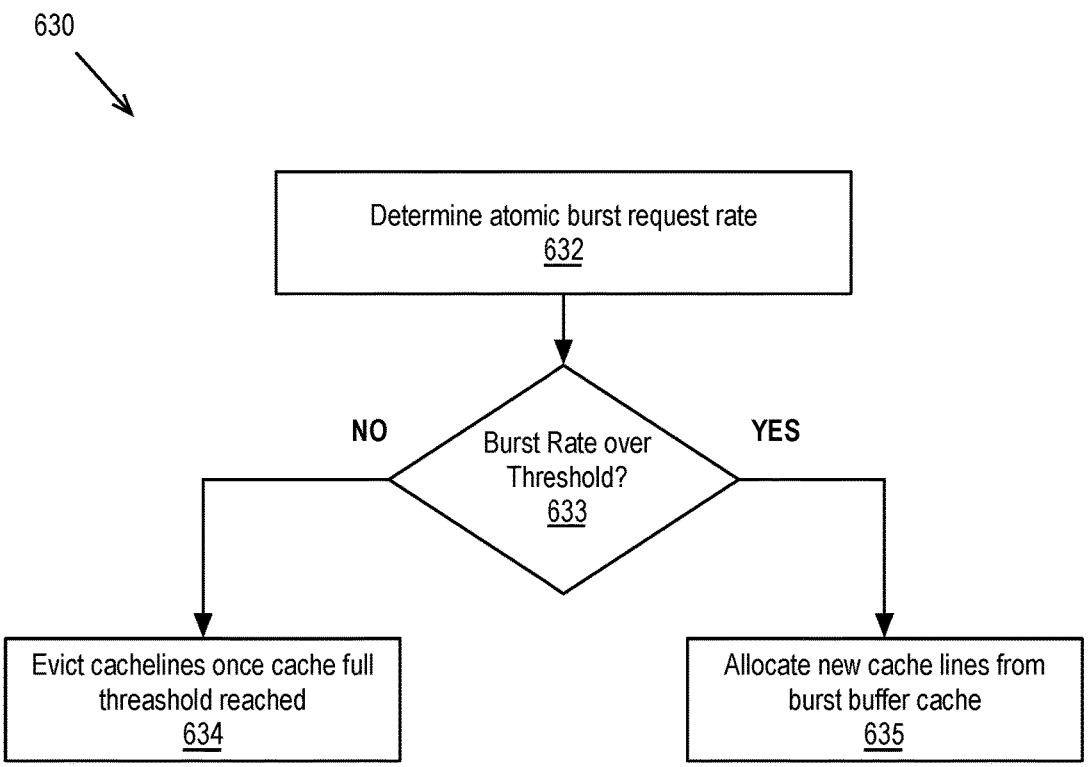

FIG. 6A-6C illustrates device-side caching of data associated with atomic operations on non-device memory, according to embodiments. FIG. 6A illustrates a system 600 in which a GPU 601 includes an atomic cache 616 to store data associated with non-device atomic operation. FIG. 6B illustrates a burst buffer cache for a device-side atomic cache. FIG. 6C illustrates a method 630 of enabling the burst buffer cache based on atomic burst rate. While operations will be described below with respect to memory attached to a host processor, the techniques can also be applied for atomic operations performed to any non-device memory, such as atomic transactions between a GPU and memory associated with another CXL device.

As shown in FIG. 6A, one embodiment provides a system 600 including a host 602, GPU 601, and GPU-attached local memory 623. A CXL link 603 carries messages for various CXL protocols between the host 602 and the GPU 601GPU 601. The CXL link 603 may be, in one embodiment, a CXL 2.0 link that established over PCIe 5.0. However, the techniques described herein are applicable to other versions of CXL and PCIe, or any other device to host interconnect with support for graphics processor devices. The GPU 601 includes an interconnect pipeline 604 that includes, in one embodiment, a physical interconnect (PHY) to a system interconnect, such as PCIe.

The GPU 601 also includes a CXL controller 610, a CXL.io endpoint 618. The CXL controller 610 includes a logical PHY 611 and an arbitrator/multiplexor (ARBMux 612), which interconnects CXL.cache/memory 613 channels and a CXL.io upstream port/Upstream switch port 614 with the logical PHY 611. To maintain coherency for CXL.cache operations, the GPU 601 includes a host memory DCOH (HDCOH 615), which is a device coherency agent that manages coherency for cache lines associated with host memory or other non-local/non-device memory, in a similar manner that the DCOH 475 of FIG. 4C manages coherency for cache lines associated with local memory 623. In one embodiment, the host 602 also includes structures similar to the DCOH 475 and HDCOH 615. In one embodiment, the interconnect pipeline 604, CXL controller 610, HDCOH 615, and CXL.io endpoint 618 reside in the system interface 420 of FIG. 4B-4C. The HDCOH 615 and CXL.io endpoint 618 connect with a bridge 619, which in one embodiment is the fabric bridge 462 of FIG. 4C.

The GPU 601 also includes a compute engine 620, which can be a version of implementation of the compute engine 414 of FIG. 4B-4C. The compute engine 620 can include or couple with a level 3 (L3) cache 621. The GPU 601 can also include an L4 cache 622, which can include the L4 cache blocks 412A-412F and L4 controller 413 of FIG. 4B. The GPU 601 couples with a local memory 623, which can be an instance or version of the local memory 492 of FIG. 4C and FIG. 5B. The GPU 601 can couple with the local memory 623 via the memory interconnects 408A-408B of FIG. 4A and the memory interface 430 of FIG. 4B.

The atomic cache 616 of the HDCOH 615 is used to store data read from host memory that is the target of any atomic operation that can be performed using CXL or an equivalent interconnect. In one configuration, when an atomic operation request is initiated (e.g., via atomic handler 422), the atomic cache 616 is checked to determine if the target of the operation is already stored in the cache. If a hit occurs, the atomic operation can be performed in the atomic cache 616 without requiring a CXL transaction to access host memory. If a miss occurs, the HDCOH 615 can perform an RFO for the cache lines associated with the target of the atomic operation, as described above for FIG. 5A. The received data will be added to a newly allocated cache line or will replace an existing cache line. For coherent read-modify-write atomic operations, evicted cache lines will store modified data that will be written back to the host upon eviction. The upstream traffic caused by these modified cache line evictions can reduce the overall bandwidth available for CXL device cacheable reads.

Embodiments described herein improve the performance of CXL transactions for the GPU by employing 1) a burst buffer cache that provides additional cache space during bursts of atomic operations, and 2) a dynamically determined cache full threshold that specifies when cache lines will be evicted from the cache. These techniques provide the technical advantage of improved performance for atomic transactions/synchronization between processors of the host 602 and the GPU 601.

Burst Buffer Cache

As shown in FIG. 6B, in one embodiment the HDCOH 615 includes the atomic cache 616 and a burst buffer cache 625 that are used to cache data that is read from non-device memory 626 in conjunction with an atomic operation. The non-device memory 626 can be host memory or host managed memory of an attached CXL device (e.g., via the CXL.mem protocol). In one embodiment, the burst buffer cache 625 is a configurable percentage (e.g., ~30%) of the atomic cache 616 that is reserved for use as the burst buffer cache 625. In one embodiment, the burst buffer cache 625 is a portion of a separate cache or memory that can be accessed for short durations. For example, in one embodiment a portion of the L3 cache 621, L4 cache 622, or local memory 623 can be allocated for use as the burst buffer cache 625.

In one embodiment, CXL transaction flow is similar to transaction flow 500 of FIG. 5A and transaction flow 520 of FIG. 5B, excepting that a cache flush operation (Cflush 515B, Cflush 525B) received at the atomic handler 422 can cause a flush of cache lines from the atomic cache 616 or burst buffer cache 625. Snoop operations may hit the atomic cache 616 or burst buffer cache 625 before being relayed by the atomic handler 422 to the processing element 501.

As shown in FIG. 6C, the burst buffer cache can be enabled based on an atomic burst rate for atomic transactions according to method 630. During operation, control logic for the atomic cache 616, which in one embodiment resides in the HDCOH 615, can regularly determine an atomic burst request rate (block 632). The atomic burst request rate can be determined as an instantaneous rate in terms of a number of atomic requests that are received over a given time period. The atomic burst request rate may also be determined based on a sliding window. In one embodiment, the atomic burst request rate is determined based on the occupancy of an inbound atomic request buffer of the GPU 601. The sampled atomic request buffer can be, for example, the cache/FIFO 465 of the atomic handler 422, as shown in in FIG. 4C, or another buffer of atomic requests within the atomic request pipeline of the GPU 601. When the atomic burst rate is determined to be under the threshold (block 633, "NO"), the HDCOH 615, or other controller logic for the atomic cache 616, can begin to evict data maintain data in the atomic cache once a cache full threshold is reached (634).

When below the burst rate threshold, writebacks due to cache line evictions do not negatively impact CXL cached read throughput. The burst rate threshold can be determined based on a percentage of the maximum available CXL throughput, or another value beyond which it has been determined that writebacks due to cache line evicts begin to negatively impact CXL cached read throughput. The cache full threshold can be a dynamic threshold that is determined based on multiple cache parameters. The cache parameters can include, in one embodiment, the amount of space in the atomic cache 616 that is reserved for the burst buffer cache when the burst buffer cache 625 is allocated from reserved space in the atomic cache. Additionally, the cache full threshold can also be adjusted based on cache performance as a tradeoff between delaying eviction of a cache line from the atomic cache 616 (e.g., to enable potential re-use) and immediate eviction of the cache line after atomic operations (e.g., to reduce snoop requests from the host).

When the burst rate exceeds the threshold (block 633, "YES"), control logic for the atomic cache 616 can enable the burst buffer cache and enable allocation of new cache lines from the burst buffer cache (block 635). In this mode of operation, the cache control logic for the atomic cache 616 can adjust the cache replacement algorithm to deprioritize (or disable) dirty eviction and writebacks to preserve the CXL bandwidth that would otherwise be consumed by writebacks caused by eviction of modified cache lines from the atomic cache 616. Evictions caused by host snoops can continue as normal to prevent the stalling of host processor operations. However, instead of performing cache line replacement for new atomic operations, space will be allocated in the burst buffer cache 625 until the burst rate falls below the threshold or the burst buffer cache 625 becomes full. Once the burst buffer cache 625 becomes full, cacheline evictions can resume at the standard rate. However, the additional space provided by the burst buffer cache 625 will remain available until the atomic burst rate falls below the threshold. When the atomic burst rate falls below the threshold, the cache lines stored in the burst buffer cache 625 can be evicted to the host to prepare for the next atomic burst. In one embodiment, a limited number of dirty eviction and writeback operations can be performed in conjunction with allocation of new cache lines from the burst buffer cache. The balance between eviction and burst buffer allocation can be dynamically adjusted based on the atomic burst rate.

Dynamic Cache Full Threshold

In one embodiment, a dynamic cache full threshold is used to tune the performance of the atomic cache 616. Conventional caching is performed to enable latency or bandwidth improvement for memory operations performed by processing resource. Accordingly, the cache replacement policies for those caches attempt to maximize cache reuse. In contrast, the atomic caching is performed to enable system-level atomics, in which a device exploits hardware coherency semantics to perform atomic operations on host memory or other non-device in-place on memory that is local to the device. Hence, the considerations for replacement of cache lines in atomic cache are not same as in regular caches. For example, the atomic operations may be temporal operations in which the target of the atomic is expected to be re-used by the device or may be non-temporal operations in which the data is unlikely to be re-used. There is little benefit to retaining data in the atomic cache 616 that will not be re-used by the device. Additionally, the host processor will be required to send snoop requests to the device to determine a current value of the data or re-obtain ownership of the data for host processor modification. Accordingly, optimizing only for cache reuse can negatively impact CPU performance due to the latency introduced for snoop operations performed over the CXL link 603. However, if the cache access patterns suggest a high degree of temporality, it may be beneficial to retain cache lines for a longer period of time.

Figure 7A:
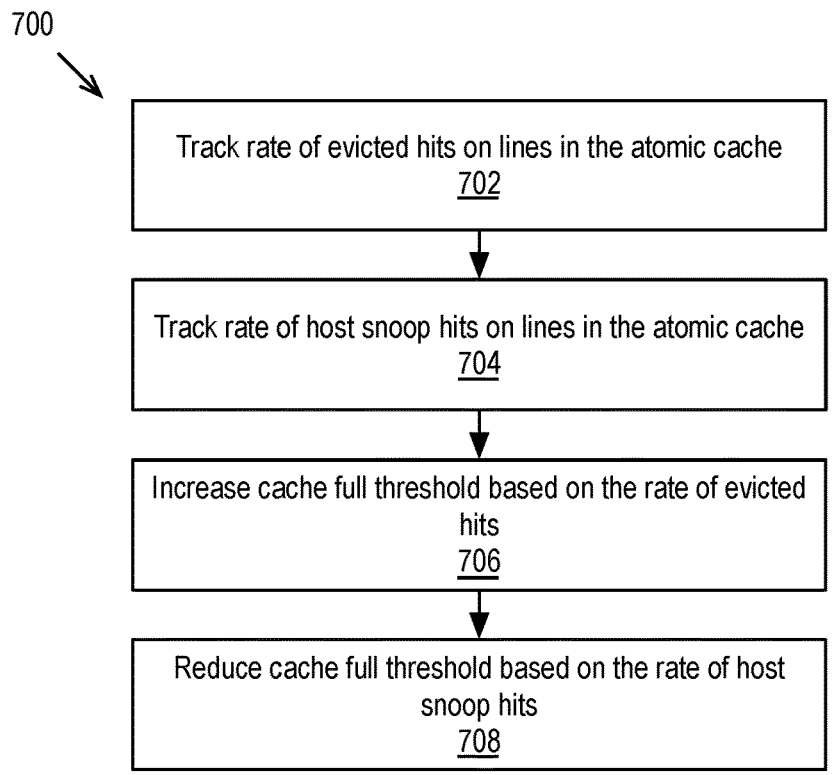
FIG. 7A-7B illustrate methods to improve the efficiency of device-side caching of data associated with atomic operations non-device memory, according to embodiments.
Figure 7B:
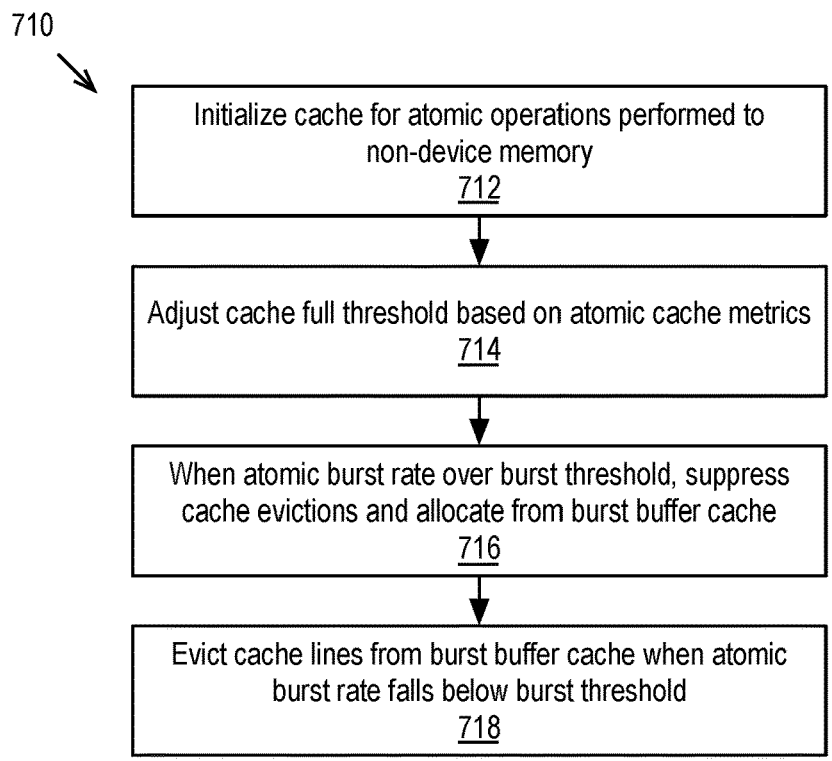

FIG. 7A-7B illustrate methods 700, 710 to improve the efficiency of device-side caching of data associated with atomic operations non-device memory, according to embodiments. FIG. 7A illustrates a method 700 of dynamic cache allocation to boost atomic efficiency over CXL. FIG. 7B illustrates a method 710 of atomic cache operation for non-device memory using a variable cache full threshold and the burst buffer cache. Methods 700, 710 are performed by control logic of the atomic cache 616 of FIG. 6A-6B.

Method 700 is performed to balance the tradeoffs between delaying eviction of a cache line in the atomic cache 616 vs. immediate eviction of the cache line after performing atomic operation. The tradeoff is performed, in one embodiment, by adjusting the cache full threshold that is used to determine when to evict cache lines under non-burst scenarios. For example, the cache full threshold can be set to less than the maximum capacity of the cache, notwithstanding any space reserved for use as a burst buffer cache 625. If threshold is 50%, cache control logic in the HDCOH 615 will not evict any cache lines from the atomic cache 616 until the cache is 50% occupied. Once the cache full threshold is reached, cache lines will be evicted from the atomic cache 616 to make space for incoming reads for atomic operations.

As shown in FIG. 7A, method 700 includes to track the rate of evicted hits on lines in the atomic cache (block 702) and to track the rate of host snoop hits on lines in the atomic cache (block 704). The atomic cache 616 is configured to track content addressable memory (CAM) hits to invalid cache lines to maintain evicted hit metrics. An evicted hit indicates that the data that was previously stored in this cache line would have been a hit for a new atomic request, which indicates that the device would have re-used the data stored in the cache. Instead, the device has to re-request ownership of the data from the host device before another atomic operation can be performed on that address. Thus, atomic execution bandwidth would have improved had the cache line not been evicted. However, a snoop hit on a cache line indicates that the host either wishes to read the current value of the cached data (e.g., CXL.cache SnpData or SnpCur requests) or wishes to write to the data (e.g., CXL.cache SnpInv request). The CXL snoop introduces latency on operations of the host processor and could have been avoided if the cache line holding the data had been evicted and written back to the host. Accordingly, method 700 includes for the cache control logic to increase the cache full threshold based on the rate of evicted hits (block 706) and reduce the cache full threshold based on the rate of host snoop hits (block 708). In various embodiments, the cache full threshold may be adjusted after determined time intervals or upon expiration of other determined windows.

As shown in FIG. 7B, method 710 includes for cache control logic for the atomic cache to initialize the cache for atomic operations performed to non-device memory (block 712). The cache control logic can adjust the cache full threshold for the atomic cache based on atomic cache metrics (block 714), which can be performed according to method 700 of FIG. 7A. Additionally, when the atomic burst rate is over a burst threshold, the cache control logic can suppress cache evictions and allocate cache lines from the burst buffer cache (block 716), which can be performed according to method 630 of FIG. 6C. The cache control logic can then evict cache lines from the burst buffer cache when the atomic burst rate falls below the burst threshold (block 718).

According to the disclosure above, an apparatus is provided, such as a graphics processor device, that includes a semiconductor substrate, a plurality of memory dies, a set of parallel processor dies mounted on the semiconductor substrate, a local memory interconnect to couple the set of parallel processor dies to the plurality of memory dies, the local memory interconnect comprising a plurality of memory interfaces, each memory interface associated with a memory die of the plurality of memory dies. At least one parallel processor die of the set of parallel processor dies includes an interconnect fabric comprising one or more crossbar switches and an input/output interface coupled with the interconnect fabric. The set of parallel processor dies, in one embodiment, includes a graphics processor compute engine and one or more media engines. The graphics processor compute engine and the one or more media engines are configured to execute instructions to perform one or more atomic read-modify-write operations to the plurality of memory dies and to a memory that is external to the apparatus and connected to the graphics processing resources via the input/output interfaces.

In a further embodiment, a system on a chip integrated circuit (SoC) is provided that includes an active base die including a first cache memory, a first die mounted on and coupled with the active base die, and a second die mounted on the active base die and coupled with the active base die and the first die. The first die includes an interconnect fabric, an input/output interface, and an atomic operation handler. The second die includes an array of graphics processing elements and an interface to the first cache memory of the active base die. At least one of the graphics processing elements are configured to perform, via the atomic operation handler, an atomic operation to a memory device.

In one embodiment, the first die includes media engine configured to perform an atomic operation to the memory device. In one embodiment, the media engine is included within a third die that is coupled with the first die. In one embodiment, the memory device is coupled with the second die via the first die. In one embodiment, the memory device is a first memory device included on the SoC and the first cache memory is configured to cache accesses to the first memory device. In one embodiment, the memory device is a second memory device coupled with a host processor and accessible via the input/output interface.

The SoC can additionally include a second cache memory to cache data associated with the atomic operation performed to the second memory device. The second cache memory can be is associated with a burst buffer cache that is enabled when a rate of incoming atomic requests exceeds a burst rate threshold. In one embodiment, in response to a determination that the rate of incoming atomic requests exceeds the burst rate threshold, control circuitry associated with the second cache memory is configured to adjust a cache replacement policy associated with the second cache memory to deprioritize eviction of modified cache lines and allocate a cache line in the burst buffer cache to store data for an incoming atomic request. In one embodiment, the burst buffer cache is a reserved portion of the second cache memory.

In one embodiment, the atomic operation to the memory device is a read-modify-write operation and the atomic operation handler is configured to perform a read-for-ownership operation to obtain coherency ownership of data associated with the atomic operation in response to a request from the at least one of the graphics processing elements, where the at least one of the graphics processing elements is configured to modify the data associated with the atomic operation and the atomic operation handler is configured to perform a write operation to write modified data to the memory device.

In some aspects, the techniques described herein relate to a method performed on a system on a chip integrated circuit (SoC) that includes processing resources configured to perform graphics and media operations. The method comprises receiving, on the SoC, a memory access request to access a memory address; routing the memory access request within the SoC according to an access type associated with the memory access request and a memory device associated with the memory address, where routing the memory access request includes: routing the memory access request to an atomic handler of the SoC in response to a determination that the access type is atomic, where the atomic handler is to track completion of atomic memory accesses performed by the processing resources; and routing the memory access request to system interface of the SoC in response to a determination that the access type is non-atomic and the memory device is a system memory device coupled with a host processor, where the host processor is accessible via the system interface and the system interface couples the SoC to a host interconnect bus.

In one embodiment, the access type is atomic, the memory device is the system memory device, and the method further comprises: transmitting, via the atomic handler, a request for coherency ownership to the system memory device, the request transmitted via the system interface; receiving a response to the request for coherency ownership via the system interface; transmitting data received via the system interface in response to the request for coherency ownership to a source of the memory access request; and transmitting modified data received from the source of the memory access request to the system memory device via the memory interface.

In one embodiment, the access type is atomic, the memory device is the system memory device, and the method further comprises: transmitting, via the atomic handler, a request for coherency ownership to a coherency manager of the SoC, the coherency manager to manage coherency for accesses by the SoC to the system memory; determining, by the coherency manager, whether data for the memory address is cached within an atomic cache of the SoC; performing, by the coherency manager, a cache hit operation in response to determining that the data for the memory address is cached within a valid cache line of the atomic cache; and otherwise performing, by the coherency manager, a cache miss operation.

In one embodiment, the method further comprises creating, via the atomic handler, a tracking entry to track completion of the memory access request; receiving a completion notice to indicate completion of a write of modified data to the system memory device; and deleting, via the atomic handler, the tracking entry. In one embodiment, the cache hit operation includes returning data stored within the valid cache line of the atomic cache to the atomic handler. In one embodiment, the cache miss operation includes: transmitting, via the coherency manager, the request for coherency ownership to the system memory device, the request transmitted via the system interface; receiving a response to the request for coherency ownership via the system interface; storing data received via the system interface in response to the request for coherency ownership to the atomic cache; and transmitting the data to the atomic handler.

In one embodiment, the access type is atomic, the memory device is a local memory device, and the method further comprises: transmitting, via the atomic handler, a request for coherency ownership to a protocol translator circuit of the SoC and translating, via the protocol translator circuit of the SoC, the request for coherency ownership from a first interconnect protocol to a second interconnect protocol. The first interconnect protocol is associated with the atomic handler and the second protocol is associated with a local memory cache of the SoC, where the local memory cache is configured to cache memory accesses to the local memory device.

In one embodiment, the atomic handler resides on a first die of the SoC the local memory cache resides on an active base die of the SoC, and first die is mounted on and coupled with the active base die.

One embodiment provides a data processing system comprising a system interconnect to facilitated communication with a host processor device, the host processor device coupled with a host memory and a system on a chip integrated circuit (SoC) coupled with the system interconnect. The SoC includes an active base die including a first cache memory; a first die mounted on and coupled with the active base die, the first die including an interconnect fabric, an input/output interface, an atomic operation handler, and a memory interface to a device memory; and a second die mounted on the active base die and coupled with the active base die and the first die. The second die includes an array of graphics processing elements and an interface to the first cache memory of the active base die. At least one of the graphics processing elements are configured to perform, via the atomic operation handler, a first atomic operation to the host memory and a second atomic operation to the device memory. In one embodiment, the first die includes media engine configured to perform a third atomic operation to the host memory and a fourth atomic operation to the device memory. In one embodiment, the media engine is instead included on a third die that is coupled with the first die.

Other embodiments may also be provided according to the techniques described above and can be implemented using the CPU and GPU system architecture described below.

CPU and GPU System Architecture

Figure 8:
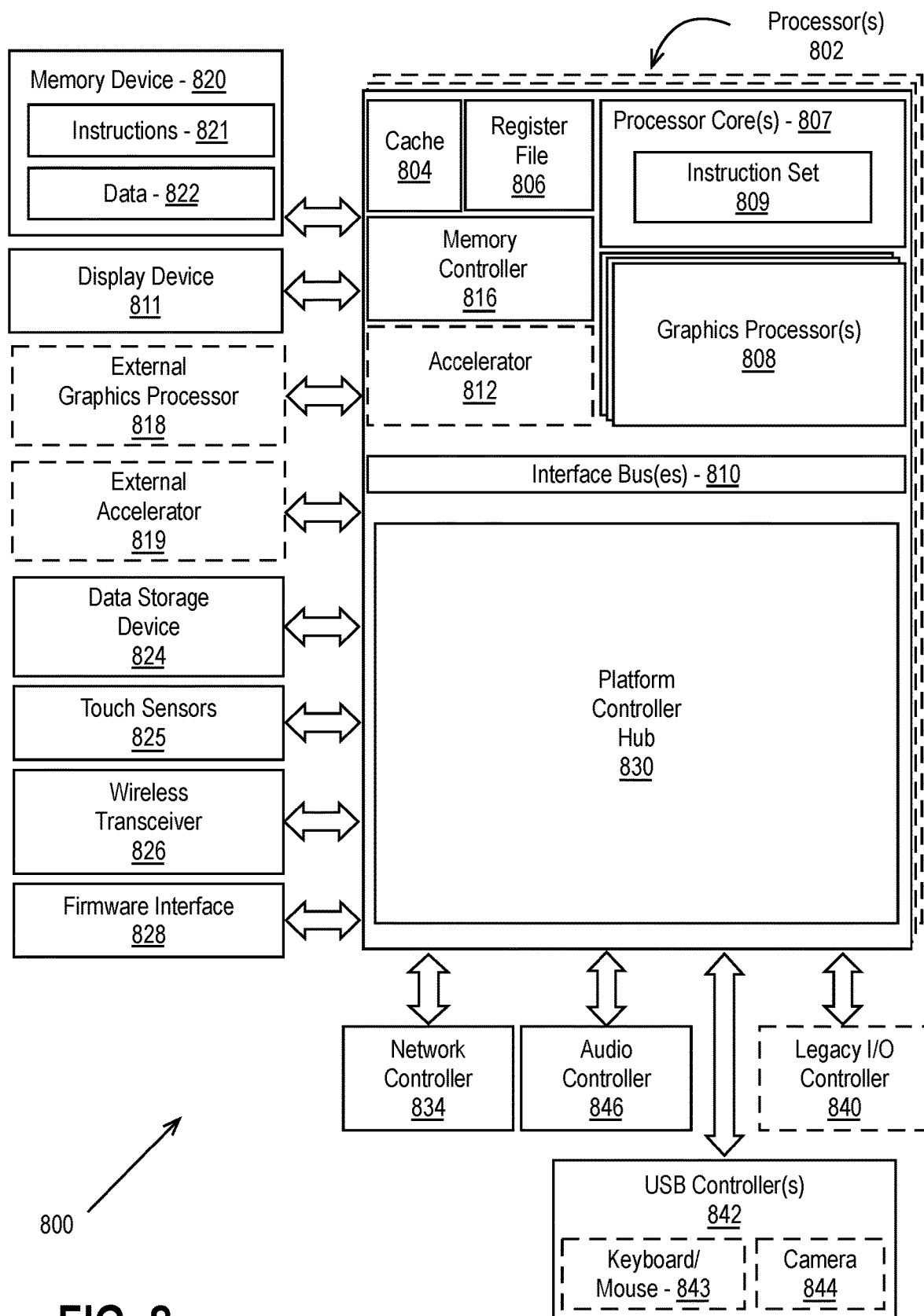
FIG. 8 is a block diagram of a processing system, according to an embodiment.

FIG. 8 is a block diagram of a processing system 800, according to an embodiment. Processing system 800 may be used in a single processor desktop system, a multiprocessor workstation system, or a server system having a large number of processors 802 or processor cores 807. In one embodiment, the processing system 800 is a processing platform incorporated within a system-on-a-chip (SoC) integrated circuit for use in mobile, handheld, or embedded devices such as within Internet-of-things (IoT) devices with wired or wireless connectivity to a local or wide area network.

In one embodiment, processing system 800 can include, couple with, or be integrated within: a server-based gaming platform; a game console, including a game and media console; a mobile gaming console, a handheld game console, or an online game console. In some embodiments the processing system 800 is part of a mobile phone, smart phone, tablet computing device or mobile Internet-connected device such as a laptop with low internal storage capacity. Processing system 800 can also include, couple with, or be integrated within: a wearable device, such as a smart watch wearable device; smart eyewear or clothing enhanced with augmented reality (AR) or virtual reality (VR) features to provide visual, audio or tactile outputs to supplement real world visual, audio or tactile experiences or otherwise provide text, audio, graphics, video, holographic images or video, or tactile feedback; other augmented reality (AR) device; or other virtual reality (VR) device. In some embodiments, the processing system 800 includes or is part of a television or set top box device. In one embodiment, processing system 800 can include, couple with, or be integrated within a self-driving vehicle such as a bus, tractor trailer, car, motor or electric power cycle, plane or glider (or any combination thereof). The self-driving vehicle may use processing system 800 to process the environment sensed around the vehicle.

In some embodiments, the one or more processors 802 each include one or more processor cores 807 to process instructions which, when executed, perform operations for system or user software. In some embodiments, at least one of the one or more processor cores 807 is configured to process a specific instruction set 809. In some embodiments, instruction set 809 may facilitate Complex Instruction Set Computing (CISC), Reduced Instruction Set Computing (RISC), or computing via a Very Long Instruction Word (VLIW). One or more processor cores 807 may process a different instruction set 809, which may include instructions to facilitate the emulation of other instruction sets. Processor core 807 may also include other processing devices, such as a Digital Signal Processor (DSP).

In some embodiments, the processor 802 includes cache memory 804. Depending on the architecture, the processor 802 can have a single internal cache or multiple levels of internal cache. In some embodiments, the cache memory is shared among various components of the processor 802. In some embodiments, the processor 802 also uses an external cache (e.g., a Level-3 (L3) cache or Last Level Cache (LLC)) (not shown), which may be shared among processor cores 807 using known cache coherency techniques. A register file 806 can be additionally included in processor 802 and may include different types of registers for storing different types of data (e.g., integer registers, floating-point registers, status registers, and an instruction pointer register). Some registers may be general-purpose registers, while other registers may be specific to the design of the processor 802.

In some embodiments, one or more processor(s) 802 are coupled with one or more interface bus(es) 810 to transmit communication signals such as address, data, or control signals between processor 802 and other components in the processing system 800. The interface bus 810, in one embodiment, can be a processor bus, such as a version of the Direct Media Interface (DMI) bus. However, processor busses are not limited to the DMI bus, and may include one or more Peripheral Component Interconnect buses (e.g., PCI, PCI express), memory busses, or other types of interface busses. In one embodiment the processor(s) 802 include an integrated memory controller 816 and a platform controller hub 830. The memory controller 816 facilitates communication between a memory device and other components of the processing system 800, while the platform controller hub (PCH) 830 provides connections to I/O devices via a local I/O bus.

The memory device 820 can be a dynamic random-access memory (DRAM) device, a static random-access memory (SRAM) device, flash memory device, phase-change memory device, or some other memory device having suitable performance to serve as process memory. In one embodiment the memory device 820 can operate as system memory for the processing system 800, to store data 822 and instructions 821 for use when the one or more processors 802 executes an application or process. Memory controller 816 also couples with an optional external graphics processor 818, which may communicate with the one or more graphics processors 808 in processors 802 to perform graphics and media operations. In some embodiments, graphics, media, and or compute operations may be assisted by an accelerator 812 which is a coprocessor that can be configured to perform a specialized set of graphics, media, or compute operations. For example, in one embodiment the accelerator 812 is a matrix multiplication accelerator used to optimize machine learning or compute operations. In one embodiment the accelerator 812 is a ray-tracing accelerator that can be used to perform ray-tracing operations in concert with the graphics processor 808. In one embodiment, an external accelerator 819 may be used in place of or in concert with the accelerator 812.

In some embodiments a display device 811 can connect to the processor(s) 802. The display device 811 can be one or more of an internal display device, as in a mobile electronic device or a laptop device or an external display device attached via a display interface (e.g., DisplayPort, etc.). In one embodiment the display device 811 can be a head mounted display (HMD) such as a stereoscopic display device for use in virtual reality (VR) applications or augmented reality (AR) applications.

In some embodiments the platform controller hub 830 enables peripherals to connect to memory device 820 and processor 802 via a high-speed I/O bus. The I/O peripherals include, but are not limited to, an audio controller 846, a network controller 834, a firmware interface 828, a wireless transceiver 826, touch sensors 825, a data storage device 824 (e.g., non-volatile memory, volatile memory, hard disk drive, flash memory, NAND, 3D NAND, 3D XPoint, etc.). The data storage device 824 can connect via a storage interface (e.g., SATA) or via a peripheral bus, such as a Peripheral Component Interconnect bus (e.g., PCI, PCI express). The touch sensors 825 can include touch screen sensors, pressure sensors, or fingerprint sensors. The wireless transceiver 826 can be a Wi-Fi transceiver, a Bluetooth transceiver, or a mobile network transceiver such as a 3G, 4G, 5G, or Long-Term Evolution (LTE) transceiver. The firmware interface 828 enables communication with system firmware, and can be, for example, a unified extensible firmware interface (UEFI). The network controller 834 can enable a network connection to a wired network. In some embodiments, a high-performance network controller (not shown) couples with the interface bus 810. The audio controller 846, in one embodiment, is a multi-channel high-definition audio controller. In one embodiment the processing system 800 includes an optional legacy I/O controller 840 for coupling legacy (e.g., Personal System 2 (PS/2)) devices to the system. The platform controller hub 830 can also connect to one or more Universal Serial Bus (USB)

controllers 842 connect input devices, such as keyboard and mouse 843 combinations, a camera 844, or other USB input devices.

It will be appreciated that the processing system 800 shown is exemplary and not limiting, as other types of data processing systems that are differently configured may also be used. For example, an instance of the memory controller 816 and platform controller hub 830 may be integrated into a discrete external graphics processor, such as the external graphics processor 818. In one embodiment the platform controller hub 830 and/or memory controller 816 may be external to the one or more processor(s) 802. For example, the processing system 800 can include an external memory controller 816 and platform controller hub 830, which may be configured as a memory controller hub and peripheral controller hub within a system chipset that is in communication with the processor(s) 802.

For example, circuit boards ("sleds") can be used on which components such as CPUs, memory, and other components are placed are designed for increased thermal performance. In some examples, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in a rack, thereby enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

A data center can utilize a single network architecture ("fabric") that supports multiple other network architectures including Ethernet and Omni-Path. The sleds can be coupled to switches via optical fibers, which provide higher bandwidth and lower latency than typical twisted pair cabling. Due to the high bandwidth, low latency interconnections and network architecture, the data center may, in use, pool resources, such as memory, accelerators (e.g., GPUs, graphics accelerators, FPGAs, ASICs, neural network and/or artificial intelligence accelerators, etc.), and data storage drives that are physically disaggregated, and provide them to compute resources (e.g., processors) on an as needed basis, enabling the compute resources to access the pooled resources as if they were local.

A power supply or source can provide voltage and/or current to processing system 800 or any component or system described herein. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

Figure 9A:
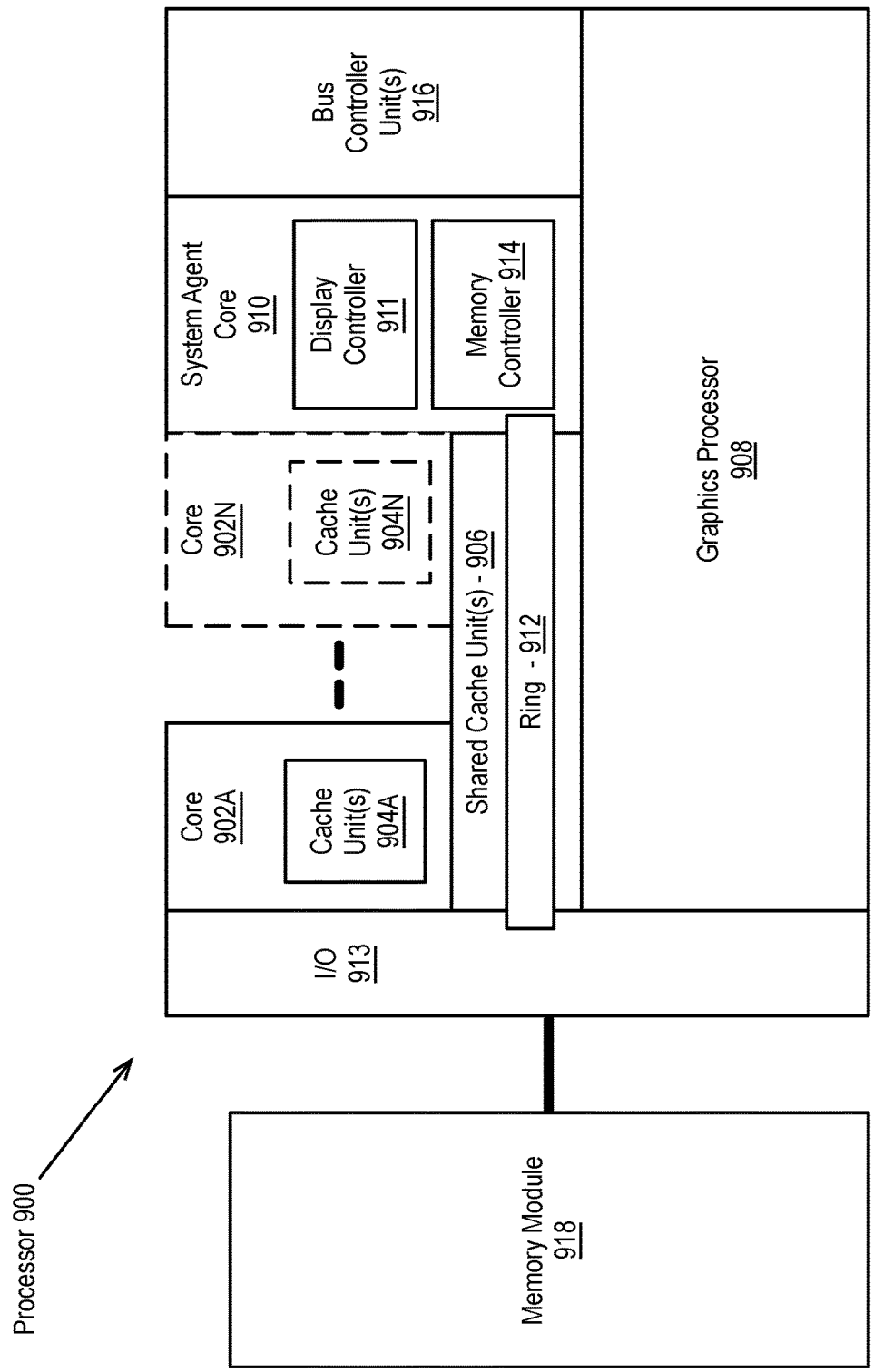
FIG. 9A-9B illustrate computing systems and graphics processors provided by embodiments described herein.
Figure 9B:
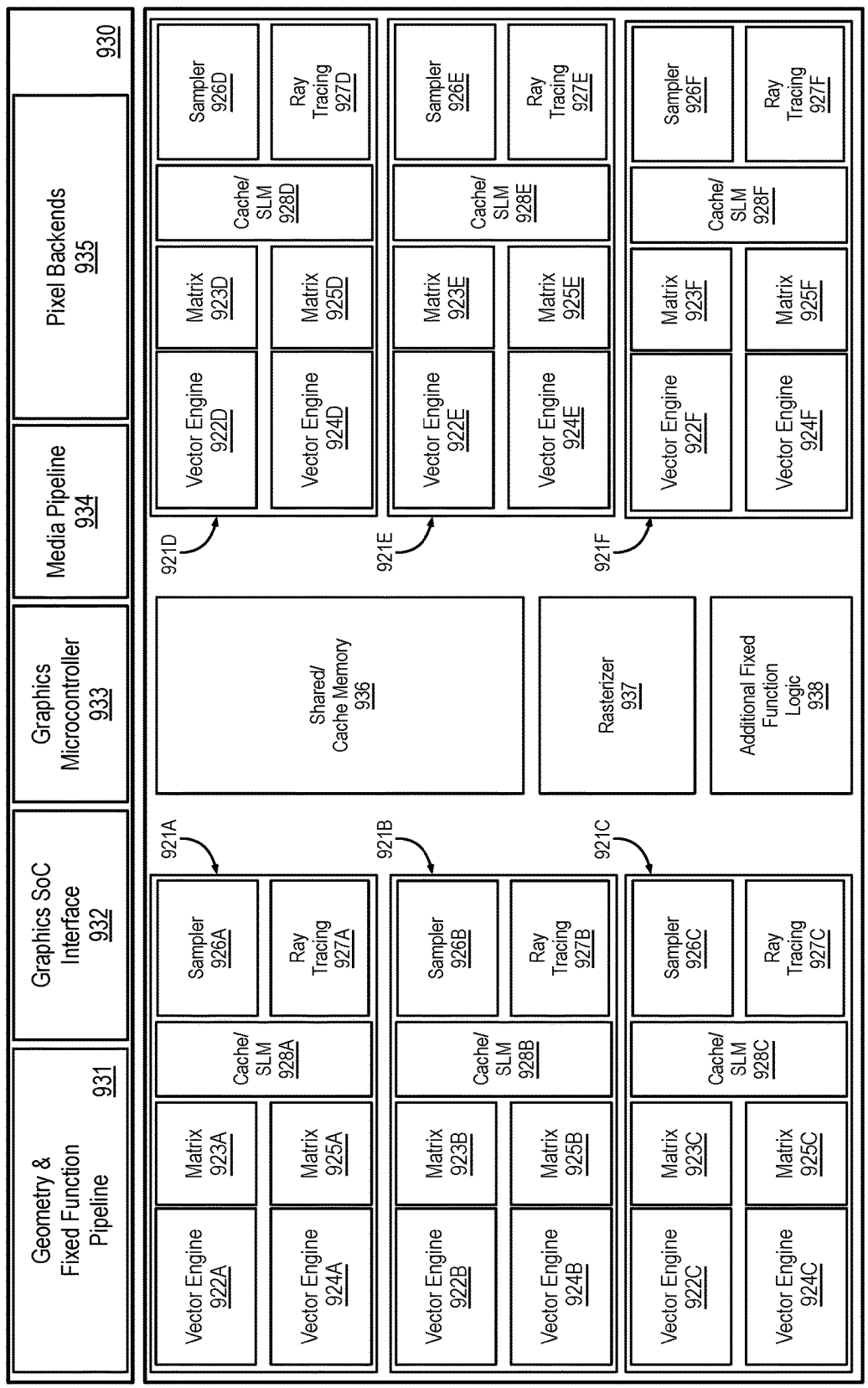

FIG. 9A-9B illustrate computing systems and graphics processors provided by embodiments described herein. The elements of FIG. 9A-9B having the same reference numbers (or names) as the elements of any other figure herein can operate or function in any manner similar to that described elsewhere herein but are not limited to such.

FIG. 9A is a block diagram of an embodiment of a processor 900 having one or more processor cores 902A-902N, one or more integrated memory controllers 914, and an integrated graphics processor 908. Processor 900 includes at least one core 902A and can additionally include additional cores up to and including additional core 902N, as represented by the dashed lined boxes. Each of processor cores 902A-902N includes one or more internal cache units 904A-904N. In some embodiments each processor core also has access to one or more shared cached units 906. The internal cache units 904A-904N and shared cache units 906 represent a cache memory hierarchy within the processor 900. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 906 and 904A-904N.

In some embodiments, processor 900 may also include a set of one or more bus controller units 916 and a system agent core 910. The one or more bus controller units 916 manage a set of peripheral buses, such as one or more PCI or PCI express busses. System agent core 910 provides management functionality for the various processor components. In some embodiments, system agent core 910 includes one or more integrated memory controllers 914 to manage access to various external memory devices (not shown).

In some embodiments, one or more of the processor cores 902A-902N include support for simultaneous multi-threading. In such embodiment, the system agent core 910 includes components for coordinating and operating cores 902A-902N during multi-threaded processing. System agent core 910 may additionally include a power control unit (PCU), which includes logic and components to regulate the power state of processor cores 902A-902N and graphics processor 908.

In some embodiments, processor 900 additionally includes a graphics processor 908 to execute graphics processing operations. In some embodiments, the graphics processor 908 couples with the set of shared cache units 906, and the system agent core 910, including the one or more integrated memory controllers 914. In some embodiments, the system agent core 910 also includes a display controller 911 to drive graphics processor output to one or more coupled displays. In some embodiments, display controller 911 may also be a separate module coupled with the graphics processor via at least one interconnect, or may be integrated within the graphics processor 908.

In some embodiments, a ring-based interconnect 912 is used to couple the internal components of the processor 900. However, an alternative interconnect unit may be used, such as a point-to-point interconnect, a switched interconnect, or other techniques, including techniques well known in the art. In some embodiments, graphics processor 908 couples with the ring-based interconnect 912 via an I/O link 913.

The exemplary I/O link 913 represents at least one of multiple varieties of I/O interconnects, including an on package I/O interconnect which facilitates communication between various processor components and a memory module 918, such as an eDRAM module or high-bandwidth memory (HBM) memory modules. In one embodiment the memory module 918 can be an eDRAM module and each of the processor cores 902A-902N and graphics processor 908 can use the memory module 918 as a shared LLLC. In one embodiment, the memory module 918 is an HBM memory module that can be used as a primary memory module or as part of a tiered or hybrid memory system that also includes double data rate synchronous DRAM, such as DDR5 SDRAM, and/or persistent memory (PMem). The processor 900 can include multiple instances of the I/O link 913 and memory module 918.

In some embodiments, processor cores 902A-902N are homogenous cores executing the same instruction set architecture. In another embodiment, processor cores 902A-902N are heterogeneous in terms of instruction set architecture (ISA), where one or more of processor cores 902A-902N execute a first instruction set, while at least one of the other cores executes a subset of the first instruction set or a different instruction set. In one embodiment, processor cores 902A-902N are heterogeneous in terms of microarchitecture, where one or more cores having a relatively higher power consumption couple with one or more power cores having a lower power consumption. In one embodiment, processor cores 902A-902N are heterogeneous in terms of computational capability. Additionally, processor 900 can be implemented on one or more chips or as an SoC (system-on-a-chip) integrated circuit having the illustrated components, in addition to other components.

FIG. 9B is a block diagram of hardware logic of a graphics processor core block 919, according to some embodiments described herein. The graphics processor core block 919 is exemplary of one partition of a graphics processor. A graphics processor as described herein may include multiple graphics core blocks based on target power and performance envelopes. Each graphics processor core block 919 can include a function block 930 coupled with multiple execution cores 921A-921F that include modular blocks of fixed function logic and general-purpose programmable logic. The graphics processor core block 919 also includes shared/cache memory 936 that is accessible by all execution cores 921A-921F, rasterizer logic 937, and additional fixed function logic 938.

In some embodiments, the function block 930 includes a geometry/fixed function pipeline 931 that can be shared by all execution cores in the graphics processor core block 919. In various embodiments, the geometry/fixed function pipeline 931 includes a 3D geometry pipeline a video front-end unit, a thread spawner and global thread dispatcher, and a unified return buffer manager, which manages unified return buffers. In one embodiment the function block 930 also includes a graphics SoC interface 932, a graphics microcontroller 933, and a media pipeline 934. The graphics SoC interface 932 provides an interface between the graphics processor core block 919 and other core blocks within a graphics processor or compute accelerator SoC. The graphics microcontroller 933 is a programmable sub-processor that is configurable to manage various functions of the graphics processor core block 919, including thread dispatch, scheduling, and pre-emption. The media pipeline 934 includes logic to facilitate the decoding, encoding, pre-processing, and/or post-processing of multimedia data, including image and video data. The media pipeline 934 implement media operations via requests to compute or sampling logic within the execution cores 921-921F. One or more pixel backends 935 can also be included within the function block 930. The pixel backends 935 include a cache memory to store pixel color values and can perform blend operations and lossless color compression of rendered pixel data.

In one embodiment the SoC interface 932 enables the graphics processor core block 919 to communicate with general-purpose application processor cores (e.g., CPUs) and/or other components within an SoC or a system host CPU that is coupled with the SoC via a peripheral interface. The SoC interface 932 also enables communication with off-chip memory hierarchy elements such as a shared last level cache memory, system RAM, and/or embedded on-chip or on-package DRAM. The SoC interface 932 can also enable communication with fixed function devices within the SoC, such as camera imaging pipelines, and enables the use of and/or implements global memory atomics that may be shared between the graphics processor core block 919 and CPUs within the SoC. The SoC interface 932 can also implement power management controls for the graphics processor core block 919 and enable an interface between a clock domain of the graphics processor core block 919 and other clock domains within the SoC. In one embodiment the SoC interface 932 enables receipt of command buffers from a command streamer and global thread dispatcher that are configured to provide commands and instructions to each of one or more graphics cores within a graphics processor. The commands and instructions can be dispatched to the media pipeline 934 when media operations are to be performed, the geometry and fixed function pipeline 931 when graphics processing operations are to be performed. When compute operations are to be performed, compute dispatch logic can dispatch the commands to the execution cores 921A-921F, bypassing the geometry and media pipelines.

The graphics microcontroller 933 can be configured to perform various scheduling and management tasks for the graphics processor core block 919. In one embodiment the graphics microcontroller 933 can perform graphics and/or compute workload scheduling on the various graphics parallel engines within execution unit (EU) arrays 922A-922F, 924A-924F within the execution cores 921A-921F. In this scheduling model, host software executing on a CPU core of an SoC including the graphics processor core block 919 can submit workloads one of multiple graphics processor door-bells, which invokes a scheduling operation on the appropriate graphics engine. Scheduling operations include determining which workload to run next, submitting a workload to a command streamer, pre-empting existing workloads running on an engine, monitoring progress of a workload, and notifying host software when a workload is complete. In one embodiment the graphics microcontroller 933 can also facilitate low-power or idle states for the graphics processor core block 919, providing the graphics processor core block 919 with the ability to save and restore registers within the graphics processor core block 919 across low-power state transitions independently from the operating system and/or graphics driver software on the system.

The graphics processor core block 919 may have greater than or fewer than the illustrated execution cores 921A-921F, up to N modular execution cores. For each set of N execution cores, the graphics processor core block 919 can also include shared/cache memory 936, which can be configured as shared memory or cache memory, rasterizer logic 937, and additional fixed function logic 938 to accelerate various graphics and compute processing operations.

Within each execution cores 921A-921F is set of execution resources that may be used to perform graphics, media, and compute operations in response to requests by graphics pipeline, media pipeline, or shader programs. The graphics execution cores 921A-921F include multiple vector engines 922A-922F, 924A-924F, matrix acceleration units 923A-

923F, 925A-925D, cache/shared local memory (SLM), a sampler 926A-926F, and a ray tracing unit 927A-927F.

The vector engines 922A-922F, 924A-924F are general-purpose graphics processing units capable of performing floating-point and integer/fixed-point logic operations in service of a graphics, media, or compute operation, including graphics, media, or compute/GPGPU programs. The vector engines 922A-922F, 924A-924F can operate at variable vector widths using SIMD, SIMT, or SIMT+SIMD execution modes. The matrix acceleration units 923A-923F, 925A-925D include matrix-matrix and matrix-vector acceleration logic that improves performance on matrix operations, particularly low and mixed precision (e.g., INT8, FP16) matrix operations used for machine learning. In one embodiment, each of the matrix acceleration units 923A-923F, 925A-925D includes one or more systolic arrays of processing elements that can perform concurrent matrix multiply or dot product operations on matrix elements.

The sampler 925A-925F can read media or texture data into memory and can sample data differently based on a configured sampler state and the texture/media format that is being read. Threads executing on the vector engines 922A-922F, 924A-924F or matrix acceleration units 923A-923F, 925A-925D can make use of the cache/SLM 928A-928F within each execution core. The cache/SLM 928A-928F can be configured as cache memory or as a pool of shared memory that is local to each of the respective execution cores 921A-921F. The ray tracing units 927A-927F within the execution cores 921A-921F include ray traversal/intersection circuitry for performing ray traversal using bounding volume hierarchies (BVHs) and identifying intersections between rays and primitives enclosed within the BVH volumes. In one embodiment the ray tracing units 927A-927F include circuitry for performing depth testing and culling (e.g., using a depth buffer or similar arrangement). In one implementation, the ray tracing units 927A-927F perform traversal and intersection operations in concert with image denoising, at least a portion of which may be performed using an associated matrix acceleration unit 923A-923F, 925A-925D.

Figure 10A:
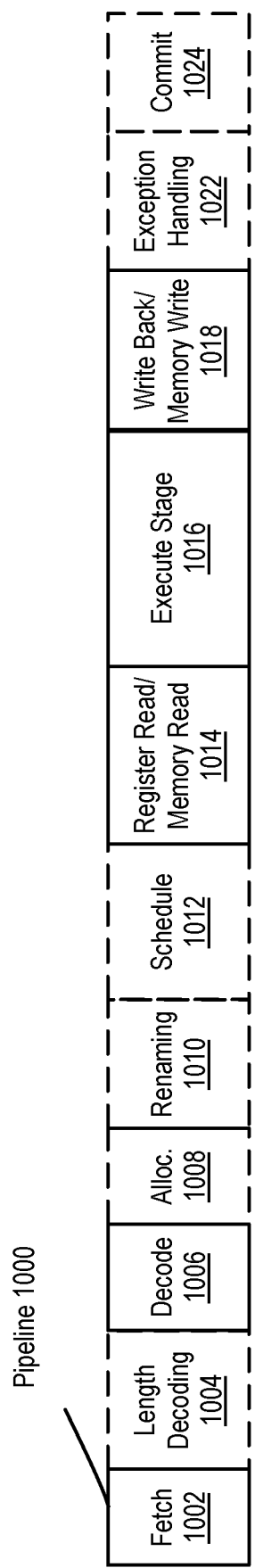
FIG. 10A-10B illustrate an exemplary in-order pipeline and an exemplary register renaming, out-of-order issue/execution pipeline of a processor and an associated processor architecture.
Figure 10B:
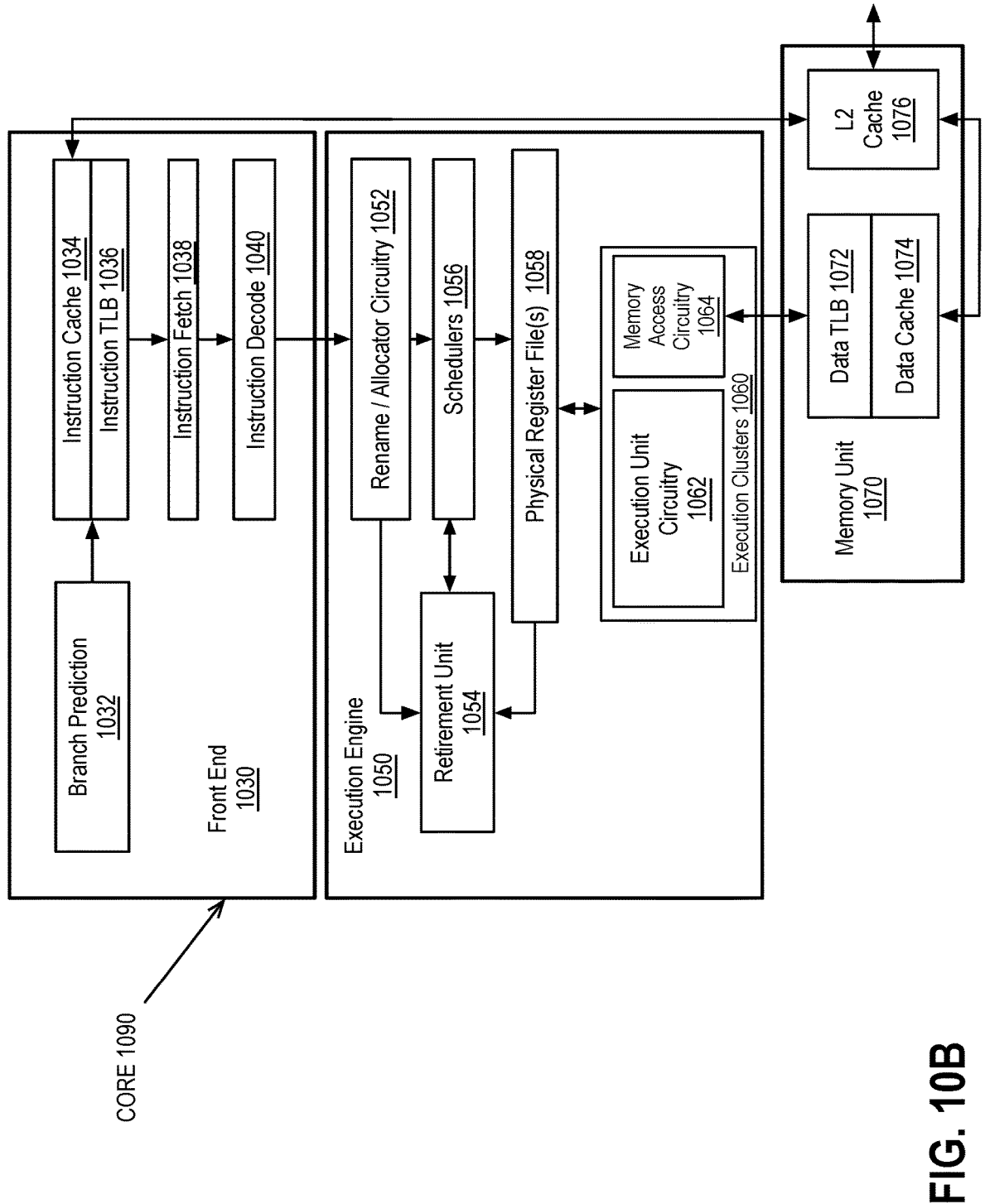

FIG. 10A is a block diagram illustrating an exemplary in-order pipeline and an exemplary register renaming, out-of-order issue/execution pipeline of a processor described herein. FIG. 10B is a block diagram illustrating architecture for a processor core that can be configured as an in-order architecture core or a register renaming, out-of-order issue/execution architecture core. Given that the in-order aspect is a subset of the out-of-order aspect, the out-of-order aspect will be described.

As shown in FIG. 10A, a processor pipeline 1000 includes a fetch stage 1002, an optional length decode stage 1004, a decode stage 1006, an optional allocation stage 1008, an optional renaming stage 1010, a scheduling (also known as a dispatch or issue) stage 1012, an optional register read/memory read stage 1014, an execute stage 1016, a write back/memory write stage 1018, an optional exception handling stage 1022, and an optional commit stage 1024. One or more operations can be performed in each of these processor pipeline stages. For example, during the fetch stage 1002, one or more instructions are fetched from instruction memory, during the decode stage 1006, the one or more fetched instructions may be decoded, addresses (e.g., load store unit (LSU) addresses) using forwarded register ports may be generated, and branch forwarding (e.g., immediate offset or link register (LR)) may be performed. In one embodiment, the decode stage 1006 and the register read/memory read stage 1014 may be combined into one pipeline stage. In one embodiment, during the execute stage 1016, the decoded instructions may be executed, LSU address/data pipelining to an Advanced Microcontroller Bus (AHB) interface may be performed, multiply and add operations may be performed, arithmetic operations with branch results may be performed, etc.

As shown in FIG. 10B a processor core 1090 can include front end unit circuitry 1030 coupled to execution engine circuitry 1050, both of which are coupled to memory unit circuitry 1070. The processor core 1090 can be one of processor cores 902A-902N as in FIG. 9A. The processor core 1090 may be a reduced instruction set computing (RISC) core, a complex instruction set computing (CISC) core, a very long instruction word (VLIW) core, or a hybrid or alternative core type. As yet another option, the processor core 1090 may be a special-purpose core, such as, for example, a network or communication core, compression engine, coprocessor core, general purpose computing graphics processing unit (GPGPU) core, graphics core, or the like.

The front end unit circuitry 1030 may include branch prediction unit circuitry 1032 coupled to an instruction cache unit circuitry 1034, which is coupled to an instruction translation lookaside buffer (TLB) 1036, which is coupled to instruction fetch unit circuitry 1038, which is coupled to decode unit circuitry 1040. In one embodiment, the instruction cache unit circuitry 1034 is included in the memory unit circuitry 1070 rather than the front end unit circuitry 1030. The decode unit circuitry 1040 (or decoder) may decode instructions, and generate as an output one or more micro-operations, micro-code entry points, microinstructions, other instructions, or other control signals, which are decoded from, or which otherwise reflect, or are derived from, the original instructions. The decode unit circuitry 1040 may further include an address generation unit circuitry (AGU, not shown). In one embodiment, the AGU generates an LSU address using forwarded register ports, and may further perform branch forwarding (e.g., immediate offset branch forwarding, LR register branch forwarding, etc.). The decode unit circuitry 1040 may be implemented using various different mechanisms. Examples of suitable mechanisms include, but are not limited to, look-up tables, hardware implementations, programmable logic arrays (PLAs), microcode read only memories (ROMs), etc. In one embodiment, the processor core 1090 includes a microcode ROM (not shown) or other medium that stores microcode for certain macroinstructions (e.g., in decode unit circuitry 1040 or otherwise within the front end unit circuitry 1030). In one embodiment, the decode unit circuitry 1040 includes a micro-operation (micro-op) or operation cache (not shown) to hold/cache decoded operations, micro-tags, or micro-operations generated during the decode or other stages of the processor pipeline 1000. The decode unit circuitry 1040 may be coupled to rename/allocator unit circuitry 1052 in the execution engine circuitry 1050.

The execution engine circuitry 1050 includes the rename/allocator unit circuitry 1052 coupled to a retirement unit circuitry 1054 and a set of one or more scheduler(s) circuitry 1056. The scheduler(s) circuitry 1056 represents any number of different schedulers, including reservations stations, central instruction window, etc. In some embodiments, the scheduler(s) circuitry 1056 can include arithmetic logic unit (ALU) scheduler/scheduling circuitry, ALU queues, arithmetic generation unit (AGU) scheduler/scheduling circuitry, AGU queues, etc. The scheduler(s) circuitry 1056 is coupled to the physical register file(s) circuitry 1058. Each of the physical register file(s) circuitry 1058 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one embodiment, the physical register file(s) circuitry 1058 includes vector registers unit circuitry, writemask registers unit circuitry, and scalar register unit circuitry. These register units may provide architectural vector registers, vector mask registers, general-purpose registers, etc. The physical register file(s) circuitry 1058 is overlapped by the retirement unit circuitry 1054 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 1054 and the physical register file(s) circuitry 1058 are coupled to the execution cluster(s) 1060. The execution cluster(s) 1060 includes a set of one or more execution unit circuitry 1062 and a set of one or more memory access circuitry 1064. The execution unit circuitry 1062 may perform various arithmetic, logic, floating-point or other types of operations (e.g., shifts, addition, subtraction, multiplication) and on various types of data (e.g., scalar floating-point, packed integer, packed floating-point, vector integer, vector floating-point). While some embodiments may include a number of execution units or execution unit circuitry dedicated to specific functions or sets of functions, other embodiments may include only one execution unit circuitry or multiple execution units/execution unit circuitry that all perform all functions. The scheduler(s) circuitry 1056, physical register file(s) circuitry 1058, and execution cluster(s) 1060 are shown as being possibly plural because certain embodiments create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) unit circuitry, and/or execution cluster—and in the case of a separate memory access pipeline, certain embodiments are implemented in which only the execution cluster of this pipeline has the memory access unit(s) circuitry 1064). It should also be understood that where separate pipelines are used, one or more of these pipelines may be out-of-order issue/execution and the rest in-order.

In some embodiments, the execution engine circuitry 1050 may perform load store unit (LSU) address/data pipelining to an Advanced Microcontroller Bus (AHB) interface (not shown), and address phase and writeback, data phase load, store, and branches.

The set of memory access circuitry 1064 is coupled to the memory unit circuitry 1070, which includes data TLB unit circuitry 1072 coupled to a data cache circuitry 1074 coupled to a level 2 (L2) cache circuitry 1076. In one exemplary embodiment, the memory access circuitry 1064 may include a load unit circuitry, a store address unit circuit, and a store data unit circuitry, each of which is coupled to the data TLB circuitry 1072 in the memory unit circuitry 1070. The instruction cache circuitry 1034 is further coupled to level 2 (L2) cache circuitry 1076 in the memory unit circuitry 1070. In one embodiment, the instruction cache circuitry 1034 and the data cache circuitry 1074 are combined into a single instruction and data cache (not shown) in L2 cache circuitry 1076, a level 3 (L3) cache unit circuitry (not shown), and/or main memory. The L2 cache circuitry 1076 is coupled to one or more other levels of cache and eventually to a main memory.

The processor core 1090 may support one or more instructions sets (e.g., the x86 instruction set (with some extensions that have been added with newer versions); the MIPS instruction set; the ARM instruction set (with optional additional extensions such as NEON)), including the instruction(s) described herein. In one embodiment, the processor core 1090 includes logic to support a packed data instruction set extension (e.g., AVX1, AVX2, AVX512), thereby allowing the operations used by many multimedia applications or high-performance compute applications, including homomorphic encryption applications, to be performed using packed or vector data types.

The processor core 1090 of FIG. 10B can implement the processor pipeline 1000 of FIG. 10A as follows: 1) the instruction fetch circuitry 1038 performs the fetch and length decoding stages 1002 and 1004; 2) the instruction decode unit circuitry 1040 performs the decode stage 1006; 3) the rename/allocator unit circuitry 1052 performs the allocation stage 1008 and renaming stage 1010; 4) the scheduler unit(s) circuitry 1056 performs the schedule stage 1012; 5) the physical register file(s) circuitry 1058 and the memory unit circuitry 1070 perform the register read/memory read stage 1014; the execution cluster 1060 perform the execute stage 1016; 6) the memory unit circuitry 1070 and the physical register file(s) circuitry 1058 perform the write back/memory write stage 1018; 7) various units (unit circuitry) may be involved in the exception handling stage 1022; and 8) the retirement unit circuitry 1054 and the physical register file(s) circuitry 1058 perform the commit stage 1024.

Figure 11:
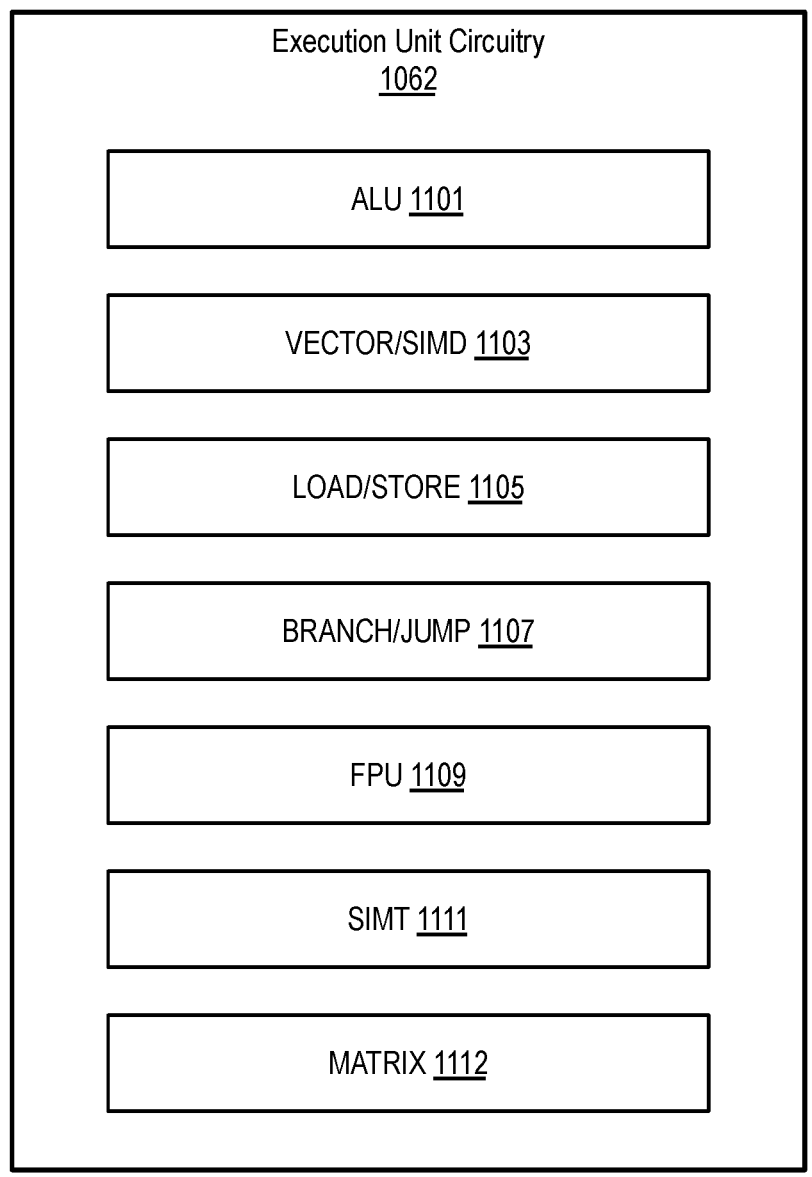
FIG. 11 illustrates execution unit circuitry according to embodiments described herein.

FIG. 11 illustrates execution unit circuitry, such as execution unit circuitry 1062 of FIG. 10B, according to embodiments described herein. As illustrated, execution unit circuitry 1062 may include one or more ALU circuits 1101, vector/SIMD unit circuits 1103, load/store unit circuits 1105, branch/jump unit circuits 1107, and/or FPU circuits 1109. Where the execution unit circuitry 1062 is configurable to perform GPGPU parallel compute operations, the execution unit circuitry can additionally include SIMT circuits 1111 and/or matrix acceleration circuits 1112. ALU circuits 1101 perform integer arithmetic and/or Boolean operations. Vector/SIMD unit circuits 1103 perform vector/SIMD operations on packed data (such as SIMD/vector registers). Load/store unit circuits 1105 execute load and store instructions to load data from memory into registers or store from registers to memory. Load/store unit circuits 1105 may also generate addresses. Branch/jump unit circuits 1107 cause a branch or jump to a memory address depending on the instruction. FPU circuits 1109 perform floating-point arithmetic. In some embodiments, SIMT circuits 1111 enable the execution unit circuitry 1062 to execute SIMT GPGPU compute programs using one or more ALU circuits 1101 and/or Vector/SIMD unit circuits 1103. In some embodiments, execution unit circuitry 1062 includes matrix acceleration circuits 1112 including hardware logic of one or more of the matrix acceleration units 923A-923F, 925A-925D of FIG. 9B. The width of the execution unit(s) circuitry 1062 varies depending upon the embodiment and can range from 16 bits to 4,096 bits. In some embodiments, two or more smaller execution units are logically combined to form a larger execution unit (e.g., two 128-bit execution units are logically combined to form a 256-bit execution unit).

Figure 12:
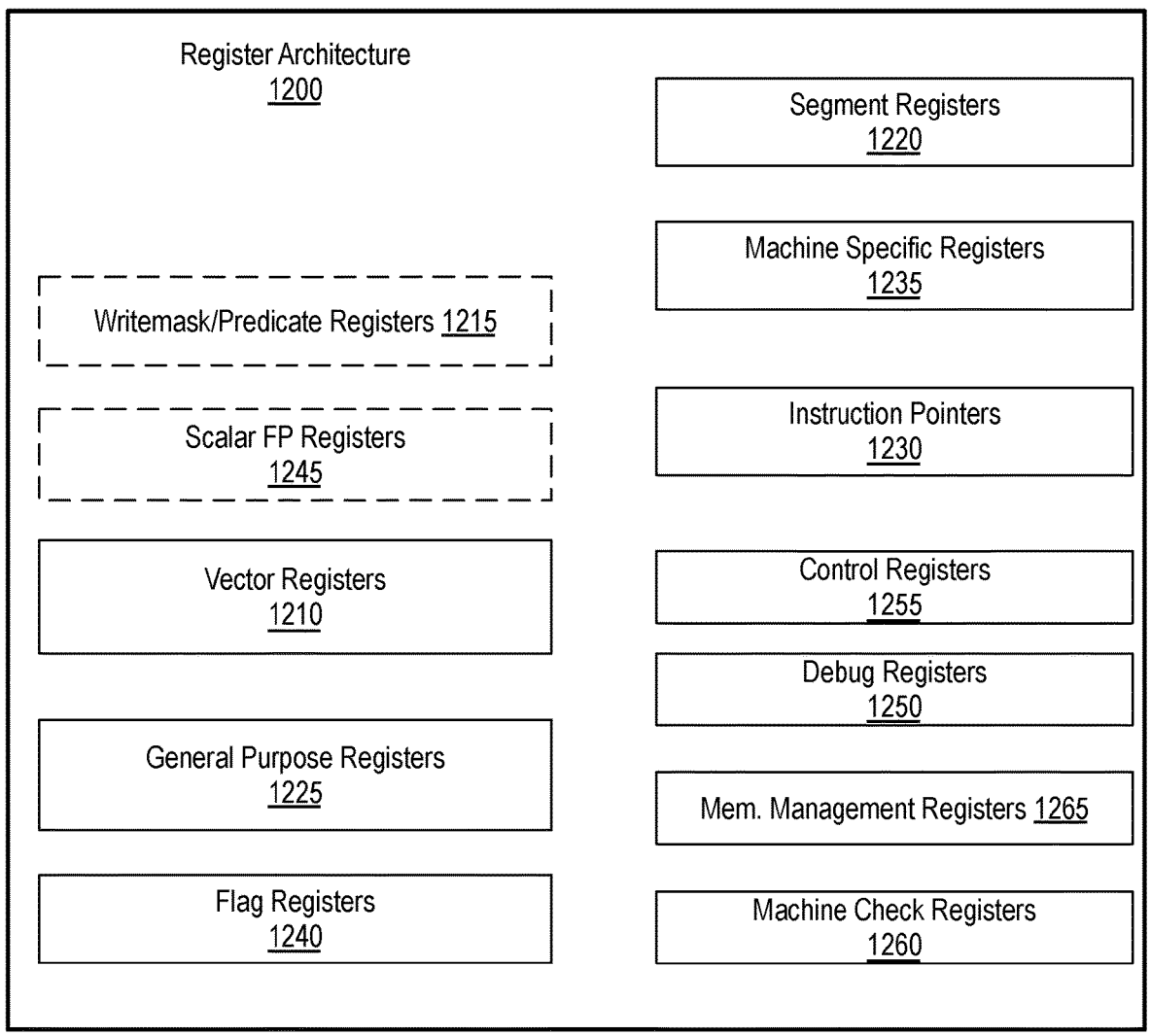
FIG. 12 is a block diagram of a register architecture according to some embodiments.

FIG. 12 is a block diagram of a register architecture 1200 according to some embodiments. As illustrated, there are vector registers 1210 that vary from 128-bit to 1,024 bits width. In some embodiments, the vector registers 1210 are physically 512-bits and, depending upon the mapping, only some of the lower bits are used. For example, in some embodiments, the vector registers 1210 are ZMM registers which are 512 bits: the lower 256 bits are used for YMM registers and the lower 128 bits are used for XMM registers. As such, there is an overlay of registers. In some embodiments, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the embodiment.

In some embodiments, the register architecture 1200 includes writemask/predicate registers 1215. For example, in some embodiments, there are 8 writemask/predicate registers (sometimes called k0 through k7) that are each 16-bit, 32-bit, 64-bit, or 128-bit in size. Writemask/predicate registers 1215 may allow for merging (e.g., allowing any set of elements in the destination to be protected from updates during the execution of any operation) and/or zeroing (e.g., zeroing vector masks allow any set of elements in the destination to be zeroed during the execution of any operation). In some embodiments, each data element position in a given writemask/predicate register 1215 corresponds to a data element position of the destination. In other embodiments, the writemask/predicate registers 1215 are scalable and consists of a set number of enable bits for a given vector element (e.g., 8 enable bits per 64-bit vector element).

The register architecture 1200 includes a plurality of general-purpose registers 1225. These registers may be 16-bit, 32-bit, 64-bit, etc. and can be used for scalar operations. In some embodiments, these registers are referenced by the names RAX, RBX, RCX, RDX, RBP, RSI, RDI, RSP, and R8 through R15.

In some embodiments, the register architecture 1200 includes scalar floating-point register 1245 which is used for scalar floating-point operations on 32/64/80-bit floating-point data using the x87 instruction set extension or as MMX registers to perform operations on 64-bit packed integer data, as well as to hold operands for some operations performed between the MMX and XMM registers.

One or more flag registers 1240 (e.g., EFLAGS, RFLAGS, etc.) store status and control information for arithmetic, compare, and system operations. For example, the one or more flag registers 1240 may store condition code information such as carry, parity, auxiliary carry, zero, sign, and overflow. In some embodiments, the one or more flag registers 1240 are called program status and control registers.

Segment registers 1220 contain segment points for use in accessing memory. In some embodiments, these registers are referenced by the names CS, DS, SS, ES, FS, and GS.

Machine specific registers (MSRs) 1235 control and report on processor performance. Most MSRs 1235 handle system related functions and are not accessible to an application program. Machine check registers 1260 consist of control, status, and error reporting MSRs that are used to detect and report on hardware errors.

One or more instruction pointer registers 1230 store an instruction pointer value. Control register(s) 1255 (e.g., CR0-CR4) determine the operating mode of a processor and the characteristics of a currently executing task. Debug registers 1250 control and allow for the monitoring of a processor or core's debugging operations.

Memory management registers 1265 specify the locations of data structures used in protected mode memory management. These registers may include a GDTR, IDRT, task register, and a LDTR register.

Alternative embodiments use wider or narrower registers and can also use more, less, or different register files and registers.

Exemplary Instruction Formats

Instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Figure 13:
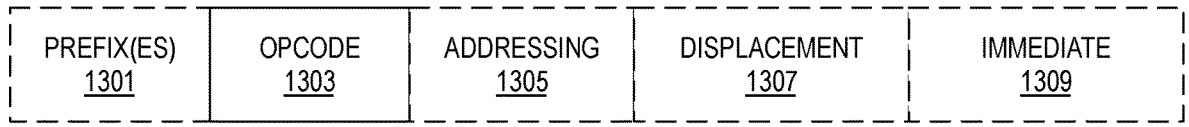
FIG. 13 illustrates embodiments of an instruction format, according to an embodiment.

FIG. 13 illustrates embodiments of an instruction format, according to an embodiment. As illustrated, an instruction may include multiple components including, but not limited to one or more fields for: one or more prefixes 1301, an opcode 1303, addressing information 1305 (e.g., register identifiers, memory addressing information, etc.), a displacement value 1307, and/or an immediate 1309. Note that some instructions utilize some or all of the fields of the format whereas others may only use the field for the opcode 1303. In some embodiments, the order illustrated is the order in which these fields are to be encoded, however, it should be appreciated that in other embodiments these fields may be encoded in a different order, combined, etc.

The prefix(es) field(s) 1301, when used, modifies an instruction. In some embodiments, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 1303 is used to at least partially define the operation to be performed upon a decoding of the instruction. In some embodiments, a primary opcode encoded in the opcode field 1303 is 1, 2, or 3 bytes in length. In other embodiments, a primary opcode can be a different length. An additional 3-bit opcode field is sometimes encoded in another field.

The addressing field 1305 is used to address one or more operands of the instruction, such as a location in memory or one or more registers.

Figure 14:
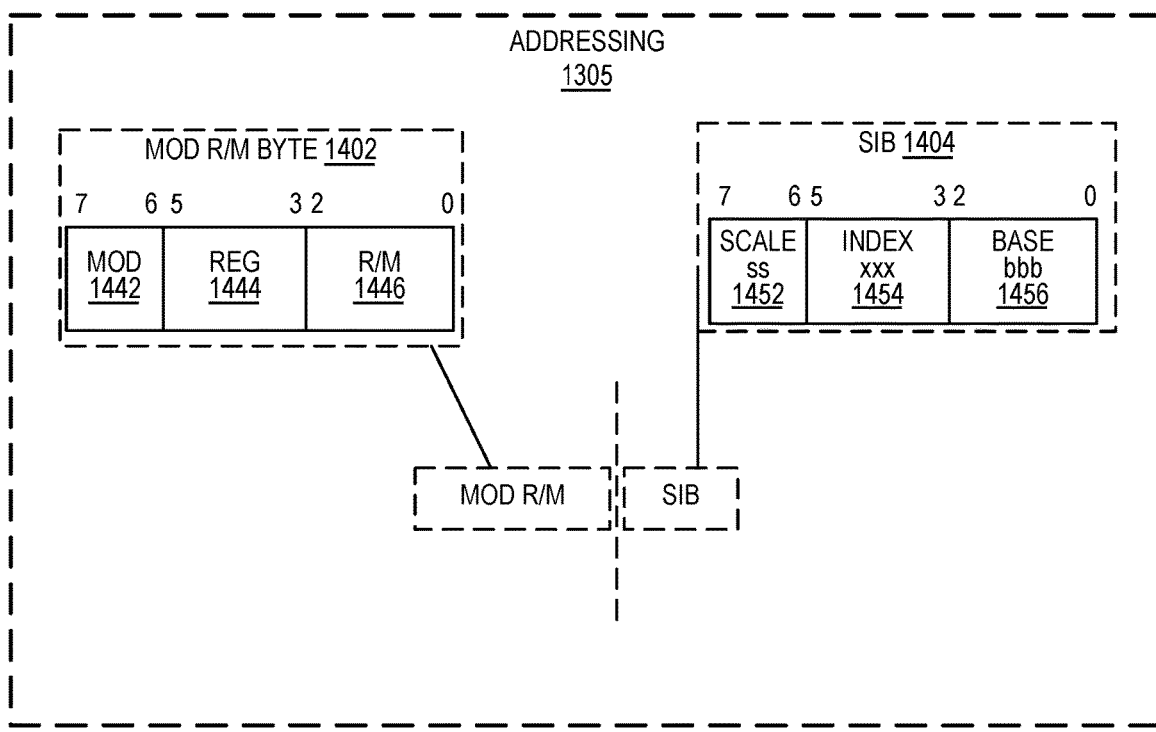
FIG. 14 illustrates embodiments of the addressing field of the instruction format.

FIG. 14 illustrates embodiments of the addressing field 1305. In this illustration, an optional ModR/M byte 1402 and an optional Scale, Index, Base (SIB) byte 1404 are shown. The ModR/M byte 1402 and the SIB byte 1404 are used to encode up to two operands of an instruction, each of which is a direct register or effective memory address. Note that each of these fields are optional in that not all instructions include one or more of these fields. The MOD R/M byte 1402 includes a MOD field 1442, a register field 1444, and R/M field 1446.

The content of the MOD field 1442 distinguishes between memory access and non-memory access modes. In some embodiments, when the MOD field 1442 has a value of b11, a register-direct addressing mode is utilized, and otherwise register-indirect addressing is used.

The register field 1444 may encode either the destination register operand or a source register operand or may encode an opcode extension and not be used to encode any instruction operand. The content of register index field 1444, directly or through address generation, specifies the locations of a source or destination operand (either in a register or in memory). In some embodiments, the register field 1444 is supplemented with an additional bit from a prefix (e.g., prefix 1301) to allow for greater addressing.

The R/M field 1446 may be used to encode an instruction operand that references a memory address or may be used to encode either the destination register operand or a source register operand. Note the R/M field 1446 may be combined with the MOD field 1442 to dictate an addressing mode in some embodiments.

The SIB byte 1404 includes a scale field 1452, an index field 1454, and a base field 1456 to be used in the generation of an address. The scale field 1452 indicates scaling factor. The index field 1454 specifies an index register to use. In some embodiments, the index field 1454 is supplemented with an additional bit from a prefix (e.g., prefix 1301) to allow for greater addressing. The base field 1456 specifies a base register to use. In some embodiments, the base field 1456 is supplemented with an additional bit from a prefix (e.g., prefix 1301) to allow for greater addressing. In practice, the content of the scale field 1452 allows for the scaling of the content of the index field 1454 for memory address generation (e.g., for address generation that uses $2^{scale}*index+base$).

Some addressing forms utilize a displacement value to generate a memory address. For example, a memory address may be generated according to $2^{scale}*index+base+displacement$, index*scale+displacement, r/m+displacement, instruction pointer (RIP/EIP)+displacement, register+displacement, etc. The displacement may be a 1-byte, 2-byte, 4-byte, etc. value. In some embodiments, a displacement field 1307 provides this value. Additionally, in some embodiments, a displacement factor usage is encoded in the MOD field of the addressing field 1305 that indicates a compressed displacement scheme for which a displacement value is calculated by multiplying disp8 in conjunction with a scaling factor N that is determined based on the vector length, the value of a b bit, and the input element size of the instruction. The displacement value is stored in the displacement field 1307.

In some embodiments, an immediate field 1309 specifies an immediate for the instruction. An immediate may be encoded as a 1-byte value, a 2-byte value, a 4-byte value, etc.

Figure 15:
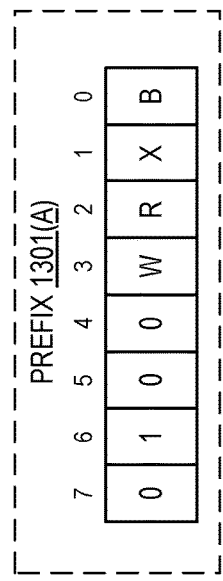
FIG. 15 illustrates embodiments of a first prefix of the instruction format.

FIG. 15 illustrates embodiments of a first prefix 1301(A). In some embodiments, the first prefix 1301(A) is an embodiment of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 1301(A) may specify up to three registers using 3-bit fields depending on the format: 1) using the reg field 1444 and the R/M field 1446 of the Mod R/M byte 1402; 2) using the Mod R/M byte 1402 with the SIB byte 1404 including using the reg field 1444 and the base field 1456 and index field 1454; or 3) using the register field of an opcode.

In the first prefix 1301(A), bit positions 7:4 are set as 0100. Bit position 3 (W) can be used to determine the operand size but may not solely determine operand width. As such, when W=0, the operand size is determined by a code segment descriptor (CS.D) and when W=1, the operand size is 64-bit.

Note that the addition of another bit allows for 16 ($2^4$) registers to be addressed, whereas the MOD R/M reg field 1444 and MOD R/M R/M field 1446 alone can each only address 8 registers.

In the first prefix 1301(A), bit position 2 (R) may an extension of the MOD R/M reg field 1444 and may be used to modify the ModR/M reg field 1444 when that field encodes a general-purpose register, a 64-bit packed data register (e.g., a SSE register), or a control or debug register. R is ignored when Mod R/M byte 1402 specifies other registers or defines an extended opcode.

Bit position 1 (X) X bit may modify the SIB byte index field 1454.

Bit position B (B) B may modify the base in the Mod R/M R/M field 1446 or the SIB byte base field 1456; or it may modify the opcode register field used for accessing general purpose registers (e.g., general-purpose registers 1225).

Figure 16B:
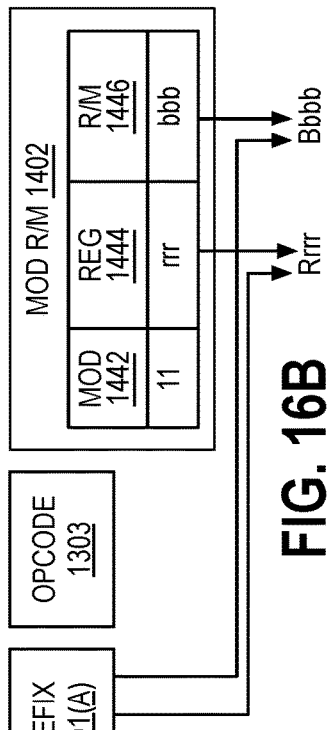
FIGS. 16A-16D illustrate use of the R, X, and B fields of the first prefix, according to some embodiments.
Figure 16A:
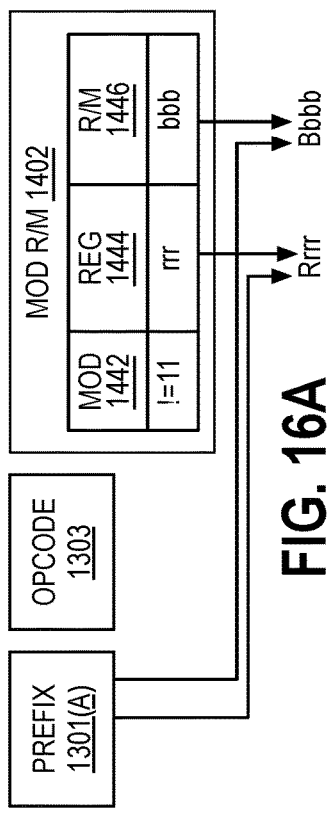
Figure 16D:
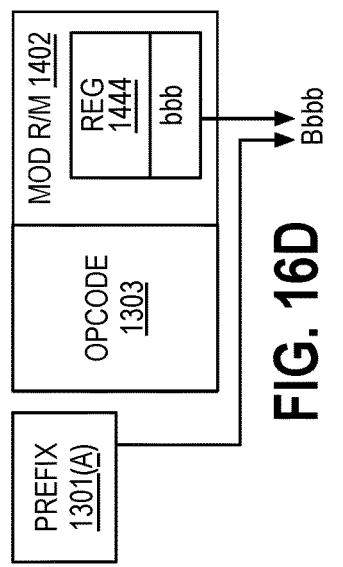
Figure 16C:
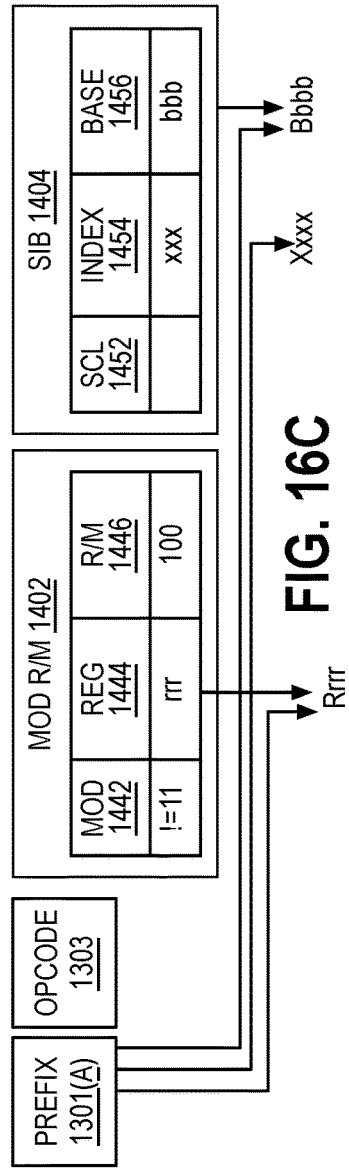

FIGS. 16A-16D illustrate use of the R, X, and B fields of the first prefix 1301(A), according to some embodiments. FIG. 16A illustrates R and B from the first prefix 1301(A) being used to extend the reg field 1444 and R/M field 1446 of the MOD R/M byte 1402 when the SIB byte 14 04 is not used for memory addressing. FIG. 16B illustrates R and B from the first prefix 1301(A) being used to extend the reg field 1444 and R/M field 1446 of the MOD R/M byte 1402 when the SIB byte 14 04 is not used (register-register addressing). FIG. 16C illustrates R, X, and B from the first prefix 1301(A) being used to extend the reg field 1444 of the MOD R/M byte 1402 and the index field 1454 and base field 1456 when the SIB byte 14 04 being used for memory addressing. FIG. 16D illustrates B from the first prefix 1301(A) being used to extend the reg field 1444 of the MOD R/M byte 1402 when a register is encoded in the opcode 1303.

Figure 17A:
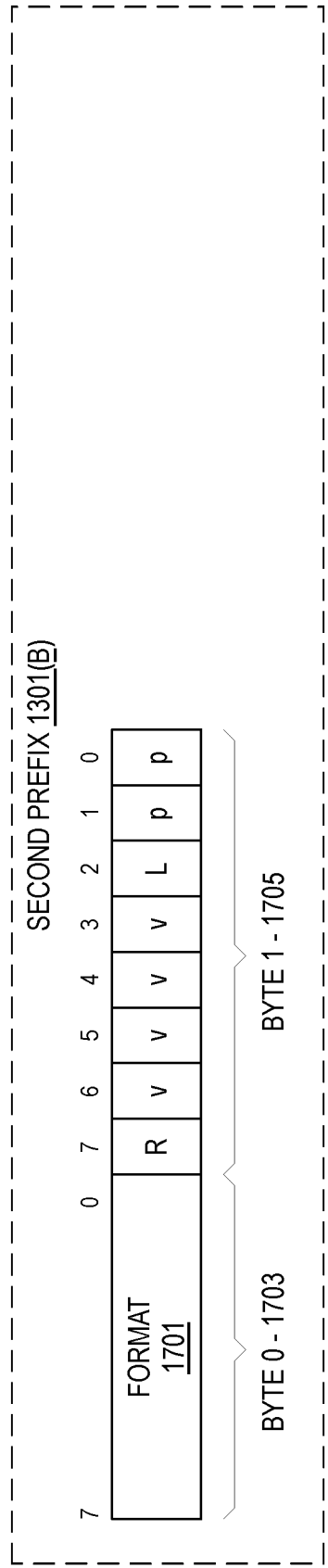
FIGS. 17A-17B illustrate a second prefix, according to embodiments.
Figure 17B:
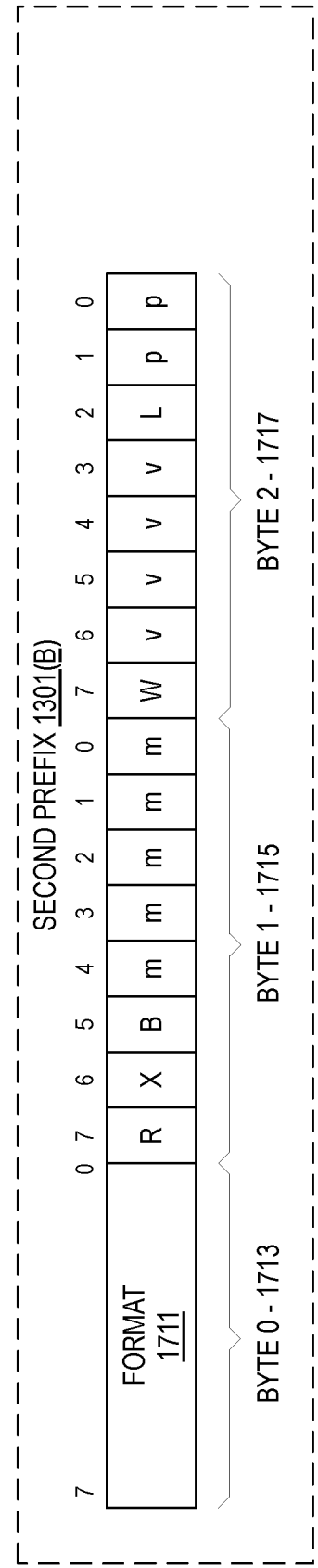

FIG. 17A-17B illustrate a second prefix 1301(B), according to embodiments. In some embodiments, the second prefix 1301(B) is an embodiment of a VEX prefix. The second prefix 1301(B) encoding allows instructions to have more than two operands, and allows SIMD vector registers (e.g., vector registers 1210) to be longer than 64-bits (e.g., 128-bit and 256-bit). The use of the second prefix 1301(B) provides for three-operand (or more) syntax. For example, previous two-operand instructions performed operations such as A=A+B, which overwrites a source operand. The use of the second prefix 1301(B) enables operands to perform nondestructive operations such as A=B+C.

In some embodiments, the second prefix 1301(B) comes in two forms—a two-byte form and a three-byte form. The two-byte second prefix 1301(B) is used mainly for 128-bit, scalar, and some 256-bit instructions; while the three-byte second prefix 1301(B) provides a compact replacement of the first prefix 1301(A) and 3-byte opcode instructions.

FIG. 17A illustrates embodiments of a two-byte form of the second prefix 1301(B). In one example, a format field 1701 (byte 0 1703) contains the value C5H. In one example, byte 1 1705 includes a "R" value in bit [7]. This value is the complement of the same value of the first prefix 1301(A). Bit [2] is used to dictate the length (L) of the vector (where a value of 0 is a scalar or 128-bit vector and a value of 1 is a 256-bit vector). Bits [1:0] provide opcode extensionality equivalent to some legacy prefixes (e.g., 00=no prefix, 01=66H, 10=F3H, and 11=F2H). Bits [6:3] shown as vvvv may be used to: 1) encode the first source register operand, specified in inverted (Is complement) form and valid for instructions with 2 or more source operands; 2) encode the destination register operand, specified in Is complement form for certain vector shifts; or 3) not encode any operand, the field is reserved and should contain a certain value, such as 1111b.

Instructions that use this prefix may use the Mod R/M R/M field 1446 to encode the instruction operand that references a memory address or encode either the destination register operand or a source register operand.

Instructions that use this prefix may use the Mod R/M reg field 1444 to encode either the destination register operand or a source register operand, be treated as an opcode extension and not used to encode any instruction operand.

For instruction syntax that support four operands, vvvv, the Mod R/M R/M field 1446, and the Mod R/M reg field 1444 encode three of the four operands. Bits [7:4] of the immediate 1309 are then used to encode the third source register operand.

FIG. 17B illustrates embodiments of a three-byte form of the second prefix 1301(B). in one example, a format field 1711 (byte 0 1713) contains the value C4H. Byte 1 1715 includes in bits [7:5] "R," "X," and "B" which are the complements of the same values of the first prefix 1301(A). Bits [4:0] of byte 1 1715 (shown as mmmmm) include content to encode, as need, one or more implied leading opcode bytes. For example, 00001 implies a 0FH leading opcode, 00010 implies a 0F38H leading opcode, 00011 implies a leading 0F3AH opcode, etc.

Bit [7] of byte 2 1717 is used similar to W of the first prefix 1301(A) including helping to determine promotable operand sizes. Bit [2] is used to dictate the length (L) of the vector (where a value of 0 is a scalar or 128-bit vector) and a value of 1 is a 256-bit vector). Bits [1:0] provide opcode extensionality equivalent to some legacy prefixes (e.g., 00=no prefix, 01=66H, 10=F3H, and 11=F2H). Bits [6:3], shown as vvvv, may be used to: 1) encode the first source register operand, specified in inverted (1s complement) form and valid for instructions with 2 or more source operands; 2) encode the destination register operand, specified in Is complement form for certain vector shifts; or 3) not encode any operand, the field is reserved and should contain a certain value, such as 1111b.

Instructions that use this prefix may use the Mod R/M R/M field 1446 to encode the instruction operand that references a memory address or encode either the destination register operand or a source register operand.

Instructions that use this prefix may use the Mod R/M reg field 1444 to encode either the destination register operand or a source register operand, be treated as an opcode extension and not used to encode any instruction operand.

For instruction syntax that support four operands, vvvv, the Mod R/M R/M field 1446, and the Mod R/M reg field 1444 encode three of the four operands. Bits [7:4] of the immediate 1309 are then used to encode the third source register operand.

Figure 18:
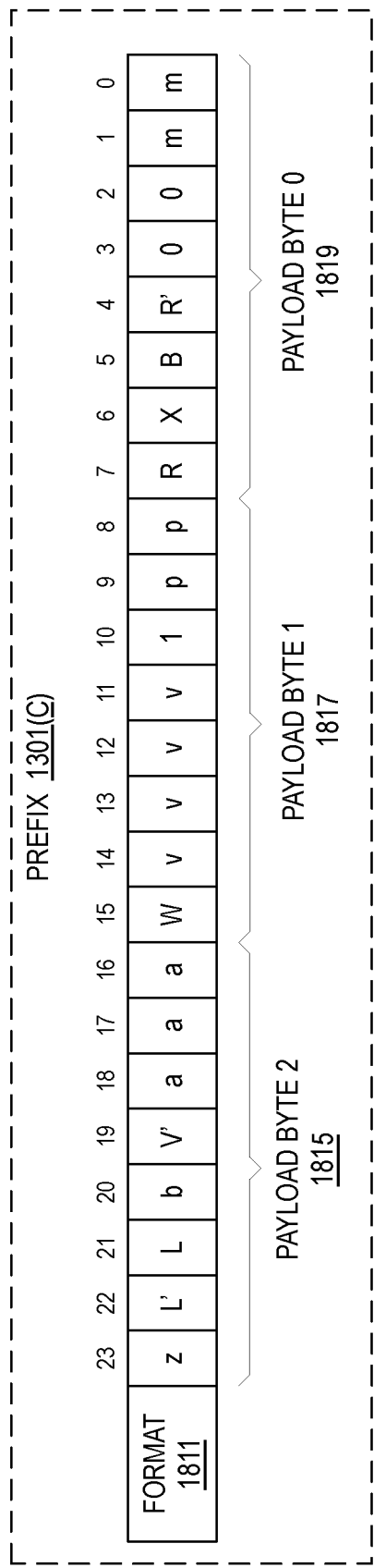
FIG. 18 illustrates a third prefix, according to embodiments.

FIG. 18 illustrates embodiments of a third prefix 1301(C). In some embodiments, the first prefix 1301(A) is an embodiment of an EVEX prefix. The third prefix 1301(C) is a four-byte prefix.

The third prefix 1301(C) can encode 32 vector registers (e.g., 128-bit, 256-bit, and 512-bit registers) in 64-bit mode. In some embodiments, instructions that utilize a writemask/opmask (see discussion of registers in a previous figure, such as FIG. 12) or predication utilize this prefix. Opmask register allow for conditional processing or selection control. Opmask instructions, whose source/destination operands are opmask registers and treat the content of an opmask register as a single value, are encoded using the second prefix 1301(B).

The third prefix 1301(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 1301(C) is a format field 1811 that has a value, in one example, of 0x62, which is a unique value that identifies a vector friendly instruction format. Subsequent bytes are referred to as payload bytes 1815, 1817, 1819 and collectively form a 24-bit value of P[23:0] providing specific capability in the form of one or more fields (detailed herein).

In some embodiments, P [1:0] of payload byte 1819 are identical to the low two mmmmm bits. P [3:2] are reserved in some embodiments. Bit P [4] (R') allows access to the high 16 vector register set when combined with P [7] and the ModR/M reg field 1444. P [6] can also provide access to a high 16 vector register when SIB-type addressing is not needed. P [7:5] consist of an R, X, and B which are operand specifier modifier bits for vector register, general purpose register, memory addressing and allow access to the next set of 8 registers beyond the low 8 registers when combined with the ModR/M register field 1444 and ModR/M R/M field 1446. P [9:8] provide opcode extensionality equivalent to some legacy prefixes (e.g., 00=no prefix, 01=0x66, 10=0xF3, and 11=0xF2). P [10] in some embodiments is a fixed value of 1. P [14:11], shown as vvvv, may be used to: 1) encode the first source register operand, specified in inverted (Is complement) form and valid for instructions with 2 or more source operands; 2) encode the destination register operand, specified in 1s complement form for certain vector shifts; or 3) not encode any operand, the field is reserved and should contain a certain value, such as 1111b.

P [15] is similar to W of the first prefix 1301(A) and second prefix 1301(B) and may serve as an opcode extension bit or operand size promotion.

P [18:16] specify the index of a register in the opmask (writemask) registers (e.g., writemask/predicate registers 1215). In one embodiment of the invention, the specific value aaa=000 has a special behavior implying no opmask is used for the particular instruction (this may be implemented in a variety of ways including the use of a opmask hardwired to all ones or hardware that bypasses the masking hardware). When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While embodiments of the invention are described in which the opmask field's content selects one of a number of opmask registers that contains the opmask to be used (and thus the opmask field's content indirectly identifies that masking to be performed), alternative embodiments instead or additional allow the mask write field's content to directly specify the masking to be performed.

P [19] can be combined with P [14:11] to encode a second source vector register in a non-destructive source syntax which can access an upper 16 vector registers using P [19]. P [20] encodes multiple functionalities, which differs across different classes of instructions and can affect the meaning of the vector length/rounding control specifier field (P [22:21]). P [23] indicates support for merging-writemasking (e.g., when set to 0) or support for zeroing and merging-writemasking (e.g., when set to 1).

Exemplary embodiments of encoding of registers in instructions using the third prefix 1301(C) are detailed in the following tables.

TABLE 16

32-Register Support in 64-bit Mode

| | 4 | 3 | [2:0] | REG. TYPE | COMMON USAGES |
|---|---|---|---|---|---|
| REG | R' | R | ModR/M reg | GPR, Vector | Destination or Source |
| VVVV | V' | | vvvv | GPR, Vector | 2nd Source or Destination |
| RM | X | B | ModR/M R/M | GPR, Vector | 1st Source or Destination |
| BASE | 0 | B | ModR/M R/M | GPR | Memory addressing |
| INDEX | 0 | X | SIB.index | GPR | Memory addressing |
| VIDX | V' | X | SIB.index | Vector | VSIB memory addressing |

TABLE 17

Encoding Register Specifiers in 32-bit Mode

| | [2:0] | REG. TYPE | COMMON USAGES |
|---|---|---|---|
| REG | ModR/M reg | GPR, Vector | Destination or Source |
| VVVV | vvvv | GPR, Vector | 2nd Source or Destination |
| RM | ModR/M R/M | GPR, Vector | 1st Source or Destination |
| BASE | ModR/M R/M | GPR | Memory addressing |
| INDEX | SIB.index | GPR | Memory addressing |
| VIDX | SIB.index | Vector | VSIB memory addressing |

TABLE 18

Opmask Register Specifier Encoding

| | [2:0] | REG. TYPE | COMMON USAGES |
|---|---|---|---|
| REG | ModR/M Reg | k0-k7 | Source |
| VVVV | vvvv | k0-k7 | 2nd Source |
| RM | ModR/M R/M | k0-7 | 1st Source |
| {k1} | aaa | k0$^1$-k7 | Opmask |

Program code may be applied to input instructions to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired, as the mechanisms described herein are not limited in scope to any particular programming language. Additionally, the language may be a compiled or interpreted language.

The mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

ISA Emulation and Binary Translation

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 19:
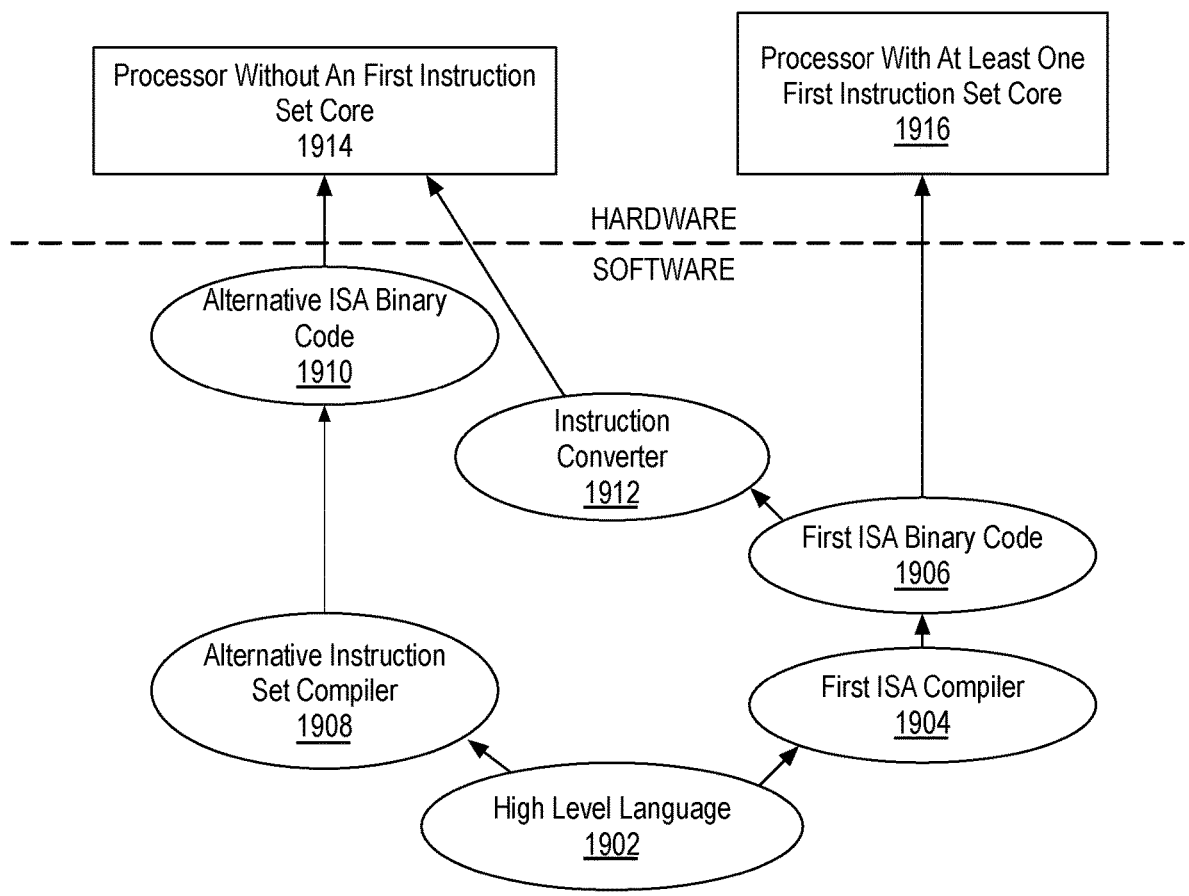
FIG. 19 illustrates a block diagram contrasting the use of a software instruction converter to convert binary instructions in a source instruction set to binary instructions in a target instruction set, according to an embodiment.

FIG. 19 illustrates a block diagram contrasting the use of a software instruction converter to convert binary instructions in a source instruction set to binary instructions in a target instruction set, according to an embodiment. In the illustrated embodiment, the instruction converter is a software instruction converter, although alternatively the instruction converter may be implemented in software, firmware, hardware, or various combinations thereof. FIG. 19 shows a program in a high-level language 1902 may be compiled using a first ISA compiler 1904 to generate first ISA binary code 1906 that may be natively executed by a processor with at least one first instruction set core 1916. The processor with at least one first ISA instruction set core 1916 represents any processor that can perform substantially the same functions as an Intel® processor with at least one first ISA instruction set core by compatibly executing or otherwise processing (1) a substantial portion of the instruction set of the first ISA instruction set core or (2) object code versions of applications or other software targeted to run on an Intel processor with at least one first ISA instruction set core, in order to achieve substantially the same result as a processor with at least one first ISA instruction set core. The first ISA compiler 1904 represents a compiler that is operable to generate first ISA binary code 1906 (e.g., object code) that can, with or without additional linkage processing, be executed on the processor with at least one first ISA instruction set core 1916. Similarly, FIG. 19 shows the program in the high-level language 1902 may be compiled using an alternative instruction set compiler 1908 to generate alternative instruction set binary code 1910 that may be natively executed by a processor without a first ISA instruction set core 1914. The instruction converter 1912 is used to convert the first ISA binary code 1906 into code that may be natively executed by the processor without a first ISA instruction set core 1914. This converted code is not likely to be the same as the alternative instruction set binary code 1910 because an instruction converter capable of this is difficult to make; however, the converted code will accomplish the general operation and be made up of instructions from the alternative instruction set. Thus, the instruction converter 1912 represents software, firmware, hardware, or a combination thereof that, through emulation, simulation, or any other process, allows a processor or other electronic device that does not have a first ISA instruction set processor or core to execute the first ISA binary code 1906.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

FIG. 20A-20D illustrate IP core development and associated package assemblies that can be assembled from diverse IP cores.

Figure 20A:
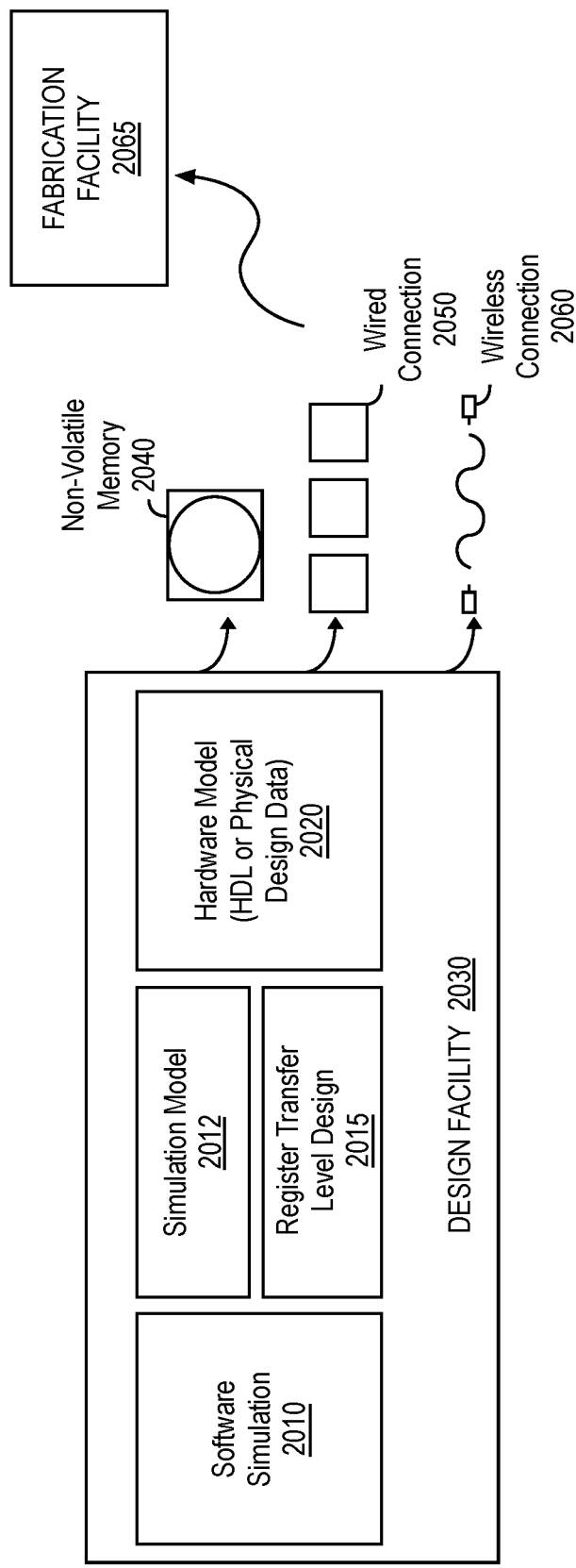
FIGS. 20A-20D illustrate IP core development and associated package assemblies that can be assembled from diverse IP cores.

FIG. 20A is a block diagram illustrating an IP core development system 2000 that may be used to manufacture an integrated circuit to perform operations according to an embodiment. The IP core development system 2000 may be used to generate modular, re-usable designs that can be incorporated into a larger design or used to construct an entire integrated circuit (e.g., an SOC integrated circuit). A design facility 2030 can generate a software simulation 2010 of an IP core design in a high-level programming language (e.g., C/C++). The software simulation 2010 can be used to design, test, and verify the behavior of the IP core using a simulation model 2012. The simulation model 2012 may include functional, behavioral, and/or timing simulations. A register transfer level (RTL) design 2015 can then be created or synthesized from the simulation model 2012. The RTL design 2015 is an abstraction of the behavior of the integrated circuit that models the flow of digital signals between hardware registers, including the associated logic performed using the modeled digital signals. In addition to an RTL design 2015, lower-level designs at the logic level or transistor level may also be created, designed, or synthesized. Thus, the particular details of the initial design and simulation may vary.

The RTL design 2015 or equivalent may be further synthesized by the design facility into a hardware model 2020, which may be in a hardware description language (HDL), or some other representation of physical design data. The HDL may be further simulated or tested to verify the IP core design. The IP core design can be stored for delivery to a $3^{rd}$ party fabrication facility 2065 using non-volatile memory 2040 (e.g., hard disk, flash memory, or any non-volatile storage medium). Alternatively, the IP core design may be transmitted (e.g., via the Internet) over a wired connection 2050 or wireless connection 2060. The fabrication facility 2065 may then fabricate an integrated circuit that is based at least in part on the IP core design. The fabricated integrated circuit can be configured to perform operations in accordance with at least one embodiment described herein.

Figure 20B:
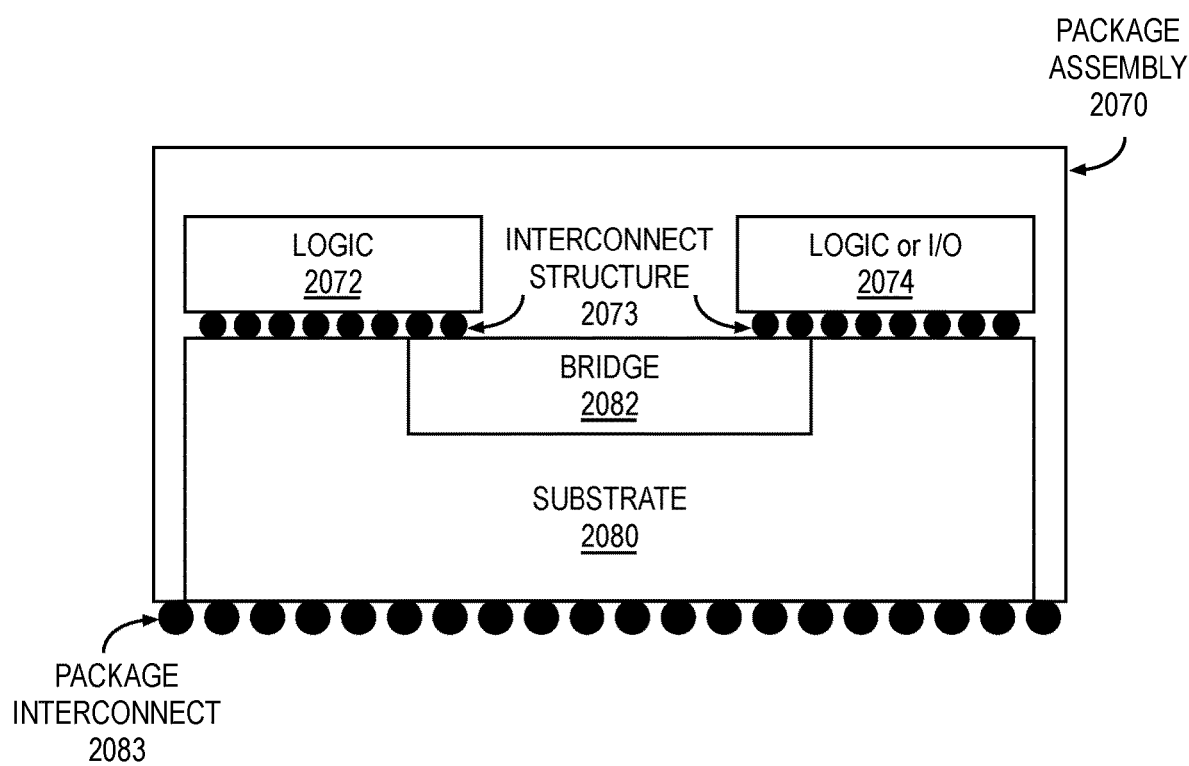

FIG. 20B illustrates a cross-section side view of an integrated circuit package assembly 2070, according to some embodiments described herein. The integrated circuit package assembly 2070 illustrates an implementation of one or more processor or accelerator devices as described herein. The package assembly 2070 includes multiple units of logic 2072, 2074 (e.g., hardware logic) connected to a substrate 2080. The logic 2072, 2074 may be implemented at least partly in configurable logic or fixed-functionality logic hardware and can include one or more portions of any of the processor core(s), graphics processor(s), or other accelerator devices described herein. Each unit of logic 2072, 2074 can be implemented within a semiconductor die and coupled with the substrate 2080 via an interconnect structure 2073. The interconnect structure 2073 may be configured to route electrical signals between the logic 2072, 2074 and the substrate 2080, and can include interconnects such as, but not limited to bumps or pillars. In some embodiments, the interconnect structure 2073 may be configured to route electrical signals such as, for example, input/output (I/O) signals and/or power or ground signals associated with the operation of the logic 2072, 2074. In some embodiments, the substrate 2080 is an epoxy-based laminate substrate. The substrate 2080 may include other suitable types of substrates in other embodiments. The package assembly 2070 can be connected to other electrical devices via a package interconnect 2083. The package interconnect 2083 may be coupled to a surface of the substrate 2080 to route electrical signals to other electrical devices, such as a motherboard, other chipset, or multi-chip module.

In some embodiments, the units of logic 2072, 2074 are electrically coupled with a bridge 2082 that is configured to route electrical signals between the logic 2072, 2074. The bridge 2082 may be a dense interconnect structure that provides a route for electrical signals. The bridge 2082 may include a bridge substrate composed of glass or a suitable semiconductor material. Electrical routing features can be formed on the bridge substrate to provide a chip-to-chip connection between the logic 2072, 2074.

Although two units of logic 2072, 2074 and a bridge 2082 are illustrated, embodiments described herein may include more or fewer logic units on one or more dies. The one or more dies may be connected by zero or more bridges, as the bridge 2082 may be excluded when the logic is included on a single die. Alternatively, multiple dies or units of logic can be connected by one or more bridges. Additionally, multiple logic units, dies, and bridges can be connected in other possible configurations, including three-dimensional configurations.

Figure 20C:
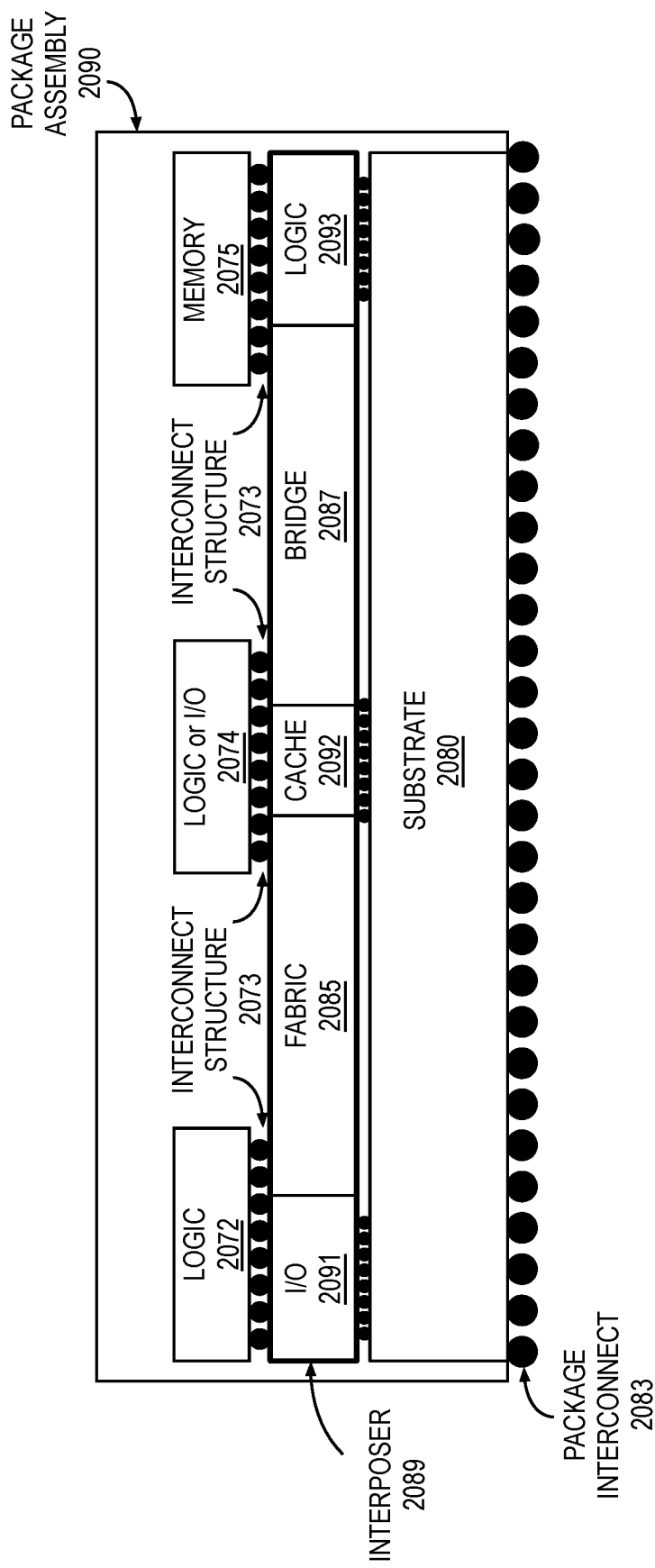

FIG. 20C illustrates a package assembly 2090 that includes multiple units of hardware logic chiplets connected to a substrate 2080. A graphics processing unit, parallel processor, and/or compute accelerator as described herein can be composed from diverse silicon chiplets that are separately manufactured. In this context, a chiplet is an at least partially packaged integrated circuit that includes distinct units of logic that can be assembled with other chiplets into a larger package. A diverse set of chiplets with different IP core logic can be assembled into a single device. Additionally, the chiplets can be integrated into a base die or base chiplet using active interposer technology. The concepts described herein enable the interconnection and communication between the different forms of IP within the GPU. IP cores can be manufactured using different process technologies and composed during manufacturing, which avoids the complexity of converging multiple IPs, especially on a large SoC with several flavors IPs, to the same manufacturing process. Enabling the use of multiple process technologies improves the time to market and provides a cost-effective way to create multiple product SKUs. Additionally, the disaggregated IPs are more amenable to being power gated independently, components that are not in use on a given workload can be powered off, reducing overall power consumption.

In various embodiments a package assembly 2090 can include components and chiplets that are interconnected by a fabric 2085 and/or one or more bridges 2087. The chiplets within the package assembly 2090 may have a 2.5D arrangement using Chip-on-Wafer-on-Substrate stacking in which multiple dies are stacked side-by-side on a silicon interposer 2089 that couples the chiplets with the substrate 2080. The substrate 2080 includes electrical connections to the package interconnect 2083. In one embodiment the silicon interposer 2089 is a passive interposer that includes through-silicon vias (TSVs) to electrically couple chiplets within the package assembly 2090 to the substrate 2080. In one embodiment, silicon interposer 2089 is an active interposer that includes embedded logic in addition to TSVs. In such embodiment, the chiplets within the package assembly 2090 are arranged using 3D face to face die stacking on top of the silicon interposer 2089. The silicon interposer 2089, when an active interposer, can include hardware logic for I/O 2091, cache memory 2092, and other hardware logic 2093, in addition to interconnect fabric 2085 and a silicon bridge 2087. The fabric 2085 enables communication between chiplets for the various logic 2072, 2074, 2093 and I/O 2091 within the silicon interposer 2089. The fabric 2085 may be an NoC (Network on Chip) interconnect or another form of packet switched fabric that switches data packets between components of the package assembly. For complex assemblies, the fabric 2085 may be a dedicated chiplet enables communication between the various hardware logic of the package assembly 2090.

Bridge structures 2087 within the silicon interposer 2089 may be used to facilitate a point-to-point interconnect between, for example, logic or I/O chiplets 2074 and memory chiplets 2075. In some implementations, bridge structures 2087 may also be embedded within the substrate 2080. The hardware logic chiplets can include special purpose hardware logic chiplets 2072, logic or I/O chiplets 2074, and/or memory chiplets 2075. The hardware logic chiplets 2072 and logic or I/O) chiplets 2074 may be implemented at least partly in configurable logic or fixed-functionality logic hardware and can include one or more portions of any of the processor core(s), graphics processor(s), parallel processors, or other accelerator devices described herein. The memory chiplets 2075 can be DRAM (e.g., GDDR, HBM) memory or cache (SRAM) memory. Cache memory 2092 within the silicon interposer 2089 (or substrate 2080) can act as a global cache for the package assembly 2090, part of a distributed global cache, or as a dedicated cache for the fabric 2085.

Each chiplet can be fabricated as separate semiconductor die and coupled with a base die that is embedded within or coupled with the substrate 2080. The coupling with the substrate 2080 can be performed via an interconnect structure 2073. The interconnect structure 2073 may be configured to route electrical signals between the various chiplets and logic within the substrate 2080. The interconnect structure 2073 can include interconnects such as, but not limited to bumps or pillars. In some embodiments, the interconnect structure 2073 may be configured to route electrical signals such as, for example, input/output (I/O) signals and/or power or ground signals associated with the operation of the logic, I/O, and memory chiplets. In one embodiment, an additional interconnect structure couples the silicon interposer 2089 with the substrate 2080.

In some embodiments, the substrate 2080 is an epoxy-based laminate substrate. The substrate 2080 may include other suitable types of substrates in other embodiments. The package assembly 2090 can be connected to other electrical devices via a package interconnect 2083. The package interconnect 2083 may be coupled to a surface of the substrate 2080 to route electrical signals to other electrical devices, such as a motherboard, other chipset, or multi-chip module.

In some embodiments, a logic or I/O chiplet 2074 and a memory chiplet 2075 can be electrically coupled via a bridge 2087 that is configured to route electrical signals between the logic or I/O chiplet 2074 and a memory chiplet 2075. The bridge 2087 may be a dense interconnect structure that provides a route for electrical signals. The bridge 2087 may include a bridge substrate composed of glass or a suitable semiconductor material. Electrical routing features can be formed on the bridge substrate to provide a chip-to-chip connection between the logic or I/O chiplet 2074 and a memory chiplet 2075. The bridge 2087 may also be referred to as a silicon bridge or an interconnect bridge. For example, the bridge 2087, in some embodiments, is an Embedded Multi-die Interconnect Bridge (EMIB). In some embodiments, the bridge 2087 may simply be a direct connection from one chiplet to another chiplet.

Figure 20D:
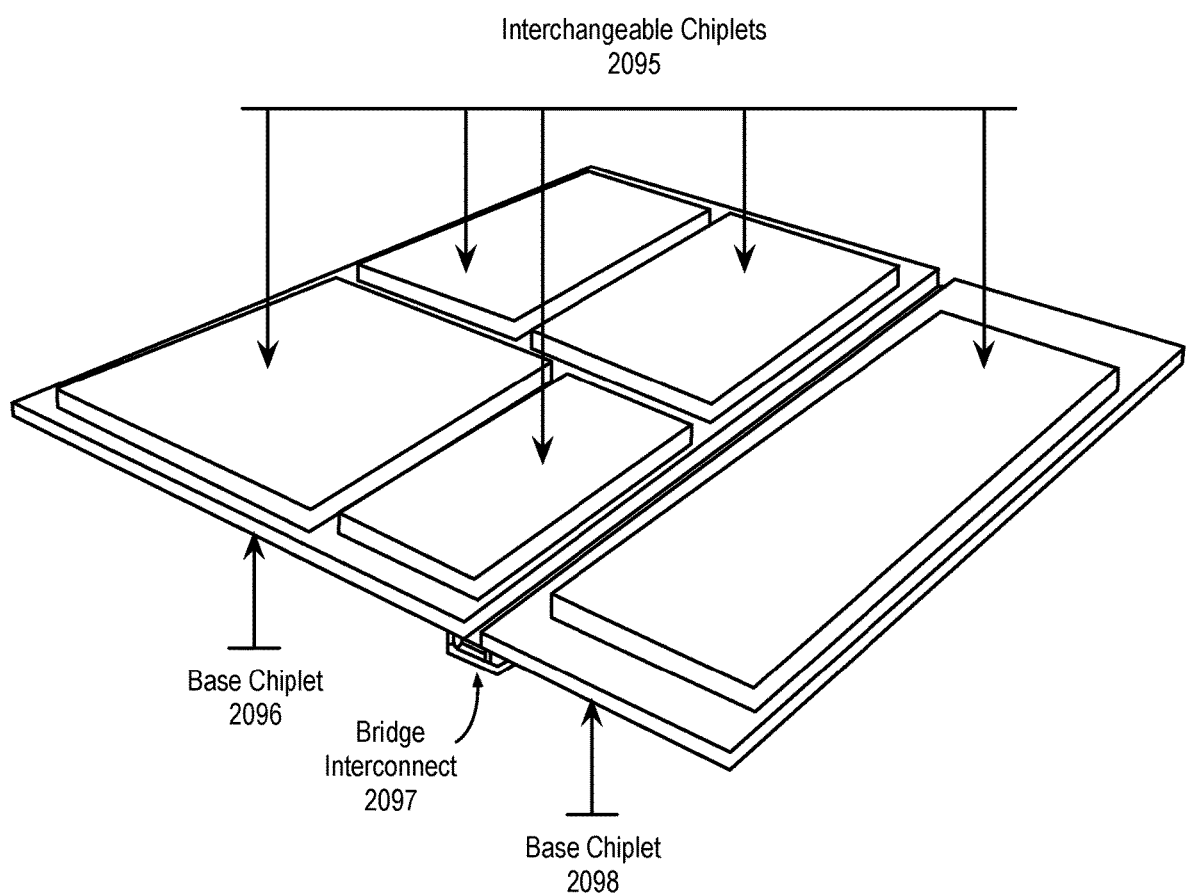

FIG. 20D illustrates a package assembly 2094 including interchangeable chiplets 2095, according to an embodiment. The interchangeable chiplets 2095 can be assembled into standardized slots on one or more base chiplets 2096, 2098. The base chiplets 2096, 2098 can be coupled via a bridge interconnect 2097, which can be similar to the other bridge interconnects described herein and may be, for example, an EMIB Memory chiplets can also be connected to logic or I/O chiplets via a bridge interconnect. I/O and logic chiplets can communicate via an interconnect fabric. The base chiplets can each support one or more slots in a standardized format for one of logic or I/O or memory/cache.

In one embodiment, SRAM and power delivery circuits can be fabricated into one or more of the base chiplets 2096, 2098, which can be fabricated using a different process technology relative to the interchangeable chiplets 2095 that are stacked on top of the base chiplets. For example, the base chiplets 2096, 2098 can be fabricated using a larger process technology, while the interchangeable chiplets can be manufactured using a smaller process technology. One or more of the interchangeable chiplets 2095 may be memory (e.g., DRAM) chiplets. Different memory densities can be selected for the package assembly 2094 based on the power, and/or performance targeted for the product that uses the package assembly 2094. Additionally, logic chiplets with a different number of type of functional units can be selected at time of assembly based on the power, and/or performance targeted for the product. Additionally, chiplets containing IP logic cores of differing types can be inserted into the interchangeable chiplet slots, enabling hybrid processor designs that can mix and match different technology IP blocks.

Figure 21:
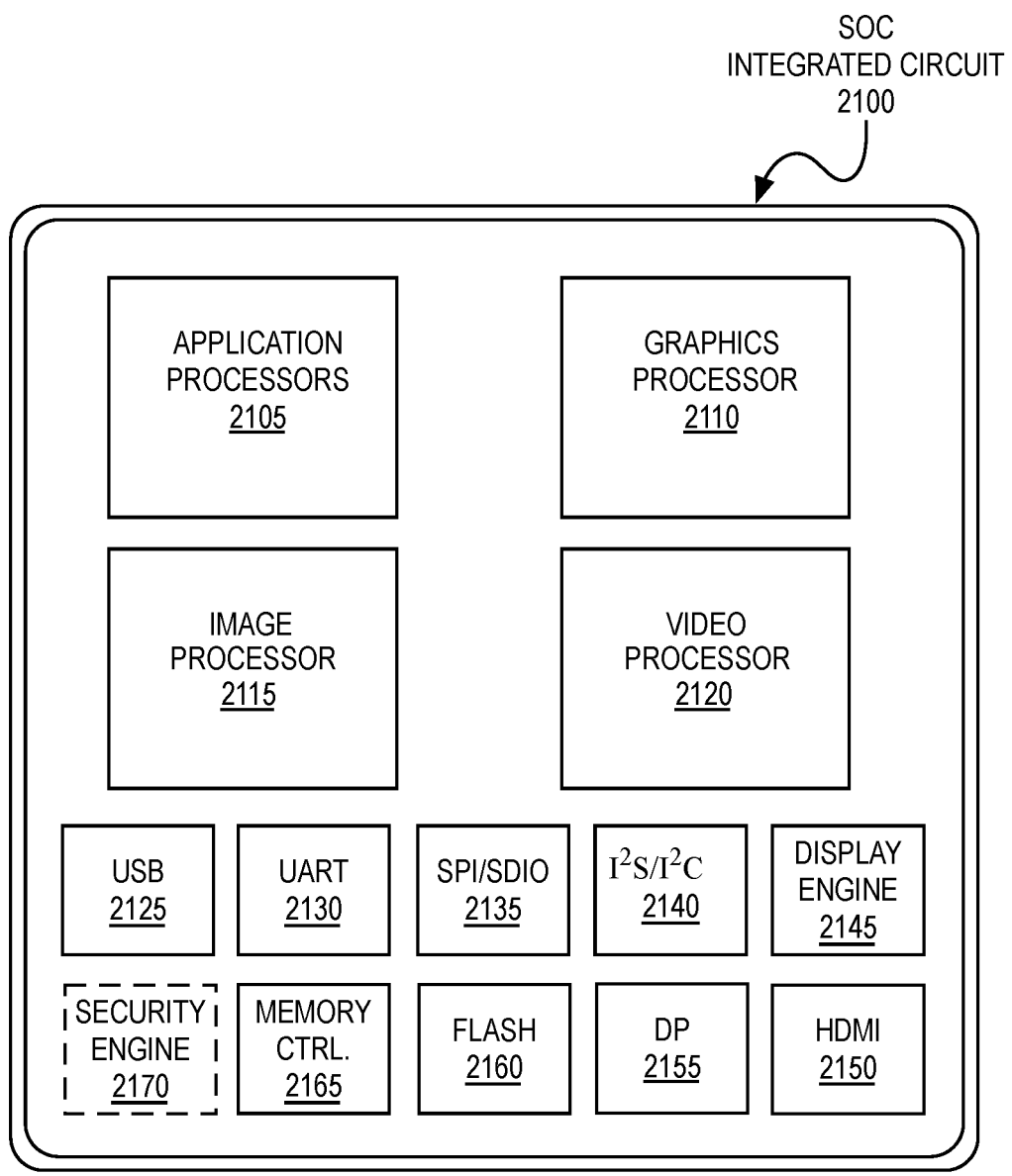
FIG. 21 illustrates an exemplary integrated circuit and associated processors that may be fabricated using one or more IP cores, according to various embodiments described herein.

FIG. 21 illustrates an exemplary integrated circuit and associated processors that may be fabricated using one or more IP cores, according to various embodiments described herein. In addition to what is illustrated, other logic and circuits may be included, including additional graphics processors/cores, peripheral interface controllers, or general-purpose processor cores. As shown in FIG. 21, an integrated circuit 2100 can include one or more application processors 2105 (e.g., CPUs), at least one graphics processor 2110, and may additionally include an image processor 2115 and/or a video processor 2120, any of which may be a modular IP core from the same or multiple different design facilities. Integrated circuit 2100 includes peripheral or bus logic including a USB controller 2125, UART controller 2130, an SPI/SDIO controller 2135, and an I²S/I²C controller 2140. Additionally, the integrated circuit can include a display engine 2145 coupled to one or more of a high-definition multimedia interface (HDMI) controller 2150 and a DisplayPort interface 2155. Storage may be provided by a flash memory subsystem 2160 including flash memory and a flash memory controller. Memory interface may be provided via a memory controller 2165 for access to SDRAM or SRAM memory devices. Some integrated circuits additionally include an embedded security engine 2170.

References herein to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described.

In the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. Those skilled in the art will appreciate that the broad techniques of the embodiments described herein can be implemented in a variety of forms. Therefore, while the embodiments have been described in connection with examples thereof, the true scope of the embodiments should not be so limited since other modifications will become apparent to the skilled practitioner upon a study of the drawings, specification, and following claims.

What is claimed is:

1. A system on a chip integrated circuit (SoC) including:
an active base die including a first cache memory;
a first die mounted on and coupled with the active base die, the first die including an interconnect fabric, an input/output interface, and an atomic operation handler; and
a second die mounted on the active base die and coupled with the active base die and the first die, the second die including an array of graphics processing elements and an interface to the first cache memory of the active base die, wherein at least one of the graphics processing elements is configured to perform, via the atomic operation handler, an atomic operation to a memory device accessible via the input/output interface, a second cache memory is configured to cache data associated with the atomic operation, and the second cache memory is associated with a burst buffer cache that is enabled when a rate of incoming atomic requests exceeds a burst rate threshold.

2. The SoC of claim 1, wherein the first die includes a media engine configured to perform an atomic operation to the memory device.

3. The SoC of claim 2, wherein the memory device is coupled with or accessible to the second die via the first die.

4. The SoC of claim 3, additionally comprising device memory coupled with the first die.

5. The SoC of claim 4, wherein the first cache memory is configured to cache accesses to the device memory.

6. The SoC of claim 5, wherein the memory device accessible via the input/output interface is a host memory configured to couple with a host processor.

7. The SoC of claim 5, wherein the memory device accessible via the input/output interface includes memory accessible via a compute express link protocol.

8. The SoC of claim 7, wherein in response to a determination that the rate of incoming atomic requests exceeds the burst rate threshold, control circuitry associated with the second cache memory is configured to:
adjust a cache replacement policy associated with the second cache memory to deprioritize eviction of modified cache lines; and
allocate a cache line in the burst buffer cache to store data for an incoming atomic request.

9. The SoC of claim 7, wherein the burst buffer cache is a reserved portion of the second cache memory.

10. The SoC of claim 1, wherein the atomic operation to the memory device is a read-modify-write operation, and wherein:
the atomic operation handler is configured to perform a read-for-ownership operation to obtain coherency ownership of data associated with the atomic operation in response to a request from the at least one of the graphics processing elements;
the at least one of the graphics processing elements is to modify the data associated with the atomic operation; and
the atomic operation handler is to perform a write operation to write modified data to the memory device.

11. A data processing system comprising:
a system interconnect to facilitate communication with a host processor device, the host processor device coupled with a host memory; and
a system on a chip integrated circuit (SoC) coupled with the system interconnect, the SoC including:
an active base die including a first cache memory;
a first die mounted on and coupled with the active base die, the first die including an interconnect fabric, an input/output interface, an atomic operation handler, and a memory interface to a device memory; and
a second die mounted on the active base die and coupled with the active base die and the first die, the second die including an array of graphics processing elements and an interface to the first cache memory of the active base die, wherein at least one of the graphics processing elements are configured to perform, via the atomic operation handler, a first atomic operation to the host memory and a second atomic operation to the device memory, wherein the host memory is accessible via the input/output interface, a second cache memory is configured to cache data associated with the first atomic operation, and the second cache memory is associated with a burst buffer cache that is enabled when a rate of incoming atomic requests exceeds a burst rate threshold.

12. The data processing system as in claim 11, wherein the first die includes a media engine configured to perform a third atomic operation to the host memory and a fourth atomic operation to the device memory.

13. The data processing system as in claim 12, wherein the device memory is coupled with the second die via the first die.

14. The data processing system of claim 13, wherein the device memory couples with the SoC and the first cache memory is configured to cache accesses to the device memory.

15. The data processing system of claim 13, wherein the host memory is accessible to the second die via the first die.

16. The data processing system of claim 15, further comprising an external memory device accessible via the input/output interface, the external memory device distinct from the host memory.

17. The data processing system of claim 16, wherein external memory is accessible via a compute express link protocol.

18. The data processing system of claim 17, wherein in response to a determination that the rate of incoming atomic requests exceeds the burst rate threshold, control circuitry associated with the second cache memory is configured to:
  adjust a cache replacement policy associated with the second cache memory to deprioritize eviction of modified cache lines; and
  allocate a cache line in the burst buffer cache to store data for an incoming atomic request.

19. The data processing system of claim 17, wherein the burst buffer cache is a reserved portion of the second cache memory.

20. The data processing system of claim 11, wherein the first atomic operation or the second atomic operation is a read-modify-write operation, and wherein:
  the atomic operation handler is configured to perform a read-for-ownership operation to obtain coherency ownership of data associated with the first atomic operation or the second atomic operation in response to a request from the at least one of the graphics processing elements;
  the at least one of the graphics processing elements is to modify the data associated with the first atomic operation or the second atomic operation; and
  the atomic operation handler is to perform a write operation to write modified data to the device memory or the host memory.

* * * * *